US012284474B2

(12) United States Patent
Goh et al.

(10) Patent No.: US 12,284,474 B2
(45) Date of Patent: Apr. 22, 2025

(54) INFORMATION HANDLING SYSTEM NECK SPEAKER AND HEAD MOVEMENT SENSOR

(71) Applicant: Dell Products L.P., Round Rock, TX (US)

(72) Inventors: Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 17/975,981

(22) Filed: Oct. 28, 2022

(65) Prior Publication Data

US 2024/0147106 A1 May 2, 2024

(51) Int. Cl.
*H04R 1/10* (2006.01)
*H04R 1/08* (2006.01)

(52) U.S. Cl.
CPC ............ *H04R 1/1008* (2013.01); *H04R 1/08* (2013.01)

(58) Field of Classification Search
None
See application file for complete search history.

(56) References Cited

U.S. PATENT DOCUMENTS 6,527,237 B2 3/2003 Harrary
7,564,981 B2 7/2009 Croft
7,596,229 B2 9/2009 Croft
8,243,018 B2 8/2012 Farag et al.
8,526,628 B1 9/2013 Massie et al.
9,142,913 B2 9/2015 Buelow
9,507,441 B2 11/2016 Mann
9,548,621 B2 1/2017 Asanuma et al.
9,746,943 B1 8/2017 Rost et al.
9,779,540 B2 10/2017 Katz et al.
10,342,473 B1 7/2019 Berme et al.
10,355,402 B2 7/2019 Degner et al.
10,453,194 B2 10/2019 Crawley et al.
10,512,839 B2 12/2019 Nelson et al.
10,670,429 B2 6/2020 Madden et al.
10,691,209 B2 6/2020 Huizar et al.
10,715,917 B2 7/2020 Christoph et al.
10,724,908 B2 7/2020 Madden et al.
10,796,450 B2 10/2020 Jiang
10,811,201 B1 10/2020 Files et al.
10,890,968 B2 1/2021 Kurlethimar et al.
(Continued)

OTHER PUBLICATIONS

U.S. Appl. No. 63/297,326 corresponding to Lerner (US 2023/0224639 A1) (Year: 2022).*
(Continued)

*Primary Examiner* — James K Mooney
(74) *Attorney, Agent, or Firm* — Zagorin Cave LLP; Robert W. Holland

(57) ABSTRACT

An information handling system neck speaker rests on an end user's shoulders to direct ultrasonic audio at the end user that resolves on impact to audible sound. The audible sound reflects to microphones on the neck speaker that monitor for doppler effects to determine head motion that is available for use as an input at the information handling system. Ultrasonic energy that does not impact the end user dissipates so that the end user can hear audio without wearing headphones yet avoid others nearby from hearing the audio.

14 Claims, 69 Drawing Sheets

(56) References Cited

U.S. PATENT DOCUMENTS

| | | | | |
|---|---|---|---|---|
| 10,908,708 | B1 | 2/2021 | Menendez et al. | |
| 11,132,070 | B1 | 9/2021 | Fuchs et al. | |
| 11,150,741 | B1 | 10/2021 | Stoeckli et al. | |
| 11,199,706 | B2 | 12/2021 | Fortin-Deschênes et al. | |
| 11,233,356 | B2 | 1/2022 | Rohrbach et al. | |
| 11,450,073 | B1 | 9/2022 | Pusch et al. | |
| 11,543,873 | B2 | 1/2023 | Sengupta | |
| 11,733,761 | B2 | 8/2023 | Sinha | |
| 2002/0084986 | A1 | 7/2002 | Armstrong | |
| 2002/0093489 | A1 | 7/2002 | Kaikuranta et al. | |
| 2002/0095535 | A1 | 7/2002 | Blood | |
| 2002/0158844 | A1 | 10/2002 | McLoone et al. | |
| 2003/0025673 | A1 | 2/2003 | Ledbetter et al. | |
| 2007/0275798 | A1 | 11/2007 | Brunner | |
| 2008/0165141 | A1 | 7/2008 | Christie | |
| 2009/0063877 | A1 | 3/2009 | Lewis | |
| 2010/0007668 | A1 | 1/2010 | Casparian et al. | |
| 2010/0127978 | A1 | 5/2010 | Peterson | |
| 2011/0084905 | A1 | 4/2011 | Chang | |
| 2011/0271138 | A1 | 11/2011 | Akilu et al. | |
| 2011/0310066 | A1 | 12/2011 | Fermgard | |
| 2013/0066636 | A1* | 3/2013 | Singhal | H04B 1/385 381/385 |
| 2014/0177846 | A1 | 6/2014 | Strub | |
| 2014/0225832 | A1 | 8/2014 | Wright et al. | |
| 2014/0253463 | A1 | 9/2014 | Hicks | |
| 2014/0267400 | A1 | 9/2014 | Mabbutt | |
| 2014/0270321 | A1* | 9/2014 | Fullam | H04R 3/12 381/387 |
| 2014/0310636 | A1 | 10/2014 | Arrasvuori | |
| 2014/0341415 | A1* | 11/2014 | Camello | H04R 1/323 381/379 |
| 2015/0036848 | A1 | 2/2015 | Donaldson | |
| 2015/0093922 | A1 | 4/2015 | Bosscher et al. | |
| 2015/0277617 | A1 | 10/2015 | Gwin | |
| 2015/0312693 | A1 | 10/2015 | Collins | |
| 2016/0033343 | A1 | 2/2016 | Park et al. | |
| 2016/0057529 | A1* | 2/2016 | Kappus | H04R 1/1075 381/74 |
| 2016/0085268 | A1 | 3/2016 | Aurongzeb et al. | |
| 2016/0109967 | A1 | 4/2016 | Craig | |
| 2016/0205459 | A1* | 7/2016 | Kamada | H04R 1/1041 381/74 |
| 2017/0017310 | A1 | 1/2017 | Weddle et al. | |
| 2017/0083107 | A1 | 3/2017 | Shim et al. | |
| 2017/0116454 | A1 | 4/2017 | Slaby | |
| 2017/0168595 | A1 | 6/2017 | Sakaguchi | |
| 2017/0300127 | A1 | 10/2017 | Choi et al. | |
| 2018/0032203 | A1 | 2/2018 | Sepulveda | |
| 2018/0113518 | A1 | 4/2018 | Chen | |
| 2018/0157345 | A1 | 6/2018 | Wang | |
| 2018/0210564 | A1 | 7/2018 | Chen | |
| 2018/0220253 | A1* | 8/2018 | Kärkkäinen | H04R 5/033 |
| 2018/0307332 | A1 | 10/2018 | Stone et al. | |
| 2018/0310116 | A1 | 10/2018 | Arteaga | |
| 2018/0356916 | A1 | 12/2018 | Choi | |
| 2019/0064933 | A1 | 2/2019 | Robinson et al. | |
| 2019/0113988 | A1 | 4/2019 | Hotelling et al. | |
| 2019/0253801 | A1 | 8/2019 | Arteaga | |
| 2019/0369674 | A1 | 12/2019 | Aurongzeb et al. | |
| 2020/0019257 | A1 | 1/2020 | Chang et al. | |
| 2020/0144776 | A1 | 5/2020 | Chin | |
| 2020/0149987 | A1 | 5/2020 | Ahamed et al. | |
| 2021/0011289 | A1 | 1/2021 | Fortin-Deschnes | |
| 2021/0045167 | A1 | 2/2021 | Zhu et al. | |
| 2021/0127841 | A1 | 5/2021 | Park | |
| 2021/0173480 | A1 | 6/2021 | Osterhout | |
| 2021/0223900 | A1 | 7/2021 | Sheng | |
| 2021/0240254 | A1 | 8/2021 | Hamlin | |
| 2021/0255625 | A1 | 8/2021 | Baladhandapani | |
| 2021/0286452 | A1 | 9/2021 | Lan et al. | |
| 2021/0291580 | A1 | 9/2021 | Tanaka | |
| 2021/0382569 | A1 | 12/2021 | Kamiyama | |
| 2022/0021999 | A1 | 1/2022 | Yamkovoy | |
| 2022/0052867 | A1 | 2/2022 | Nakano | |
| 2022/0091648 | A1 | 3/2022 | Rolion | |
| 2022/0117035 | A1 | 4/2022 | Forde et al. | |
| 2022/0174450 | A1 | 6/2022 | Son | |
| 2022/0202190 | A1 | 6/2022 | Sim | |
| 2023/0102647 | A1 | 3/2023 | Kanno et al. | |
| 2023/0161545 | A1 | 5/2023 | Pala et al. | |
| 2023/0221815 | A1 | 7/2023 | Ide et al. | |
| 2023/0224639 | A1* | 7/2023 | Lerner | G10K 11/175 381/71.1 |
| 2023/0337930 | A1 | 10/2023 | Chan | |
| 2023/0419123 | A1 | 12/2023 | Luo et al. | |
| 2024/0143536 | A1 | 5/2024 | Goh | |
| 2024/0147106 | A1 | 5/2024 | Goh | |

OTHER PUBLICATIONS

Ahmadi, H., et al., "A Skill-Based Visual Attention Model for Cloud Gaming," IEEE Access (vol. 9), Jan. 11, 2021, 25 pages.

Gutman, Z., et al., "TMOS Novel Uncooled Sensors—Theory and Practice," IEEE International Conference on Microwaves, Communications, Antennas and Electric Systems, May 13-14, 2008, 4 pages.

ISKN, "The best video games for playing on a graphic tablet," downloaded from https://www.iskn.co/discover/c145de6f/the-best-video-games-for-playing-on-a-graphic-tablet on Apr. 14, 2023, 13 pages.

Kemet Electronics Corp., "Piezoelectric Haptic Actuators," downloaded from https://www.kemet.com/en/us/applications/haptic-actuators.html on Apr. 14, 2023, 2 pages.

Kemet Electronics Corp., Piezoelectric Haptic Modules—Film Flex Assembled Actuators, Oct. 7, 2022, downloaded from www.kemet.com on Apr. 14, 2023, 6 pages.

Kemet Electronics Corp., "Piezoelectric Haptic Modules—FFAA Film Flex Assembled Actuator," downloaded from www.kemet.com on Apr. 14, 2023, 1 page.

Molex, "EXTreme Ten60 High-Power Connectors," downloaded from https://www.molex.com/molex/products/family/extreme_ten60power_highcurrent_connector on Apr. 14, 2023, 12 pages.

Molex, "Touch Sensor Solutions," downloaded from https://www.molex.com/molex/products/family/touch_sensor_solutions on Apr. 14, 2023, 3 pages.

NIH, U.S. National Library of Medicine, A Computerized, Adaptive Therapeutic Gaming Approach Training Visual Perceptual Skills in Children with CVI (iVision2_WP3), downloaded from https://clinicaltrials.gov/ct2/show/NCT05014503 on Apr. 14, 2023, 12 pages.

Park, J., et al., "Investigating the mechanical and optical properties of thin PDMS film by flat-punched indentation," downloaded from https://www.sciencedirect.com/science/article/abs/pii/S0925346718305895?fr=RR-2&ref=pdf_download&rr=7b7c901aa83a3acf on Apr. 14, 2023, 7 pages.

St Life Augmented, "Infrared (IR) Sensors," downloaded from https://www.st.com/en/mems-and-sensors/infrared-ir-sensors.html on Apr. 14, 2023, 3 pages.

Stem Learning, "The Science Behind 3D Sound," downloaded from https://catalyst-magazine.org/articles/the-science-behind-3d-sound/ on Apr. 14, 2023, 3 pages.

Tang, J., et al., "Highly Stretchable Electrodes on Wrinkled Polydimethylsiloxane Substrates," downloaded from https://www.nature.com/articles/srep16527 on Apr. 14, 2023, 25 pages.

Wang, W., et al., "Device-Free Gesture Tracking Using Acoustic Signals," Proceedings of the 22nd Annual International Conference on Mobile Computing and Networking, Oct. 2016, 13 pages.

Western Michigan University, "Large Scale Production of Thin PDMS Films for Printed Electronics," downloaded from https://wmich.edu/research/pdmsfilms on Apr. 14, 2023, 3 pages.

Cretenoud, A., et al., "How do visual skills relate to action video game performance?," Journal of Vision., downloaded from https://jov.arvojournals.org/article.aspx?articleid=2776479 on Apr. 14, 2023, 21 pages.

(56) References Cited

OTHER PUBLICATIONS

U.S. Appl. No. 17/723,876, filed Apr. 19, 2022, entitled "Information Handling System Stylus with Power Management Through Acceleration and Sound Context," by inventors Peng Lip Goh and Gerald R. Pelissier.

* cited by examiner

INFORMATION HANDLING SYSTEM NECK SPEAKER AND HEAD MOVEMENT SENSOR

CROSS-REFERENCE TO RELATED APPLICATION(S)

This application is related to the application entitled "Information Handling System Keyboard with Four Dimensional Control Pad," naming Peng Lip Goh and Deeder M. Aurongzeb as inventors, filed Oct. 28, 2022, application Ser. No. 17/975,961, which application is incorporated herein by reference.

This application is related to the application entitled "Information Handling System Mouse with Strain Sensor for Click and Continuous Analog Input," naming Peng Lip Goh and Deeder M. Aurongzeb as inventors, filed Oct. 28, 2022, application Ser. No. 17/975,967, which application is incorporated herein by reference.

This application is related to the application entitled "Information Handling System Peripheral Device Sleep Power Management," naming Peng Lip Goh and Deeder M. Aurongzeb as inventors, filed Oct. 28, 2022, application Ser. No. 17/975,969, which application is incorporated herein by reference.

This application is related to the application entitled "Information Handling System High Bandwidth GPU Hub," naming Peng Lip Goh and Deeder M. Aurongzeb as inventors, filed Oct. 28, 2022, application Ser. No. 17/975,975, which application is incorporated herein by reference.

This application is related to the application entitled "Information Handling System Immersive Sound System," naming Peng Lip Goh, Suet Chan Law, and Deeder M. Aurongzeb as inventors, filed Oct. 28, 2022, application Ser. No. 17/975,984, which application is incorporated herein by reference.

This application is related to the application entitled "Information Handling System Display Grid and Head Position Monitoring to Present a Boundary Tracking Highlight," naming Peng Lip Goh and Deeder M. Aurongzeb as inventors, filed Oct. 28, 2022, application Ser. No. 17/975,994, which application is incorporated herein by reference.

This application is related to the application entitled "Information Handling System Stylus with Expansion Bay and Replaceable Module," naming Peng Lip Goh, Suet Chan Law, and Deeder M. Aurongzeb as inventors, filed Oct. 28, 2022, application Ser. No. 17/975,993, which application is incorporated herein by reference.

This application is related to the application entitled "Information Handling System Head Position Detection for Commanding an Application Function," naming Peng Lip Goh and Deeder M. Aurongzeb as inventors, filed Oct. 28, 2022, application Ser. No. 17/975,999, which application is incorporated herein by reference.

This application is related to the application entitled "Information Handling System Keyboard Asymmetric Magnetic Charger," naming Peng Lip Goh and Deeder M. Aurongzeb as inventors, filed Oct. 28, 2022, application Ser. No. 17/976,061, which application is incorporated herein by reference.

This application is related to the application entitled "Information Handling System Plug and Receptacle Adapter for Magnetic Charging," naming Peng Lip Goh and Deeder M. Aurongzeb as inventors, filed Oct. 28, 2022, application Ser. No. 17/976,377, which application is incorporated herein by reference.

BACKGROUND OF THE INVENTION

Field of the Invention

The present invention relates in general to the field of information handling system audio speaker devices, and more particularly to an information handling system neck speaker and head movement sensor.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information. Desktop or other types of stationary information handling systems typically interact with end users through a variety of input/output (I/O) devices, such as peripheral displays, keyboards and mouse. Portable information handling systems integrate I/O devices in a portable housing to support mobile operations, such as a display, a keyboard and a power source. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. In addition, portable information handling systems also typically interact with peripheral devices similar to those used by stationary systems.

One particularly demanding use for information handling systems is the execution of gaming applications. A typical gaming application creates a virtual world in which an end user interacts and that typically also interacts with other end users. Gaming applications tend to perform best with extreme processing resources, such as very high graphics demands. A gamer will lean on the very highest grades of processing components and peripheral devices to gain any and all possible advantages with respect to other game participants. This can include additional processing support, such as the use of external graphics boxes, and high quality peripheral input devices to command game interactions, such as a specialized peripheral keyboard and mouse. When gaming, end users must react quickly to access a large number of commands and resources with a limited number of hands and fingers. Small advantages, such as mouse with a finely tuned input button or a keyboard with conveniently laid out keys, can mean the difference between success and failure. A typical gamer will have a core of input keys to use so that any additional interactions that draw attention away from the core tends to distract from success.

SUMMARY OF THE INVENTION

Therefore, a need has arisen for a system and method which enhances end user interactions with information handling systems to perform demanding input and output tasks.

In accordance with the present invention, a system and method are provided which substantially reduce the disadvantages and problems associated with previous methods and systems for performing demanding input and output tasks at an information handling system. Information handling system peripherals are provided that enhance end user interactions for improved quality and speed of interactions during demanding performance tasks, such as gaming.

More specifically, an information handling system processes information with a processor that executes instructions in cooperation with a memory that stores the instructions and information. Peripheral devices that interact with the processor detect end user inputs in part by strain applied to a flexible film that integrates dual vertically stack capacitor layers, such as a PDMS film with silver electrodes to detect end user touches and presses at a keyboard upper surface or a mouse button press. Power consumption at the peripheral devices is managed in cooperation with user presence detection by an information handling system and a thermal sensor of the peripheral. A high bandwidth serial communication of information through first and second opposing sets of plural contactless connectors supports rapid exchanges with a peripheral device, such as visual information provided from an information handling system to a graphics hub. End user head position is tracked as an input source for gaming interactions through shoulder mounted ultrasonic speakers that determine head movements from reflected audio. Alternatively, or in addition, a headset worn by an end user tracks head movements with a tracking chip that detects accelerations and orientations. In one embodiment, the head positions are applied to depict a grid on a display area having an indication of the end user eye position relative to a cursor presented at the display. In an alternative embodiment, head movements are interpreted as input gestures that supplement other input devices, such as a command to add health or change weapons for a gaming character. In another embodiment, a stylus type of device adapts to support a variety of different types of inputs by selecting replacement modules to couple to a bay formed in the stylus housing, such as trigger input device, a capacitive touch device, a haptic feedback device and a battery. Peripheral power and communication is supported by magnetic coupling devices having asymmetric magnetic attraction.

The present invention provides a number of important technical advantages. One example of an important technical advantage is that an end user is provided with high quality interactions with an information handling system to support demanding processing tasks, such as gaming. Rapid and accurate analog strain sensing at keyboard and mouse inputs offer greater precision and control for a wide variety of inputs. Communication of full PCIe bandwidth across a series of contactless connectors ensures that a graphics hub supports full graphics processing capabilities without communication bandwidth chokepoints. Head position sensing provides an additional interaction avenue that enhances input speed and timeliness when an end user has busy hands. Greater flexibility is provided with an array of input options that selectively couple as replacement modules to a stylus bay. Rapid power and communication adjustments are support with asymmetric magnetic connectors that prevent cable connections having incorrect orientations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system end user interactions related to gaming applications are enhanced with improved I/O devices, including keyboard, mouse, stylus, display and audio devices. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
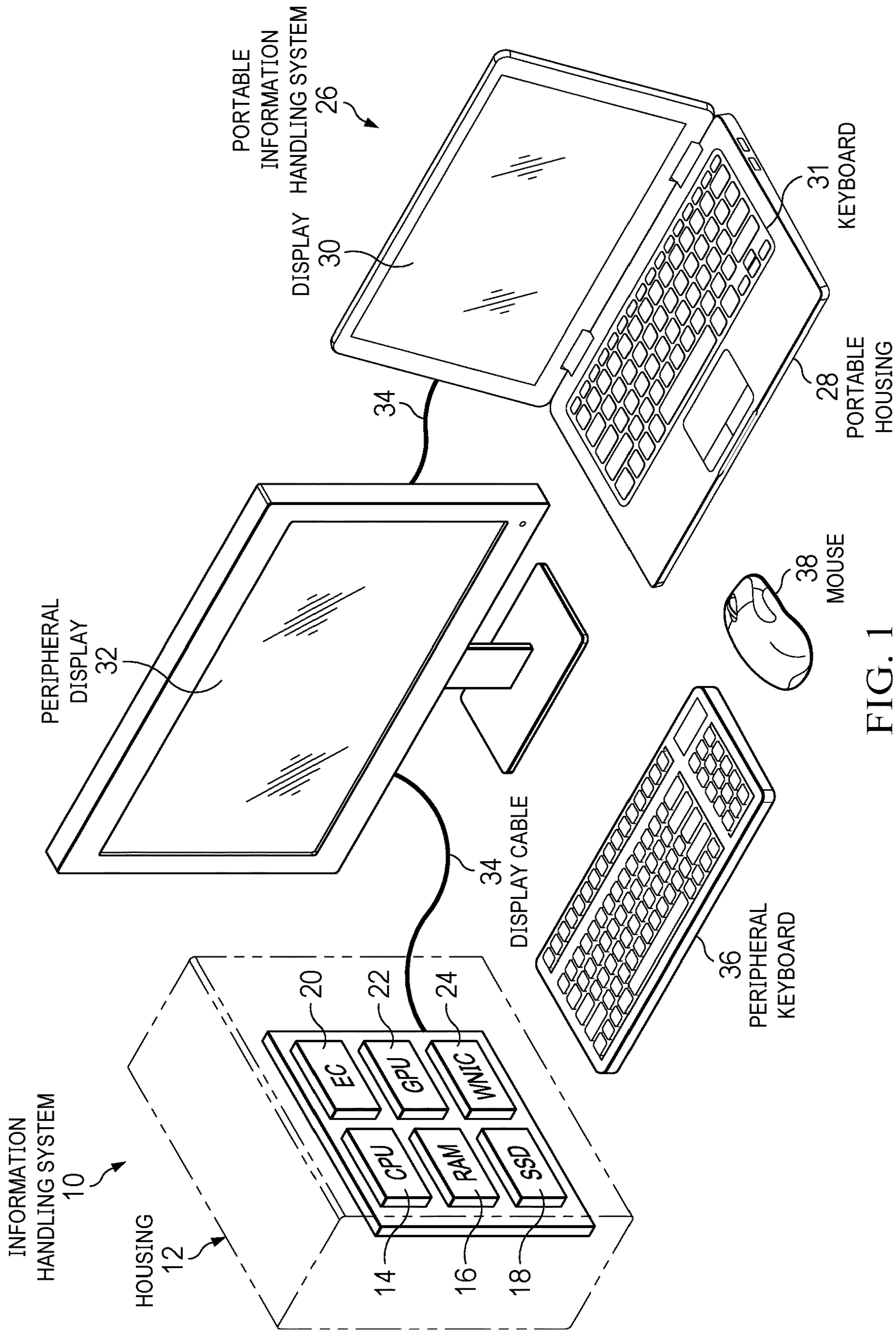
FIG. 1 depicts a block diagram of an information handling system that executes gaming applications supported by a variety of peripheral devices.

Referring now to FIG. 1, a block diagram depicts an information handling system 10 that executes gaming applications supported by a variety of peripheral devices. Information handling system 10 has a stationary configuration, such as a desktop configuration in a housing 12 that contains a variety of processing components that cooperate to process information. A central processing unit (CPU) 14 executes instructions to process information in cooperation with a random access memory (RAM) 16 that stores the instructions and information. A solid state drive (SSD) 18 provides persistent storage with non-transitory memory, such as flash, that stores an operating system and applications during power down for retrieval at power up to RAM 16 for execution on CPU 14. An embedded controller (EC) 20 manages operational conditions at the information handling system, such as application of power to the processing components, maintenance of thermal constraints and interactions with peripheral devices. A graphics processing unit (GPU) 22 receives visual image information from CPU 14 and further processes the visual information to define visual images for presentation at a display, such as with pixel values that define colors display by the pixels that, as a composite, form the visual images. A wireless network interface controller (WNIC) 24 includes a radio that transmits and receives wireless signals to communicate information, such as with wireless local area networks (WLAN) like WiFi and wireless personal area networks (WPAN) like Bluetooth.

Information handling system 10 interacts with end users through a variety of peripheral devices that input and/or output information. For example, a display cable 34 interfaces GPU 22 with a peripheral display 32 that presents information as visual images. A peripheral keyboard 36 accepts typed inputs at keyboard keys that are reported through WNIC 24 and/or EC2 20 to CPU 14 as input values. A mouse 38 includes a position sensor that provides end user control of a mouse cursor on peripheral display 32 and input buttons that accept inputs commonly known as mouse clicks. Other peripheral devices might include speakers to play audible sounds, joysticks to accept game inputs, etc. .

. . . In the depicted example, a portable information handling system 26 is presented interfaced with peripheral display 32. Portable information handling system 26 includes processing components, such as CPU 14 and RAM 16, disposed in a portable housing 28, such as a laptop convertible configuration. A keyboard 31 integrates in the upper surface of portable housing 28 and a display 30 integrates in a lid of portable housing 28. The integrated input and output (I/O) devices support mobile use of the portable information handling system; however portable information handling system 26 also operates with peripheral input and output devices, such as with a display cable 34 interface to peripheral display 32 and a wireless interface with peripheral keyboard 36 and mouse 38. In various embodiments, other types and configurations of information handling systems may be used as described herein.

Referring now to FIGS. 2 and 2A-2D, an upper rear perspective view depicts a peripheral keyboard 36 having a four dimensional control pad 40. Peripheral keyboard 36 has plural keys to accept key inputs, such as in a QWERTY configuration, and communicates the inputs to an information handling system with a wireless or a cabled interface, such as WNIC 24. Control pad 40 offers an end user four dimensions of inputs: X, Y and Z inputs plus a lateral input with analog sensing and detection to report the inputs to an information handling system. The four dimensions are achieved with a stretchable film, such as a polydimethylsiloxane (PDMS) film, that integrates dual capacitor layers cable of strain and fold detection. The multifunctional capacitive sensor senses a variety of different external stimuli that is converted into inputs from an end user. A stretchable PDMS film has silver nanowire electrodes formed by using selective oxygen plasma treatment that avoids photolithography and etching processes. The multifunctional sensor has two vertically stacked capacitors in a dual capacitor structure that can detect the type and strength of external stimuli including curvature, pressure, strain and touch with clear distinction. The dual capacitor structure also detects the surface normal directionality of curvature, pressure and touch to support directionality and strength sensing of external stimulus based on the relative capacitance changes of the vertically stacked capacitors.

Figure 2:
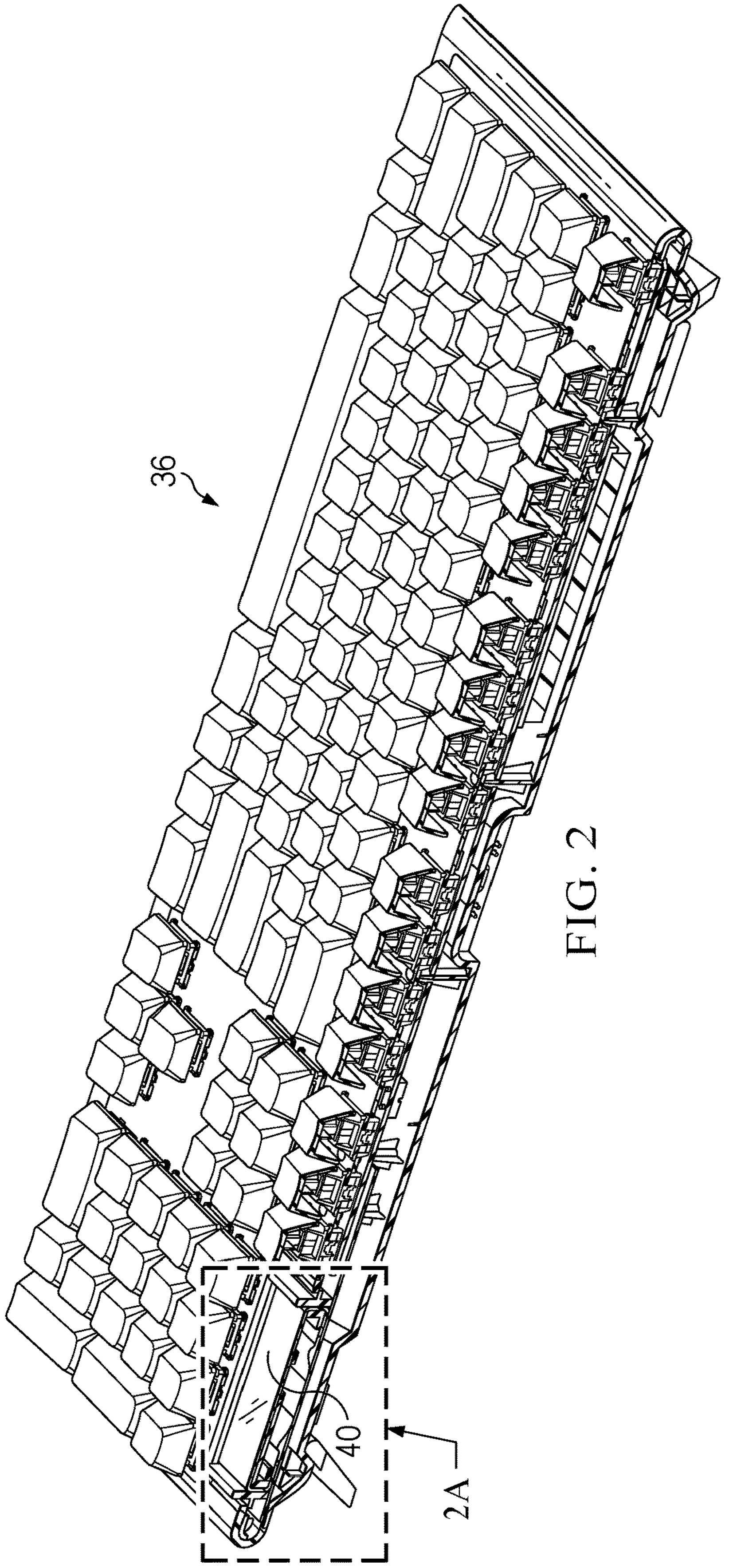
FIGS. 2 and 2A-2D depict an upper rear perspective view of a peripheral keyboard having a four dimensional control pad.
Figure 2A:
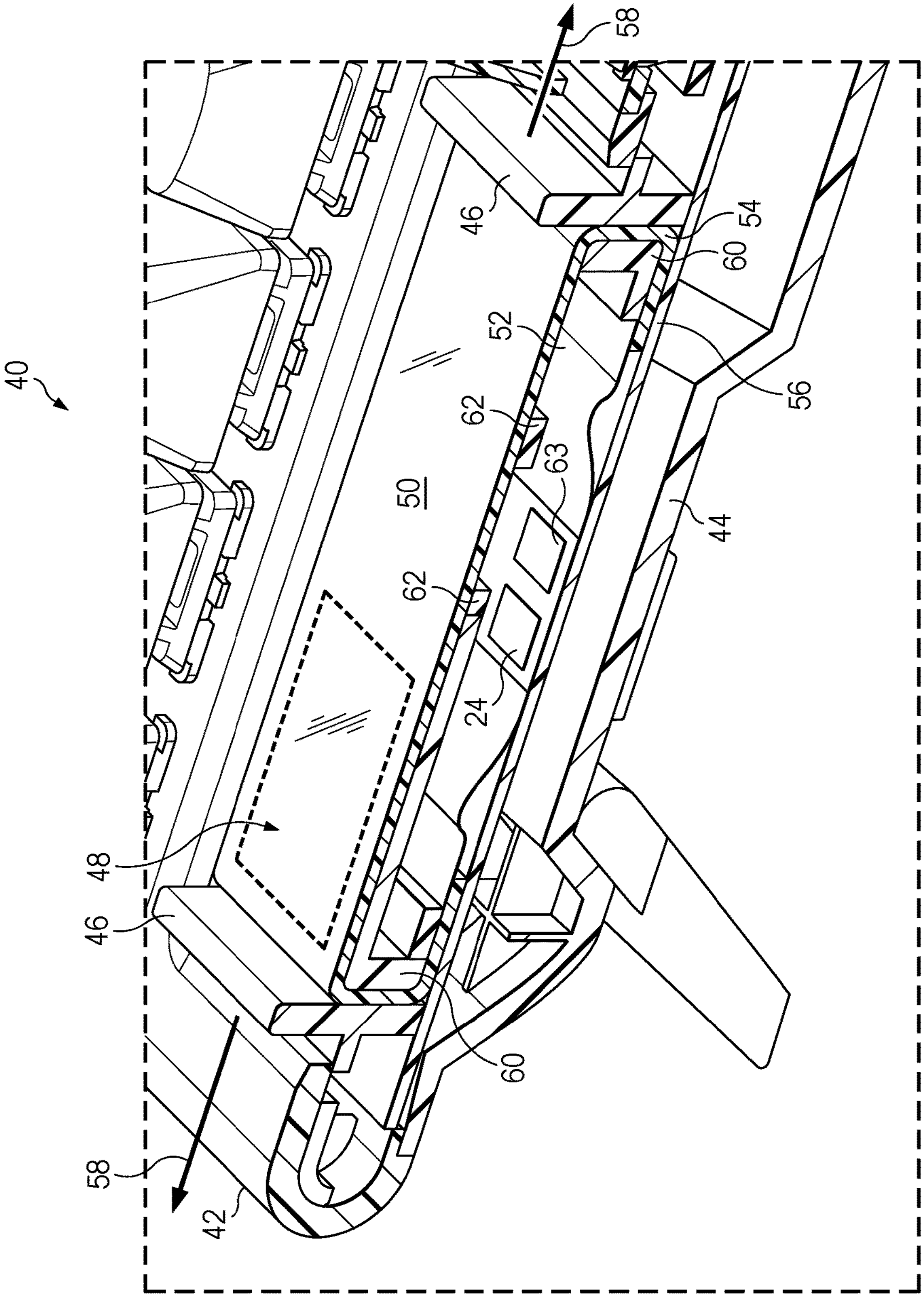

FIG. 2A depicts an upper perspective cutaway view of control pad 40 installed on an upper surface of a keyboard housing 44. A PDMS film 48 having stretchable characteristics and integrated silver electrode wires 50 couples at each of opposing ends by a flat cable 52 to an underlying circuit board 56. Each end of film 48 couples around a handle frame 54 and capture by a brace 60 with supports 62 coupled to circuit board 56 under film 48. A processing resource 63, such as an MCU, couples to circuit board 56 and includes non-transitory memory that stores instructions for interpreting capacitance of the electrode pattern in response to end user interactions as described in greater detail below. Handle frames 54 slide laterally relative to keyboard housing 44 within a space defined by keyboard cover 42 so that an end user can stretch film 48 as indicated by arrows 58 to command an input sensed by the film. In addition, compression of film 48 at handle frames 54 causes a fold in the film from a lack of tension, which also commands an input when sensed by the processing resource. Processing resource 63 interprets interactions at film 48 as analog values that are translated to digital inputs communicated from the keyboard to an information handling system. In one example embodiment, control pad 40 is built as a subassembly and installed on the keyboard top cover with the flat cables coupled to the keyboard main circuit board. Alternatively, control pad 40 is a separate subassembly attached to the keyboard upper surface and interface to the keyboard main circuit board through a cable.

Figure 2B:
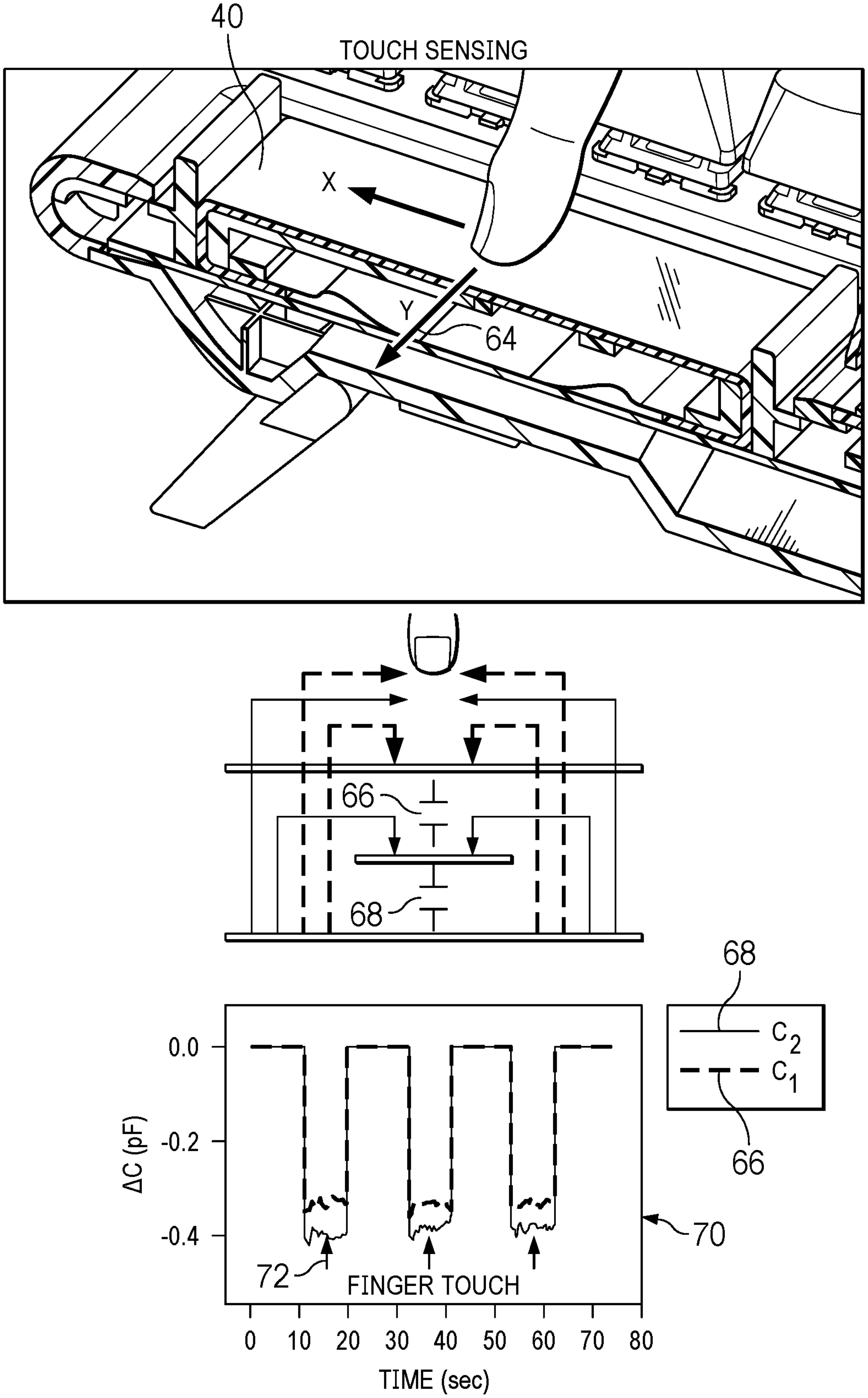
Figure 2C:
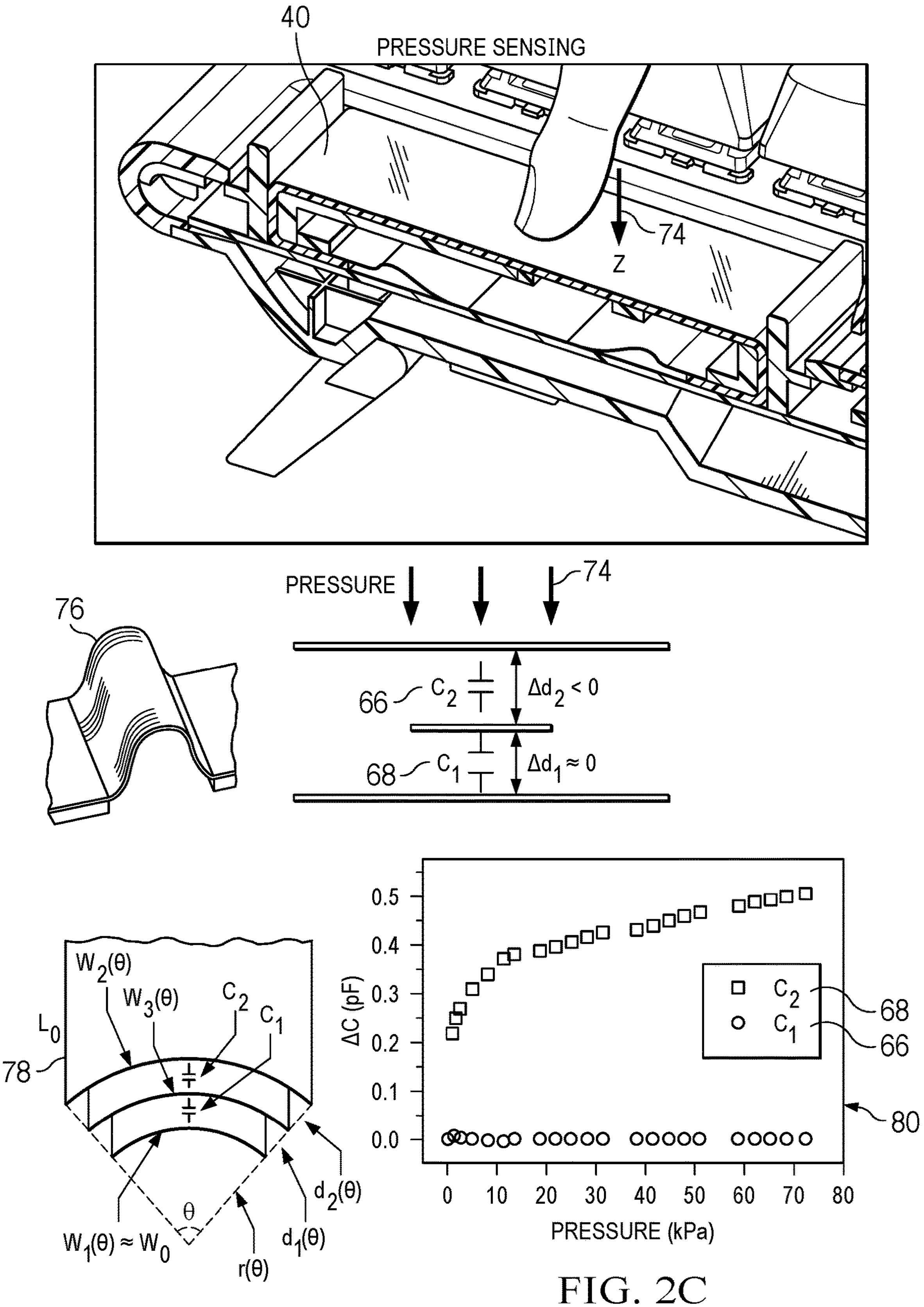
Figure 2D:
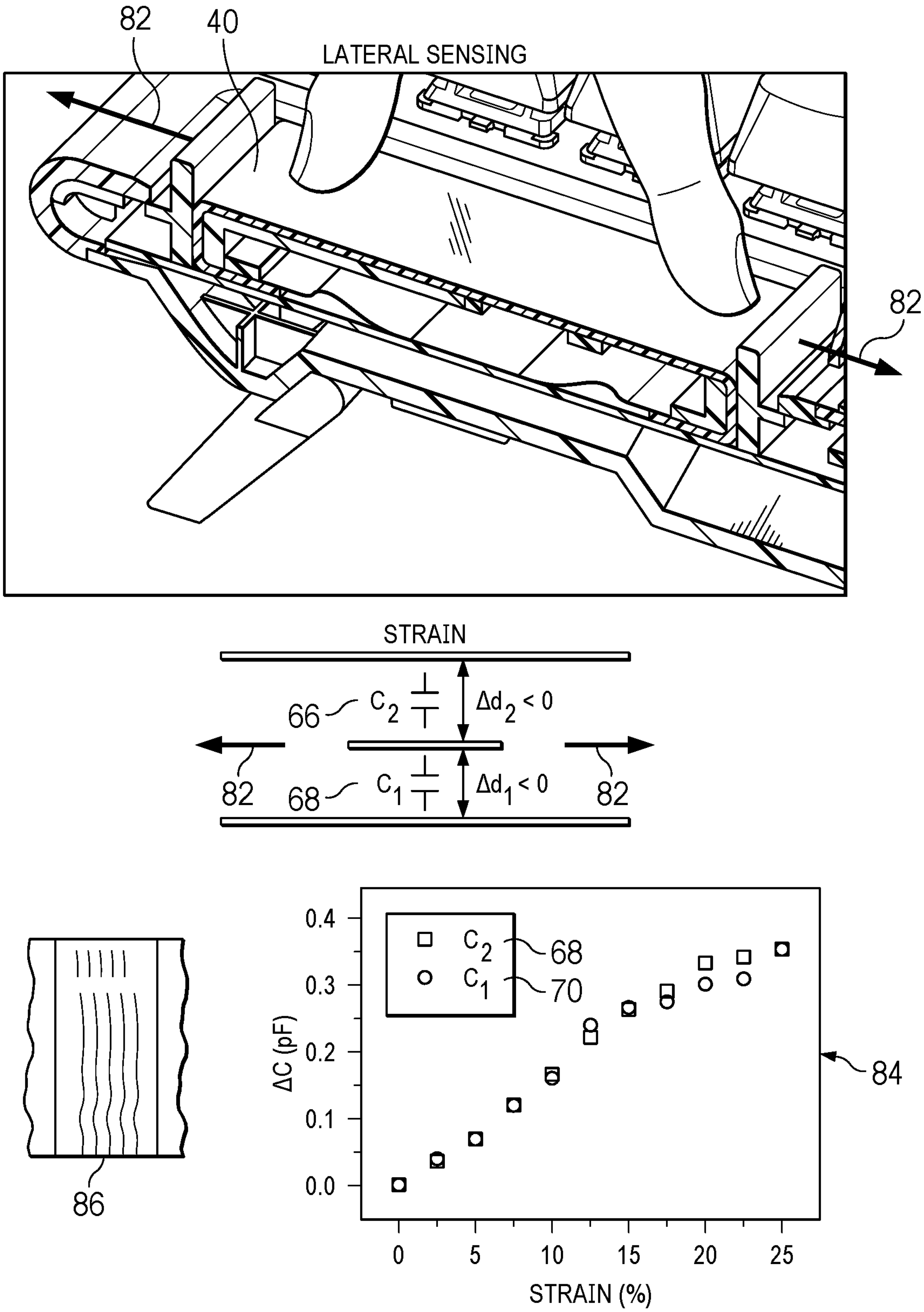

FIGS. 2B through 2D depict examples of inputs accepted by control pad 40 for communication to an information handling system. The inputs are available for applications to apply as desired, such as a spaceship direct control or a gaming weapon. FIG. 2B depicts swipe touch inputs in the X and Y directions as indicated by arrows 64. Touch capacitance at an upper capacitor 66 and a lower capacitor 68 will have different measurement due to different distances as indicated by graph lines 70 and 72. The amount of difference is compared with an expected difference for a swipe and reported by the processing resource as such. FIG. 2C depicts an example where a press is performed at the film that stretches the film in the Z axis as indicated by arrow 74. The fold formed in the film compresses the upper capacitor layer 66 and stretches the lower capacitor layer 68 as indicated by side view 76 and 78 based upon the relative circumference of the film at the press. As depicted by chart line 80, the capacitance of the stretched capacitor layer will have a higher value, indicating to the processing resource which layer has the greater circumference due to the fold, such as press down or an upward fold that might result from compression at the side handles. The fold of the film provides an analog pressure sensing with the delta value between top and bottom capacitance translating in Z axis movement so that the analog output can be digitized and communicate to an information handling system for precise end user control. FIG. 2D depicts an example where a stretching force as been applied to the film as indicated by arrows 82. An analog strain sensing is provided as the film stretches due to pressure applied at the handle frames to strain the film evenly so that equal increases in the capacitance values are affected, as illustrated by stretched film 86 and chart line 84. A continuous analog input is captured by the processing resource to provide a digitized control value to the information handling system.

Figure 3:
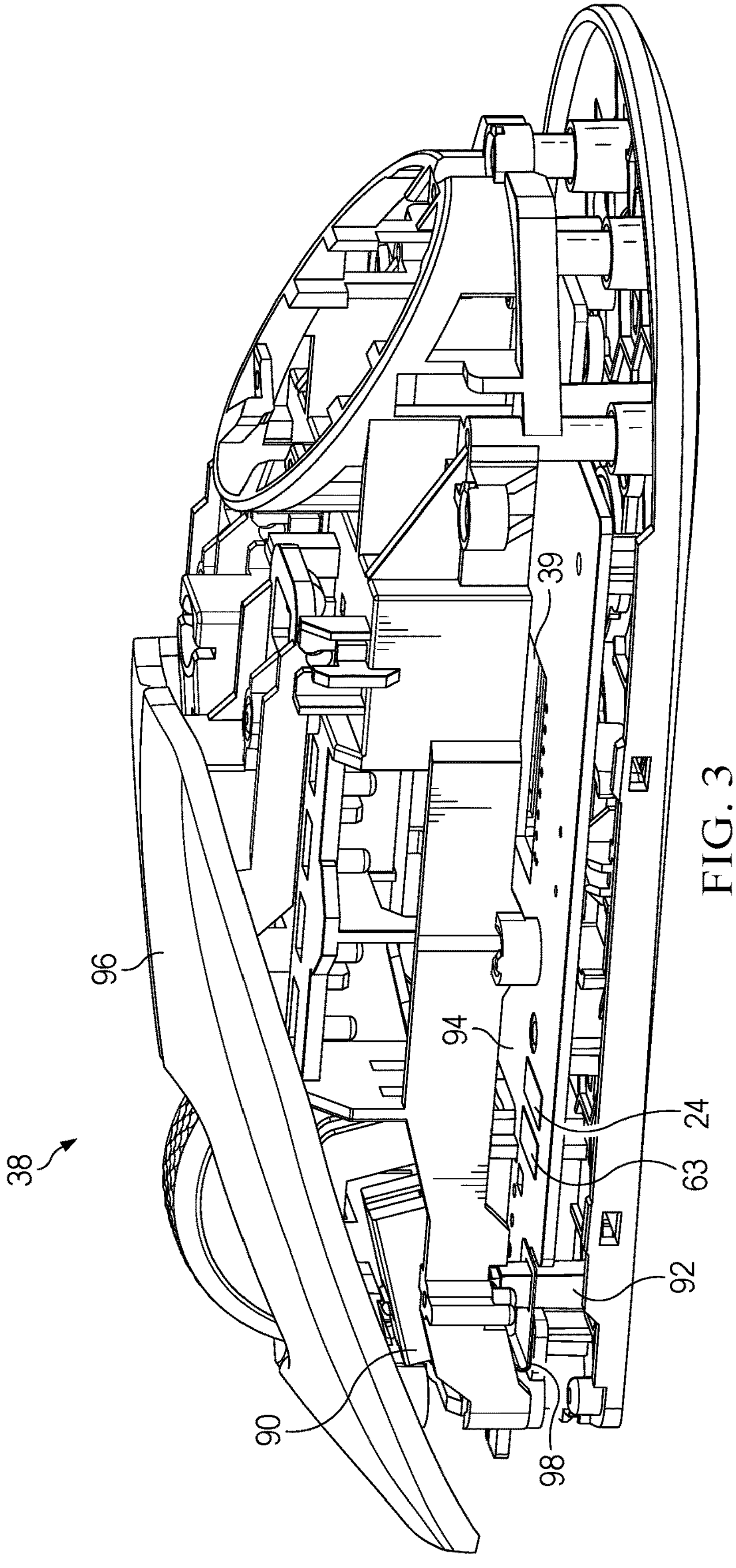
FIGS. 3, 3A, and 3B depict a side cutaway view of a mouse having an analog trigger to extend an input range associated with a mouse button click.
Figure 3A:
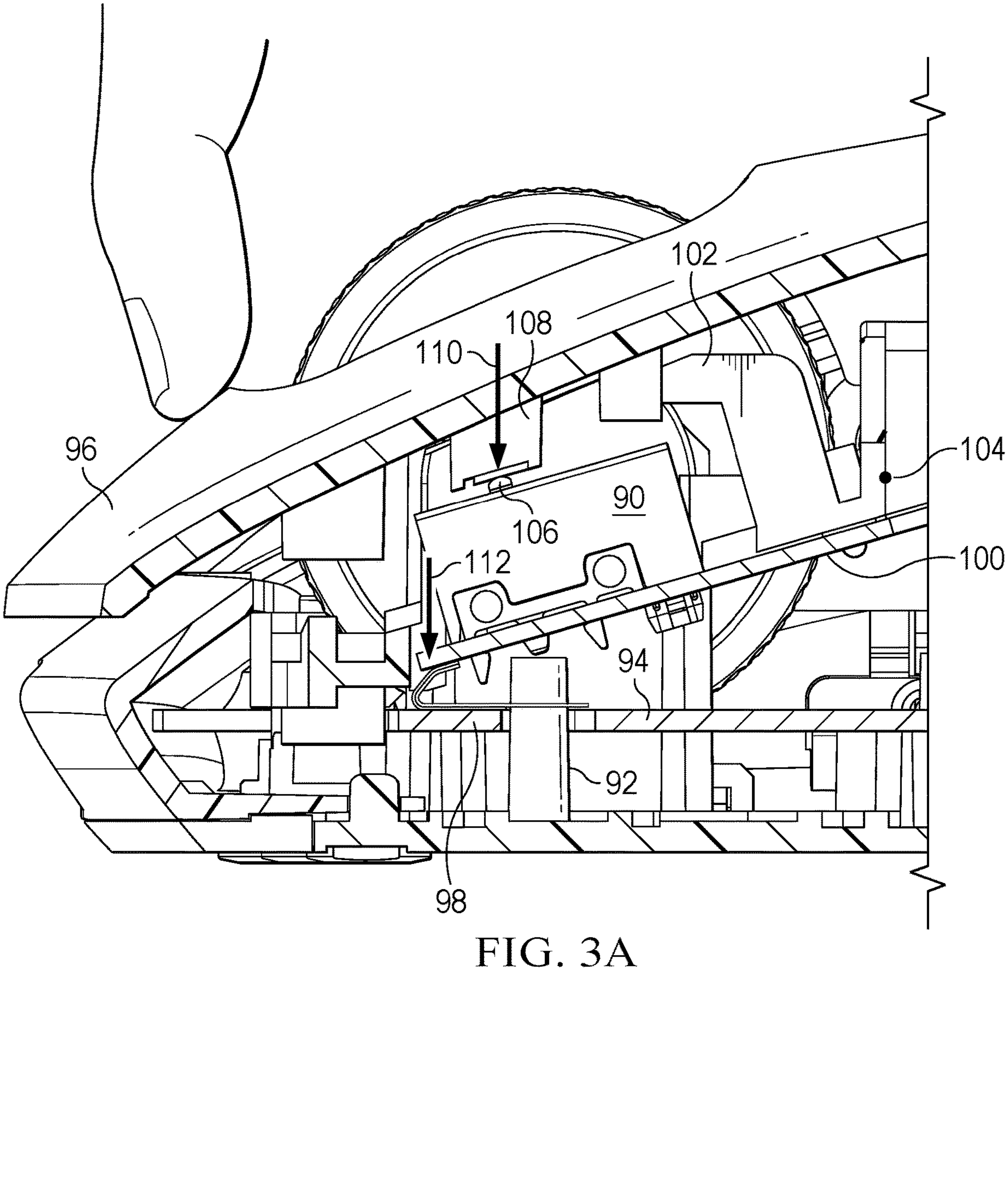
Figure 3B:
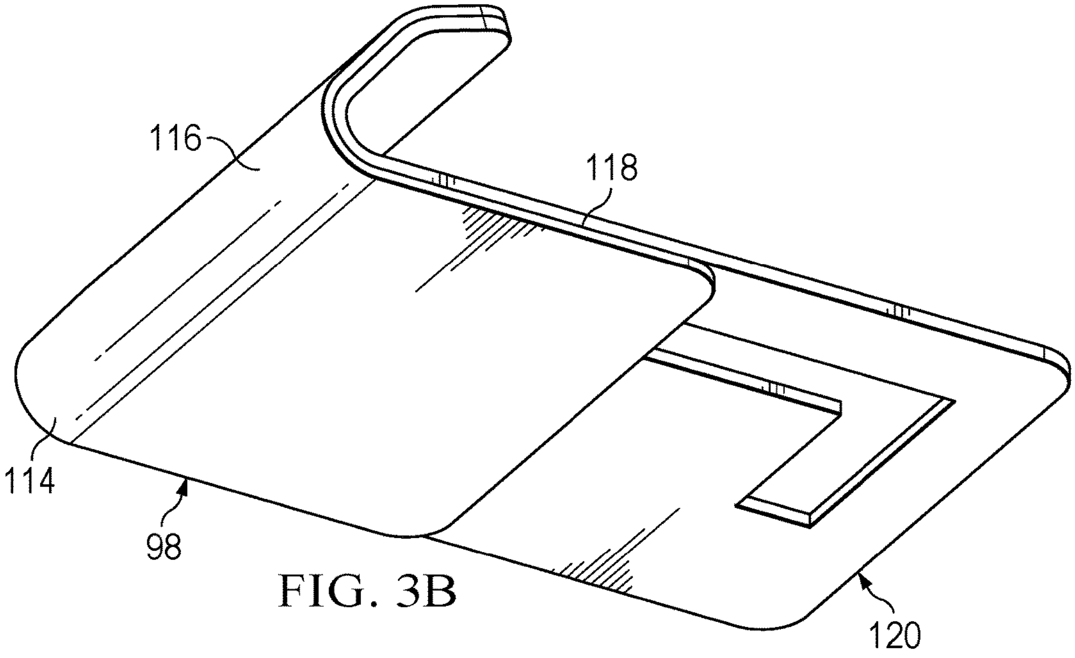

Referring now to FIGS. 3, 3A, and 3B, a side cutaway view of a mouse 38 depicts an analog trigger to extend an input range associated with a mouse button click. Mouse 38 tracks positions with a position sensor 39 coupled to a main circuit board 94 and reports the positions through a radio of a WNIC 24 to an information handling system. The positions are reported so that a mouse cursor presented on a display of the information handling system moves responsive to mouse movements. An input button 96 at the upper surface of mouse 38 accepts button push inputs with a downward push to activate a microswitch 90, which clicks to record and report to the information handling system a single mouse click input. Once mouse button 96 activates the mouse click, a continued pressure on the mouse button presses against a pressure sensor 98, such as PDMS film as described above, detects the additional pressure of the press as an analog input proportional to the amount of strain applied and digitizes the analog values to report to an information handling system as an input. Travel of the mouse button 96 is limited by a stop 92 once a full analog input is made. In the example embodiment, the pressure sensor is a PDMS film with vertically stacked capacitor layers and coupled to a spring. In alternative embodiments, other types of pressure sensors may be used.

FIGS. 3A and 3B depict a detailed view of one example embodiment of a pressure sensor that detects mouse button presses after a click input is sensed. As indicated by the arrow 110, a downward press of button 96 translates through member 108 to push a detent switch 106 into microswitch 90 to register an input. The input is communicated as a single button click through a microswitch circuit board 100 to the processing resource of the main board to report to the information handling system. As the press on button 96 continues, a movement as indicated by arrow 112 rotates microswitch circuit board 100 about pivot 104 by engagement of a cantilever 102 with mouse button 96. Rotation about pivot 104 depresses microswitch circuit board 100 towards stop 92 working against a bias of a leaf spring in pressure sensor 98 that works against the downward movement of microswitch board 100. FIG. 3B depicts a detailed view of pressure sensor 98 having a steel leaf spring 120 with PDMS film 114 coupled to it and including silver capacitor traces 116 that interface with a circuit contact 118. As is described above with respect to the keyboard contact pad, the PDMS film includes silver electrodes that define first and second layers of capacitors to detect strain when flexing of the spring changes the radius around the vertically stacked capacitor layers. As a press on the spring changes the amount of flex of the spring, an analog signal is generated that represents the amount of pressure applied. As an example, the mouse button press can act as a car accelerator to go faster and slow based upon how much pressure is applied against the mouse button. The rotation of the microswitch board towards the main board provides the pressure without working undue force against the microswitch and while keeping the microswitch input pressed so that only a single input is detected.

Figure 4:
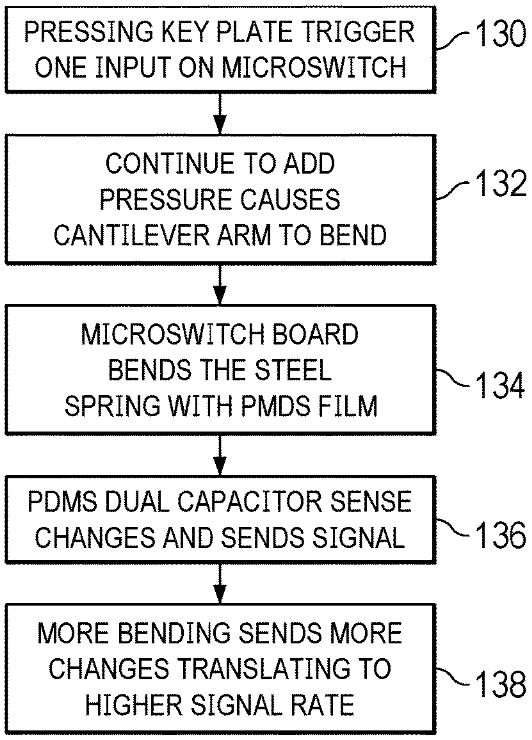
FIG. 4 depicts a flow diagram of a process for managing a mouse analog trigger having an extended input range associated with a mouse button click.

Referring now to FIG. 4, a flow diagram depicts a process for managing a mouse analog trigger having an extended input range associated with a mouse button click. The process starts at step 130 with a press on the mouse button key plate to trigger a single click input with the microswitch. At step 132 a continued press adds pressure to the mouse button and causes the cantilever arm to bend so that the microswitch board rotates downward towards the main board. At step 134 the microswitch board rotates down to bend the steel spring having the PDMS film and integrated capacitor silver wire electrodes, generating strain on the film. At step 136, the PDMS film dual layer of capacitors senses the change in capacitance related to the strain and sends an analog signal having a magnitude proportional to the strain. At step 138, more bending of the spring due to increased pressure from the button translates to a greater analog signal, which results in a higher digitized signal rate for the input communicated to the information handling system.

Figure 5:
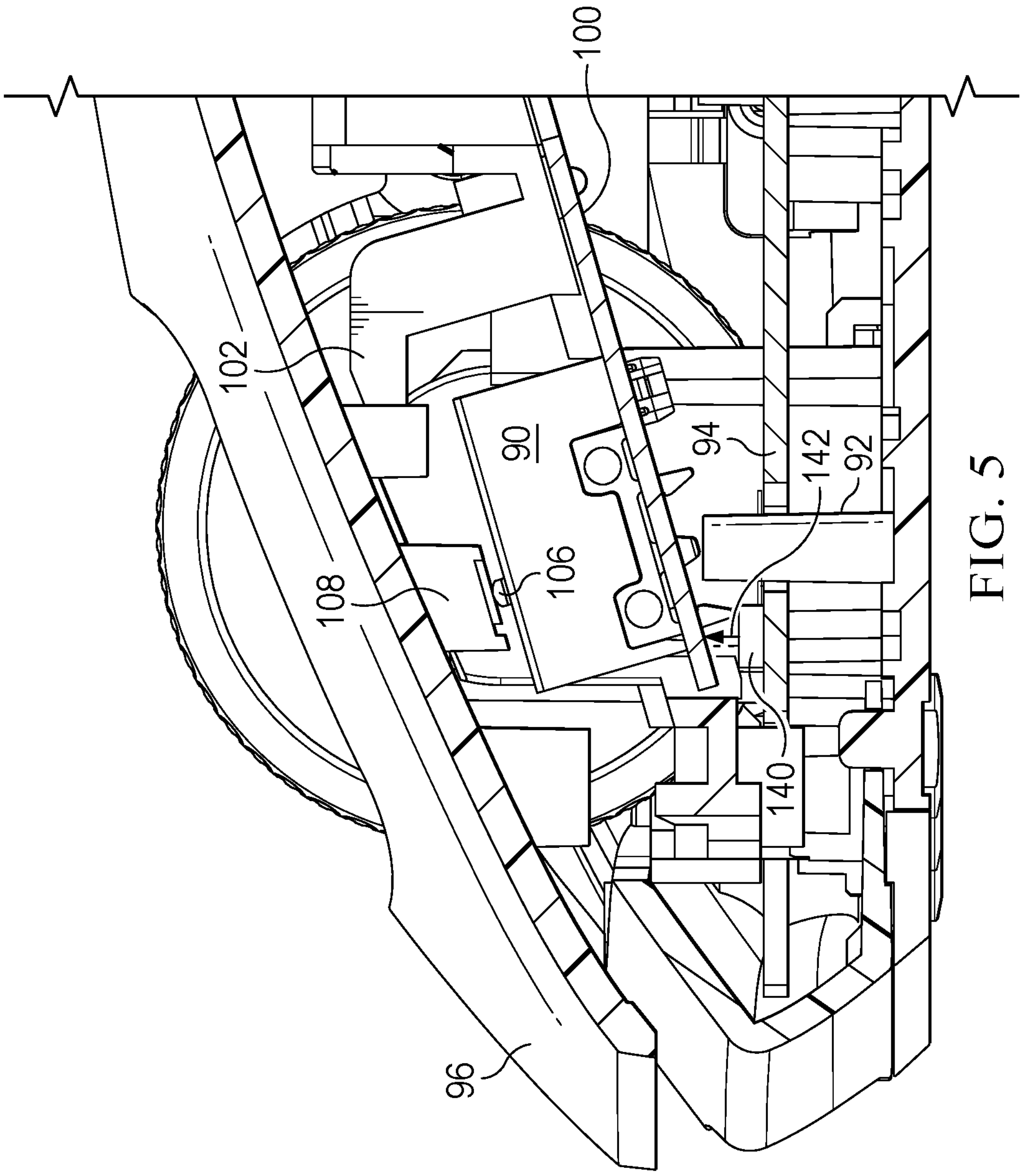
FIG. 5 depicts an alternative embodiment of a pressure sensor to support an analog trigger to extend an input range associated with a mouse button click.

Referring now to FIG. 5, an alternative embodiment depicts a pressure sensor to support an analog trigger to extend an input range associated with a mouse button click. In the alternative embodiment, a cantilever arm 102 couples to microswitch 90 microswitch circuit board 100 to engage mouse button 96 when an end user press reaches a mouse click input press depth. Additional pressure on mouse button 96 after the mouse click works through cantilever arm 102 to rotate microswitch circuit board 100 towards main circuit board 94 until stop 92 prevents further rotation. A spring similar to that used in the PDSM film pressure sensor or at the cantilever arm works against the downward press of microswitch circuit board 100 towards main circuit board 94 so that a predictable pressure resists mouse button depression. A time of flight sensor 140, such as an infrared sensor that emits infrared light and measures reflection, detects a distance to microswitch circuit board 100 and associates reduced distance with increased pressure that is communicated as an analog input to an information handing system. In one embodiment, the analog input is only provided when the microswitch detects a press. For instance, the time of flight sensor is powered off unless a mouse click is detected, powered on while the mouse click is detected, and powered off when the mouse click is released. In another embodiment, the stop 92 may have a switch to detect a full depression and in response provide a full press input to the information handling system. In alternative embodiments, other types of arrangements may measure the amount of rotation of the microswitch circuit board, such as a rotation sensor or a plunger coupled between the microswitch circuit board and the main circuit board.

Figure 6A:
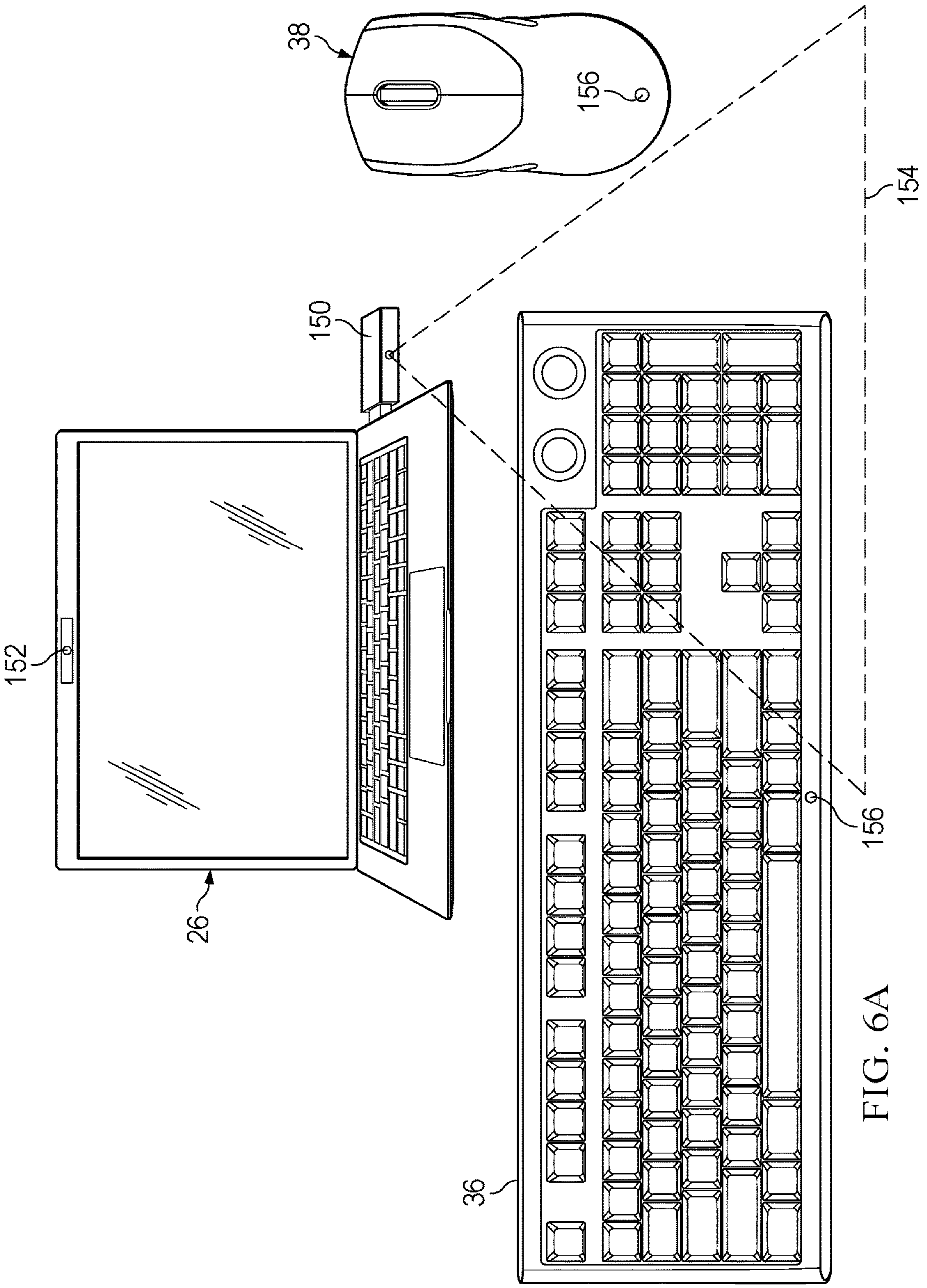
FIGS. 6A, 6B and 6C depict an information handling system that interacts with a keyboard and/or mouse peripheral to manage low power states with a thermal proximity sensor.
Figure 6B:
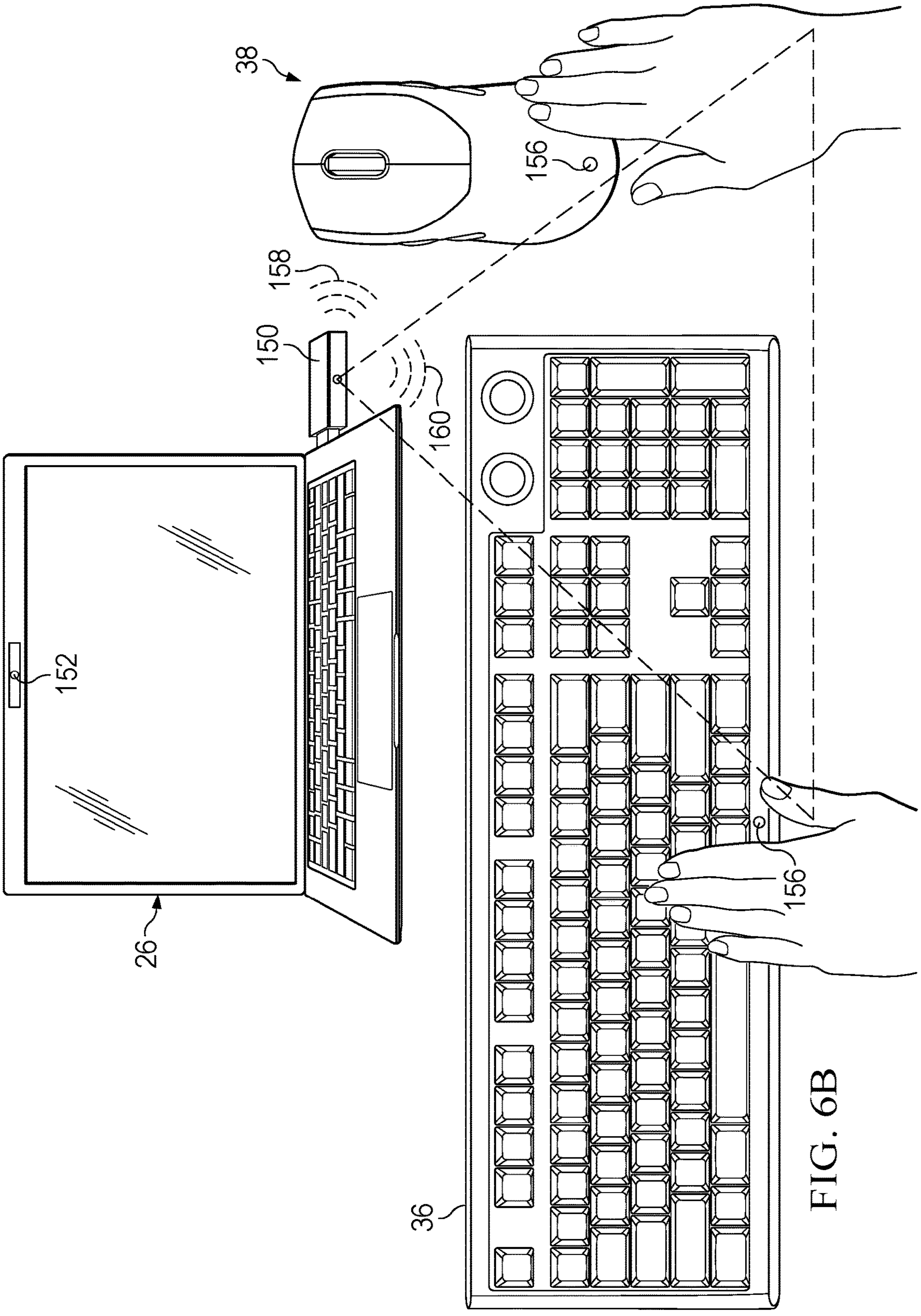
Figure 6C:
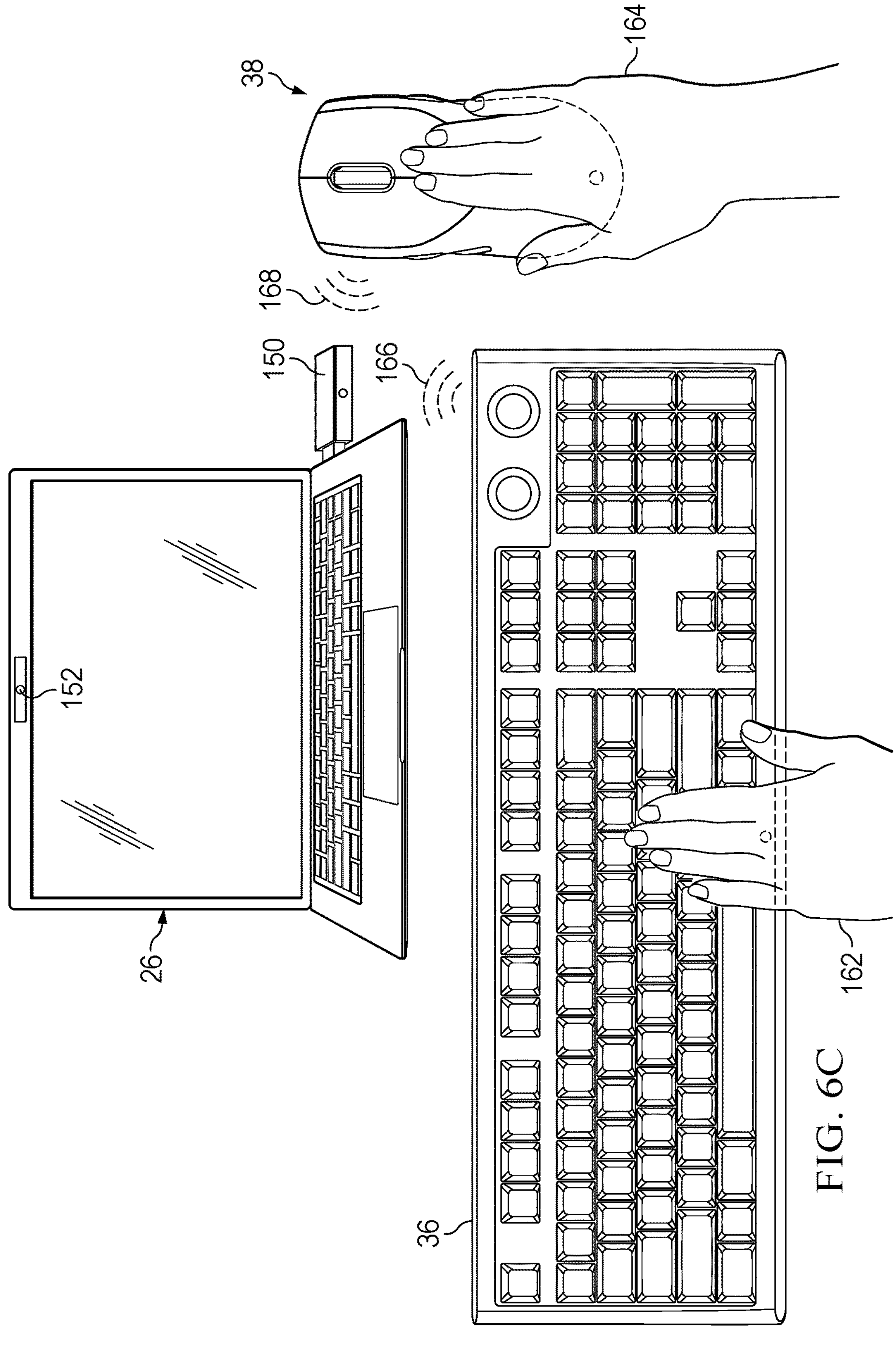

Referring now to FIGS. 6A, 6B and 6C, an information handling system 26 interacts with a peripheral keyboard 36 and/or mouse 38 peripheral to manage low power states with a thermal proximity sensor 156. In the example embodiment, thermal proximity sensor is a passive infrared image sensor that detects a thermal signature associated with end user presence, such as through an opening in a housing of the keyboard and mouse. For example, an STHS34PF80 TMOS has a CMOS based MEMS architecture that senses infrared energy in the 5 to 20 micrometer spectrum with a low power consumption. As an end user hand approaches peripheral keyboard 36 and mouse 38, such as to type or grasp, thermal sensor 156 detects thermal energy of the hand through an opening in the keyboard and mouse housings and responds to a predetermined level of thermal energy sensed as infrared light by issuing a GPIO to wake the processing resource or other resources of the mouse and keyboard. With the thermal sensors installed on the peripheral device, power consuming components of the peripheral device may be shut off completely to reduce power consumption to an absolute minimum. Further, different components may wake at different external conditions so that power consumption is minimized as much as possible while peripheral wake time is also minimized to reduce disruption to an end user who initiates interaction with a peripheral. In one embodiment, a proximity sensor of the information handling system 10 monitors for end user presence and absence so that, when user presence is detected a wake signal is sent to the peripheral to wake the thermal sensor. Once wakened, the thermal sensor provides a low power monitoring for end user touch proximity to detect the end user hand as the hand approaches the peripheral and wakes the peripheral just in time for use. For example, a thermal sensor in a mouse wakes the position sensor when an end user hand comes into proximity so the mouse is ready to detect position changes. As another example, a thermal sensor in a keyboard wakes the keyboard processing resource when the end user hand comes into proximity to accept key inputs. In various embodiments, power consumption and peripheral readiness are balanced through the use of thermal sensors at various stages of waking and sleeping the peripheral.

FIG. 6A depicts the example portable information handling system 26 having an integrated camera, integrated WNIC with BLUETOOTH, a wireless dongle 150, a wireless peripheral keyboard 36 and a wireless mouse 38. In the example embodiment, wireless dongle 150 includes a user presence sensor integrated in it that detects end user presence, such as an infrared time of flight sensor having an infrared time of flight beam 154 that detects when an end user is in the field of view. In alternative embodiments, user presence may be detected by camera 152, which can include an active infrared time of flight sensor. When portable information handling system 10 is powered up, camera 152 or the user presence sensor of dongle 150 monitor the area in front of the information handling system to detect when an end user is positioned to interact with the end user. When user non-presence is detected, the peripheral devices power down to an idle state having the WNIC set to monitor for a wake signal so that power is reduced to minimal consumption. When user presence is detected by portable information handling system 26 or dongle 150, a wake signal is set to the peripheral devices. For example, dongle 150 executes local logic that detects user presence with an integrated time of flight sensor and in response sends a wake signal from a radio within the dongle. As another example camera 152 detects user presence and sends a wake signal from dongle 150 or from an integrated WNIC radio having a BLUETOOTH interface with the peripherals.

Peripheral keyboard 36 and mouse 38 respond to the wake signal by powering up the thermal sensor to monitor for end user presence as depicted in FIG. 6B. When the thermal sensor powers up, the WNIC radio within the keyboard and mouse may be powered down to reduce power while the thermal sensor is monitoring for end user interaction with the peripheral devices. Wireless signals 160 and 158 from dongle 150 wake the thermal sensor 156 so that the keyboard and mouse monitor for end user hand presence proximate the keyboard and mouse through an opening in the housing of the keyboard and mouse. In an alternative embodiment, a WNIC in portable information handling system 26 may wake the peripherals with a BLUETOOTH signal. FIG. 6C depicts that the end user hands 162 and 164 have come into proximity with the keyboard and mouse resulting in a wake of the peripherals and a radio signal 166 from keyboard 36 and a radio signal 168 from the mouse 38 to dongle 150 or the WNIC in portable information handling system 26. When the thermal sensor wakes the peripheral to activate the peripheral radio, the thermal sensor can then return to sleep to reduce peripheral power consumption while in active use. The thermal presence detection helps to ensure that the peripheral is prepared for use by the time the end user places a hand on the peripheral and activates use. For instance, the thermal sensor wakes the position sensor of the mouse to detect positions as soon as the end user hand initiates use so that the position sensor becomes the user presence sensor. Similarly, the thermal sensor activates the keyboard WNIC and processing resource to accept key inputs as soon as the end user hand is in position so that a key input becomes the user presence sensor. Power management then remains with the active processing resource until the peripheral device returns to a low power state.

Figure 7A:
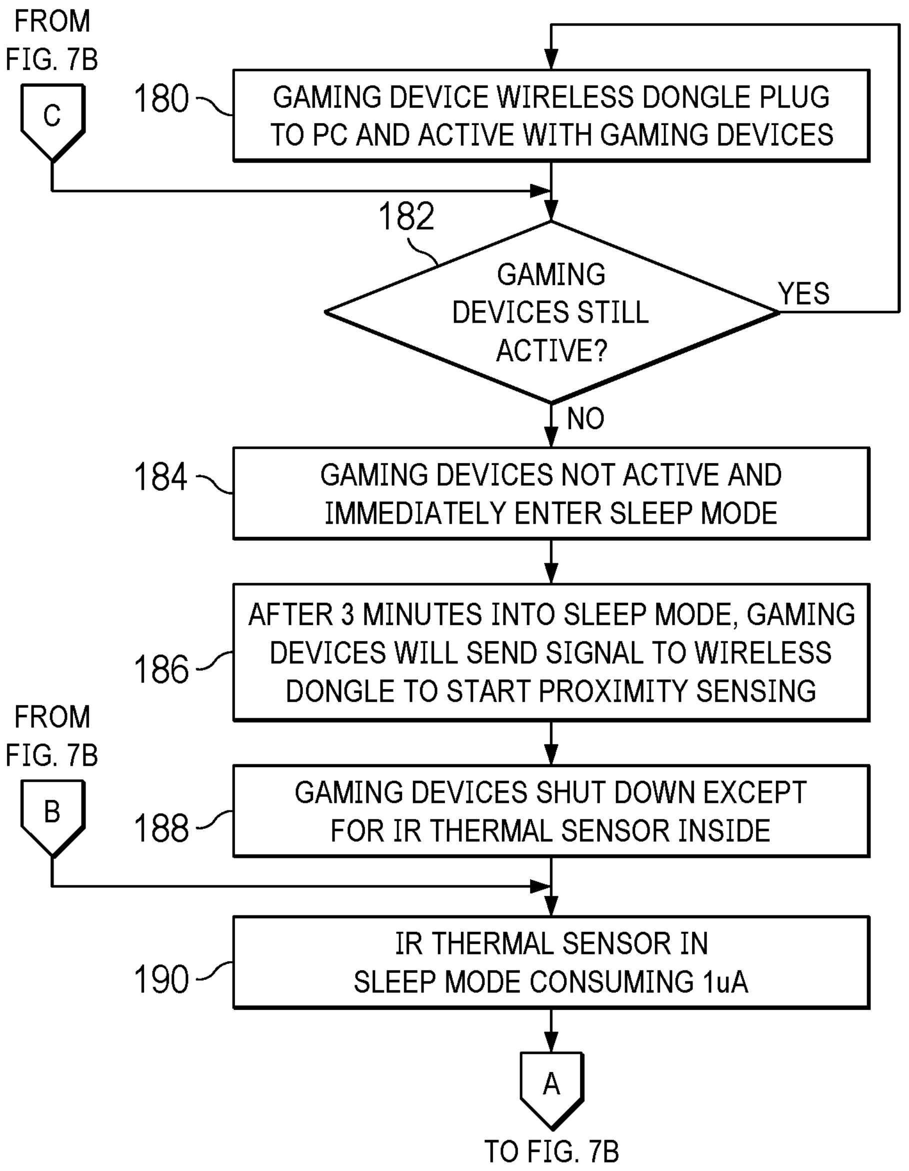
FIGS. 7A and 7B depict a flow diagram of a process for managing information handling system power consumption in a low power state.
Figure 7B:
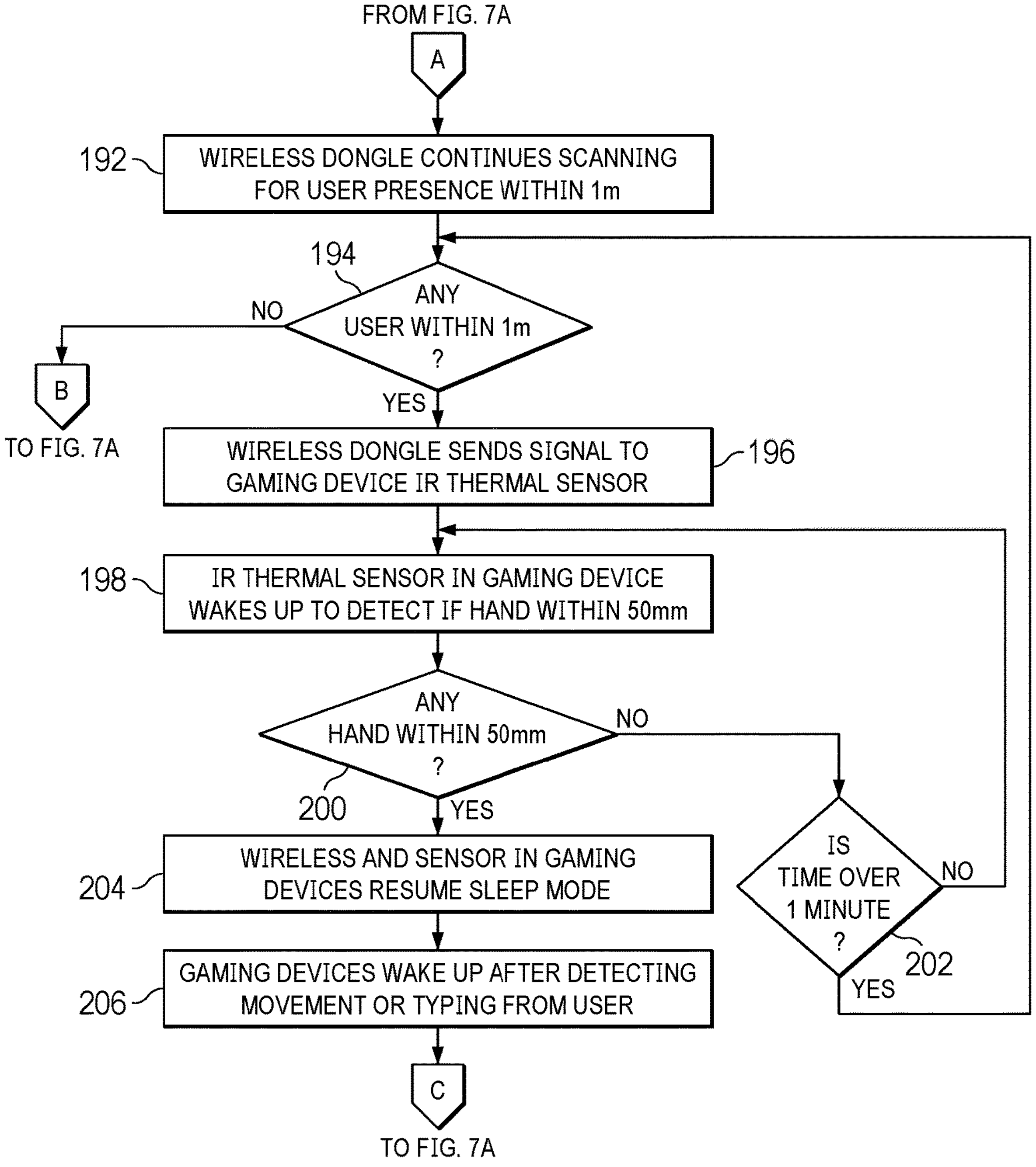

Referring now to FIGS. 7A and 7B, a flow diagram depicts a process for managing information handling system peripheral power consumption in a low power state, such as a keyboard and mouse sleep power management. The process starts at step 180 with a gaming device wireless dongle plugs into an information handling system port, such as a USB port. The wireless dongle operates to communicate wirelessly with the peripheral devices and performs a periodic check at step 182 to determine if the gaming device peripheral is active. When the peripheral is no longer active, such as when idle with respect to end user interactions for a predetermined time, the process continues to step 184 to place the gaming peripheral device in a sleep mode. For instance, a mouse might enter a first sleep mode having the position sensor active to wake the remainder of the mouse when a change in position is detected. At step 186, after a three minute timeout in the sleep mode, the gaming peripheral device sends a signal to the wireless dongle or the information handling system WNIC to start proximity sensing. At step 188, the gaming peripheral device shuts down except for the thermal sensor, which monitors for end user hand proximity. In one alternative embodiment, the thermal sensor may also power down when no end user is in proximity to be awakened by a radio command when an end user is detected by the proximity sensor. At step 190 with the passive infrared thermal sensor in a sleep mode rather than monitoring for end user proximity, power consumption is reduced to one microamp. At step 192 the user presence detection in the wireless dongle scans to detect a user presence within 1 meter. Alternatively, the user presence detection may be performed from the information handling system. When no user is present, the process returns to step 190 to continue scanning. When a user presence is detected at step 194, the process continues to step 196 to send a radio command from the dongle to the peripheral. The radio command to wake the thermal sensor from the sleep mode provides a more rapid return to an operational state for the peripheral.

At step 198, the passive infrared thermal sensor in the gaming peripheral device wakes up to detect if a hand is within 50 mm of the peripheral, such as approaching the top cover of a mouse or a typing position on a keyboard. If no user presence is detected, the process continues to step 202 to check a timer. When the timer is over a minute, the process returns to step 194 to check if a user is within a meter. If the timer at step 202 is less than a minute, the process returns to step 198 to check for user presence with a passive infrared thermal profile. When at step 200 a user hand is within 50 mm of the thermal sensor, the process continues to step 204 to wake the wireless radio and the sensor of the gaming peripheral device from the sleep mode, such as waking a mouse position sensor and WNIC. In one example embodiment, when the position sensor is awoken, the thermal sensor transitions to a sleep state and the position sensor is then used to detect an end user interaction. At step 206 the gaming peripheral device wakes up when a movement or a typed input is detected. At step 182, the gaming peripheral device then operates in an active mode monitoring for sleep parameters as described above. Essentially, a handoff is made of sleep management between a radio in a low power receive mode, a thermal sensor that takes over when the radio receives a wake notice, and a position sensor that monitors for end user inputs. The parameters of each device are set with a processing resource that executes instructions to set the parameters before the mouse or keyboard enters sleep from an active mode.

Figure 8:
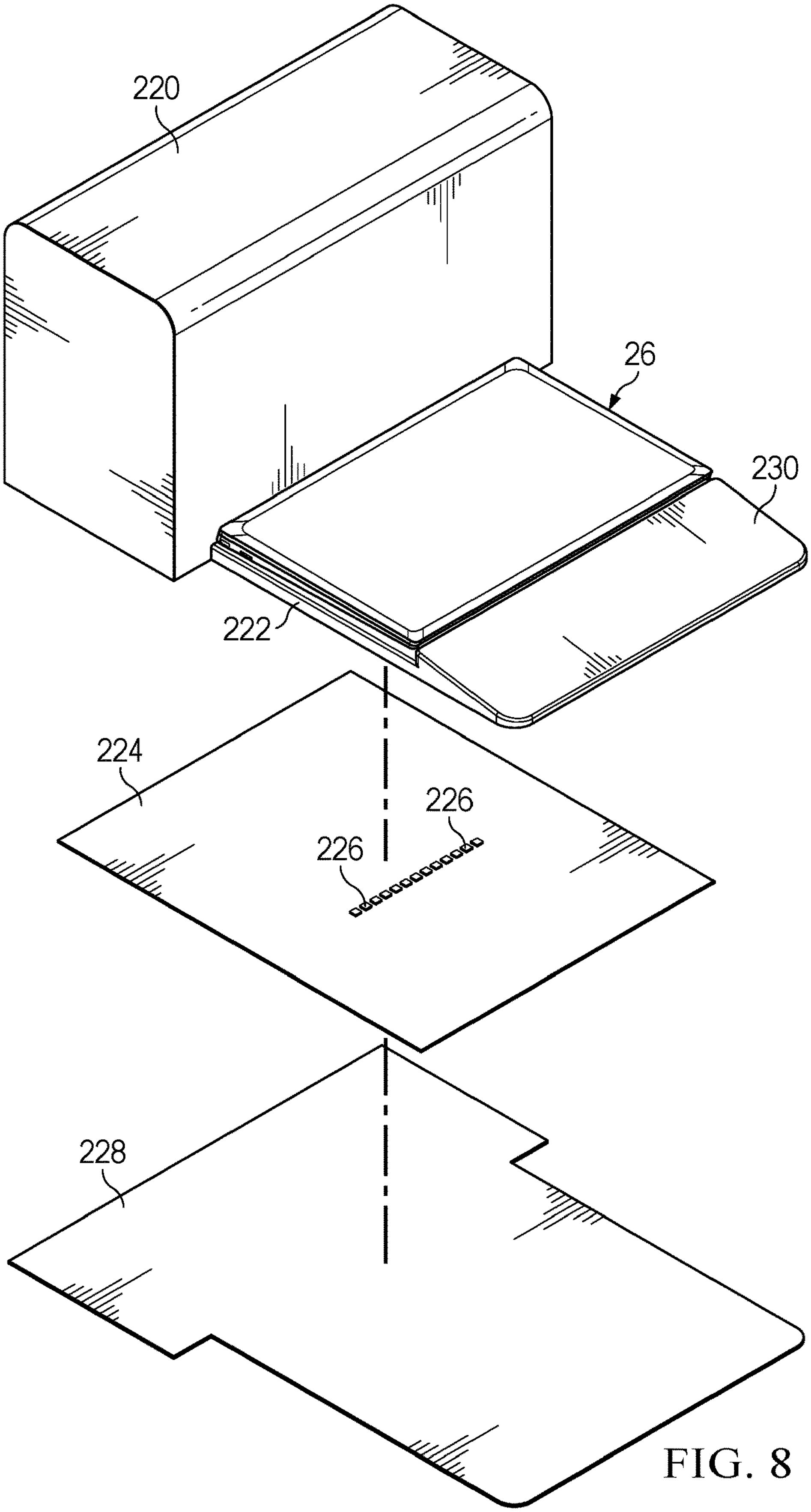
FIGS. 8 and 8A depict a graphics hub that provides PCIe communication bandwidth through plural contactless connectors that communicate in series.
Figure 8A:
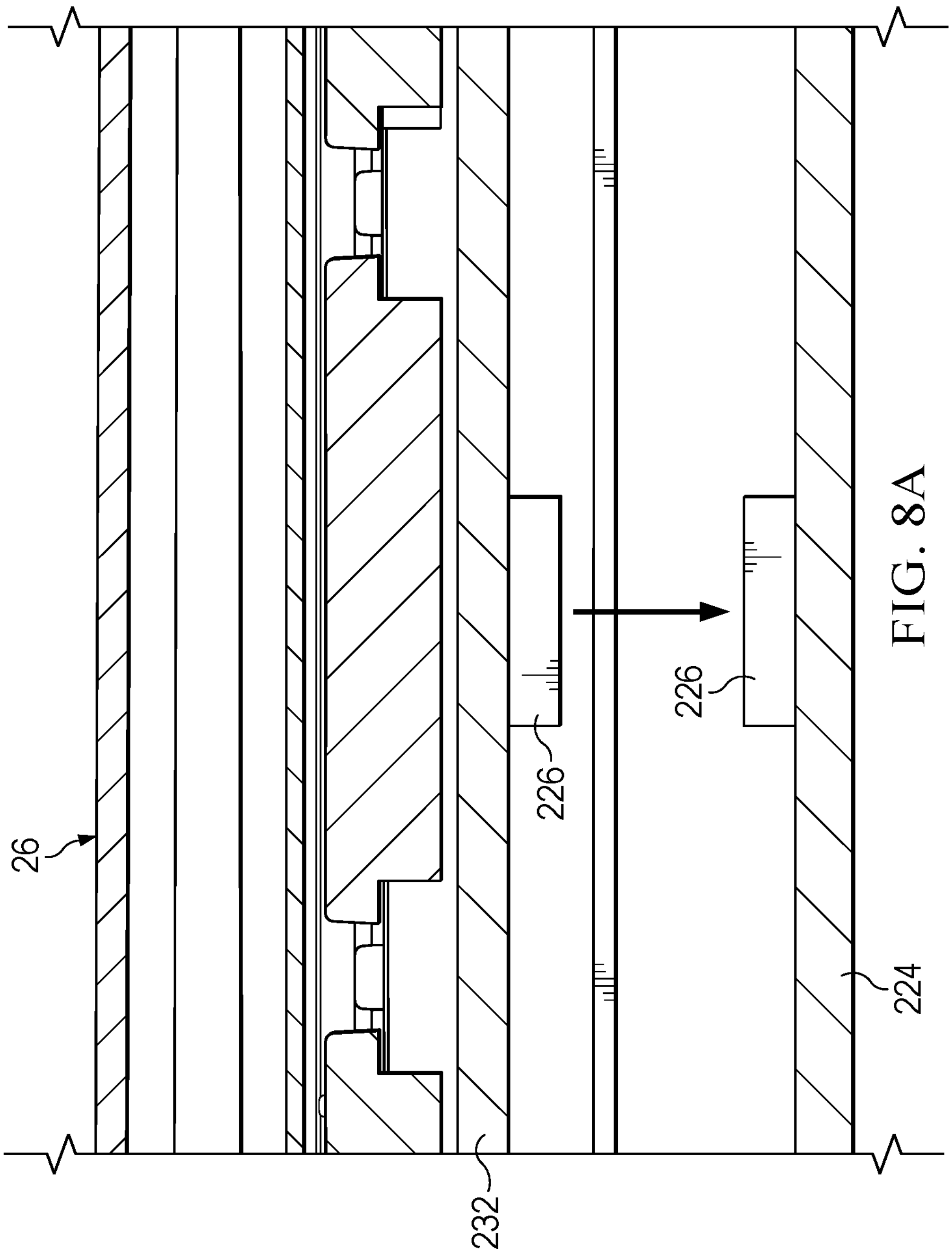

Referring now to FIGS. 8 and 8A, a graphics hub 220 is depicted that provides PCIe communication bandwidth through plural contactless connectors 226 that communicate in series. Graphics hub 220 is, essentially, a peripheral graphics processing unit (GPU) that accepts visual image information from an information handling system and processes the visual image information into pixel values that define visual images for presentation at peripheral displays. By offloading the graphics processing to a peripheral graphics hub, more powerful graphics processing becomes available than can typically be supported in a portable housing and improved thermal management of the larger peripheral hub housing 230 allows for greater power dissipation. However, the large quantity of visual image information involved in creating high quality and dynamic visual images can create a bandwidth bottleneck where the visual image information is communicated from the information handling system to the graphics hub. For instance, a PCIe V5.0 or greater bus within the information handling system and the graphics hub can communicate 80 Gbps of information, which exceeds the bandwidth of commercially available connectors and cables. To provide improved bandwidth between the information handling system and graphics hub, first and second sets of contactless connectors 226 are aligned that transmit the visual information in the 60 GHz band in series so that a cumulative bandwidth is available that exceeds the internal PCIe bus bandwidth. In the example embodiment, each of first and second sets of contactless connectors 226 transmit 6 Gbps of visual information so that 13 total contactless connectors in each set provides communication in series of the visual information without a bandwidth bottleneck.

In the example embodiment, graphics hub 220 housing and peripheral hub 230 has a planar docking surface 222 sized to accept portable information handling system 26 in a position that aligns the first and second sets of contactless connectors 226. A printed circuit board 224 supports a graphics processing unit (GPU) and extends from the interior of housing 230 outwards and under planar docking surface 222. A set of plural contactless connectors 226 couple to printed circuit board 224 to receive visual image information. For instance, the contactless connectors 226 of graphics hub 220 may be 60 GHz receivers with a range of approximately 1 cm and receiving bandwidth of 6 Gbps each, although one or more transceivers may also transmit to support a bi-directional auxiliary channel. A bottom surface 228 couples printed circuit board 224 in place so that the contact less connectors align with a position defined by the planar docking surface 222. FIG. 8A depicts a sectional view of information handling system 26 placed on planar docking surface 222 so that contactless connectors 226 built into the bottom surface of the information handling system motherboard 232 align in close proximity to the contactless connectors 226 of graphics hub 220. The contactless connectors 226 within portable information handling system 26 may have transmit only characteristics to transmit the visual image information from the information handling system to the graphics hub. Each set of plural contactless connectors interface with a PCIe V 5.0 or higher internal bus on the associated circuit board so that a seamless connection is provided by the contactless connectors in series between the PCIe bus of the physically separated circuit boards. In one embodiment, PCIe V 4.0 communication at 40 Gbps is supported with opposing sets of 8 contactless connectors in place of a Thunderbolt or similar cabled connection. The wireless connectors are, for example, a MOLEX MXS60 or KSS104M based radio.

Figure 9:
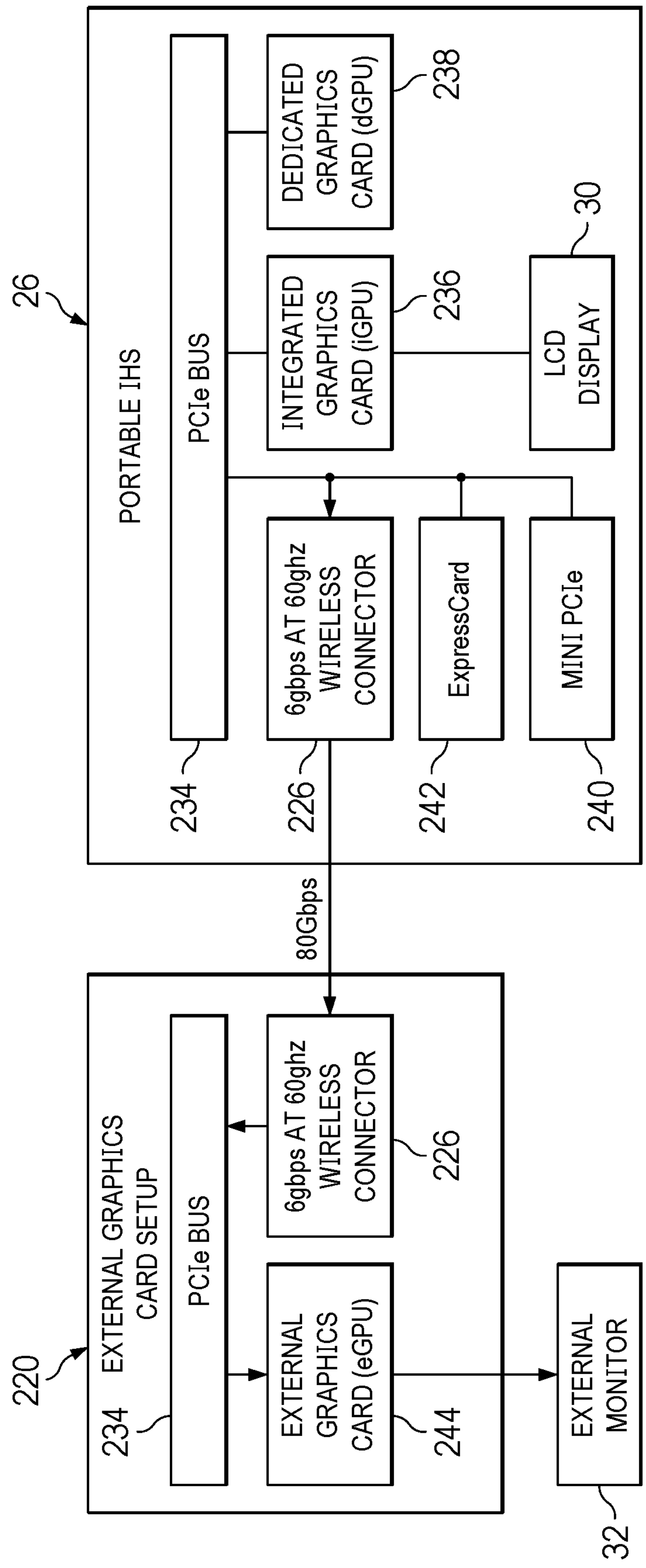
FIG. 9 depicts a block diagram of a graphics hub configured to communicate visual information from an information handling system PCIe bus through contactless connectors arranged in series and to a graphics hub PCIe bus.

Referring now to FIG. 9, a block diagram depicts a graphics hub 220 configured to receive communication of visual information from an information handling system PCIe bus 234 through contactless connectors 226 arranged in series and to a graphics hub PCIe bus 234. Portable information handling system 26 executes instructions that create visual information, such as a gaming application that defines movement of players in a virtual world. The visual information is communicated from a CPU through a PCIe bus 234 to a graphics processor. In portable use configuration, a dedicated graphics processor 238 can process the visual information for presentation at an integrated display 30 or a peripheral display coupled to portable information handling system 26. Alternatively, an integrated graphics card 236 receives the visual information from PCIe bus 234 and applies the visual information to generate visual images at integrated display 30. When an end user desires to have increased graphics capabilities, the end user can instead place portable information handling system 26 on graphics hub 220 to align a first set of plural contactless connectors 226 within portable information handling system 26 and a second set of plural contactless connectors 226 of graphics hub 220. In the example embodiment, each contactless connector provided 6 Gbps of bandwidth through 60 GHz wireless signal transmissions for a total bandwidth of 80 Gbps. The visual information is communicated in series to the graphics hub contactless connectors 226 and then PCIe bus 234, which provides the visual information to an external graphics card (eGPU) 244 that defines pixel values for presentation of visual images at peripheral display 32. In the example, 13 contactless connectors in each set of plural contact connectors align with a distance of less than one centimeter between each communicating pair to provide in series a cumulative bandwidth of 80 Gbps. In various embodiments, various configurations of contactless connectors and internal communication bus may be used to achieve a desired bandwidth and for communication of different types of data in addition to visual information as described by the example.

Figure 10:
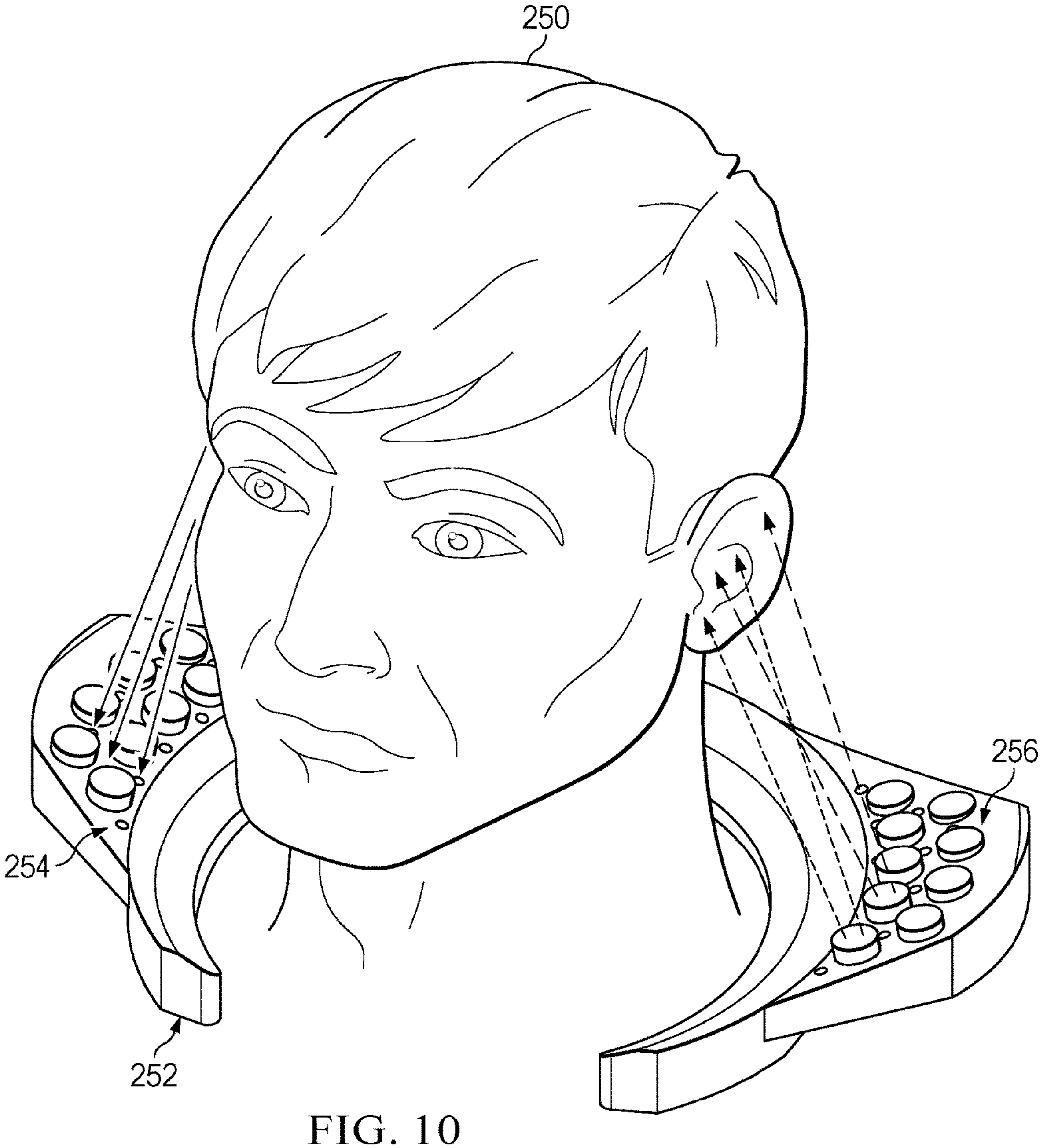
FIGS. 10 and 10A depict a side perspective view of an end user wearing a neck speaker device that provides audible sounds to the end user and also tracks the end user head position.
Figure 10A:
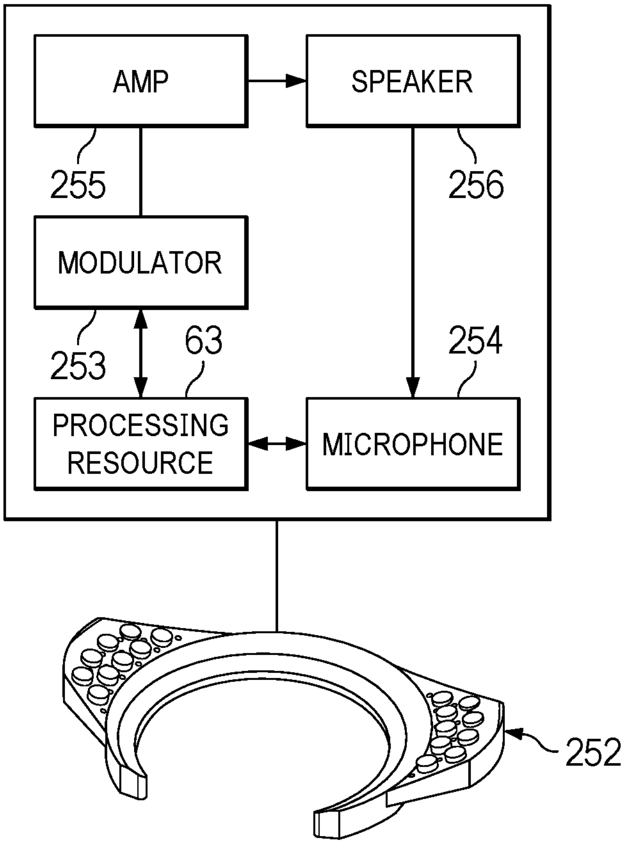

Referring now to FIGS. 10 and 10A, a side perspective view depicts an end user 250 wearing a neck speaker device 252 that provides audible sounds to the end user and also tracks the end user's head position. In the example embodiment, an array of ultrasonic parametric speakers 256 output ultrasonic sound waves with approximately a 40 KHz ultrasonic frequency that demodulates when it hits the end user's ear region to a lower frequency of around 17 KHz that is audible to the end user. The demodulated sound energy presents audible sounds to the end user with a focus on the ear position of the end user; while ultrasonic energy that does not impact the end user's ear region and dissipates without demodulation so that it is not heard by surrounding people. In addition to ultrasonic parametric speakers 256 directed towards each ear of the end user, an array of microphones 254 detects audible sounds that reflect from the end user's head after demodulation. As the end user's head moves relative to the neck speaker device 252, changes in the frequency phase of the reflected energy is captured by microphones 254 to provide an indication of head movement and position. Analysis of reflected audio captured by microphones 254 on each side of the head provides head movement direction and movement distance measurements, such as by Low Latency Acoustic Phase (LLAP) analysis. LLAP first extracts the sound signal reflected by the moving head or ear after removing background sound signals, and then measures the phase changes of the sound signals to convert the phase changes into distance of movement over time. For instance, a processing resource within neck speaker device 252 performs the analysis on captured reflected audio and sends the distance measurements to an information handling system. In one example embodiment, ultrasonic parametric speakers 256 may support head tracking by emitting ultrasonic sounds that create identifiable sound patterns more readily extracted from captured audio. For instance, the ultrasonic energy may demodulate outside of the audible frequency range for tracking and/or may be generated in pulses over time that have a short duration not detectable by an end user.

FIG. 10A depicts an example block diagram of components within neck speaker device 252 to generate audible sound and track head position movements. A processing resource 63, such as an MCU, executes instructions stored in integrated flash memory that generates the ultrasonic sound waves through a modulator 253, such as an STM32, that are amplified by an amplifier 255 and played by a speaker 256. Once the ultrasonic sound waves demodulate at impact with an end user ear or head, microphones 254 capture the audible sound energy and provide the phase information to processing resource 63, which performs the LLAP analysis to determine head position movements and distances. The distance and movement information is provided to an information handling system for application, such as to estimate end user head position for viewing visual information, similar to eye tracking techniques, or for performing inputs with head movements, such as a head nod.

Figure 11:
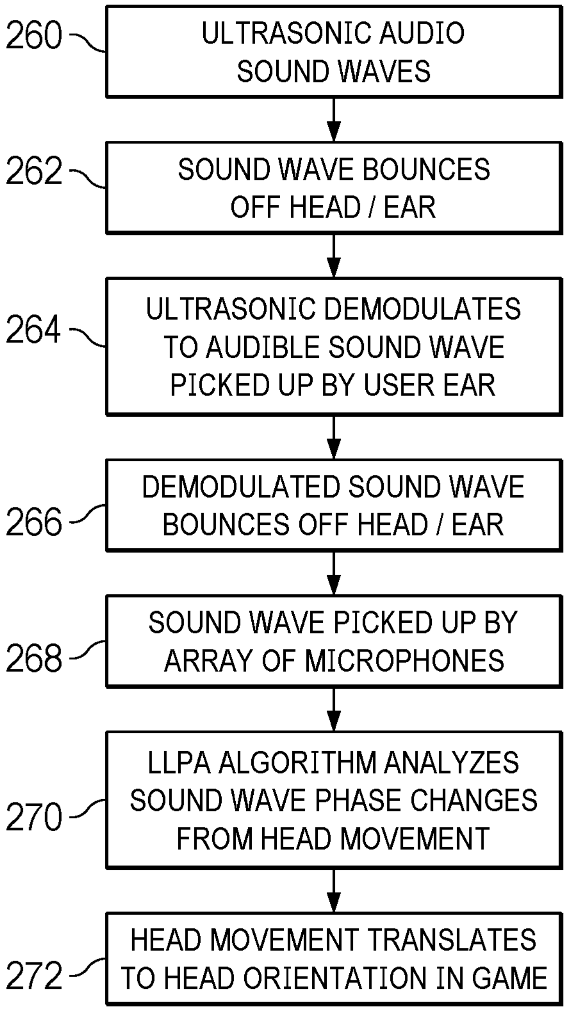
FIG. 11 depicts a flow diagram of a process for providing audible sounds to an end user that also supports head tracking of the end user.

Referring now to FIG. 11, a flow diagram depicts a process for providing audible sounds to an end user that also supports head tracking of the end user. The process starts at step 260 with presentation of ultrasonic audio waves towards an end user's ears. At step 262 the ultrasonic sound waves bounce off the end user's head and ears. Ultrasonic sound waves that do not bounce off the end user also do not demodulate and are not heard by others nearby. At step 264 the ultrasonic sound waves demodulate to create an audible sound wave that an end user can hear, such as when dual time and/or frequency modulated ultrasonic sound waves interact after a reflection from an end user. At step 266, the demodulated sound waves bounce off the end user's head and/or ears and towards a microphone array with a known positional relationship so that a comparison of received sound waves at the different microphones can provide positional information. At step 268, the audible sounds generated from demodulation of the ultrasonic sound waves is picked up by the array of microphones for positional and movement analysis. At step 270, an LLAP algorithm analyzes the sound waves phase changes of the audible sounds collected by the array of microphones to detect head movements, such as from a phase change of the audible sounds. At step 272 the head movements are translated to head orientation, such as for a game input, and/or for an input, such as a head nod.

Figure 12:
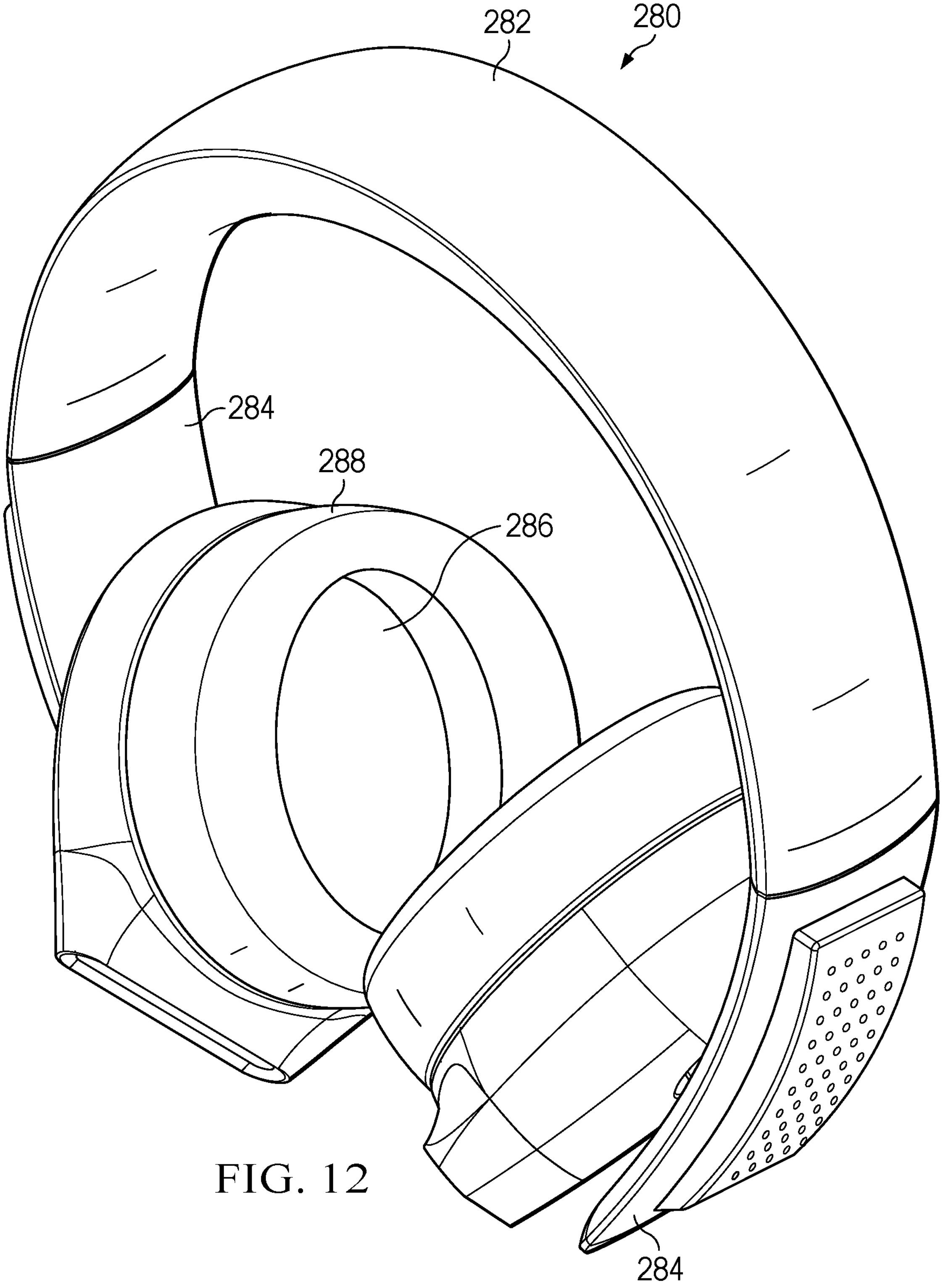
FIG. 12 depicts a side perspective view of a headset to play audio to an end user's ears and external to the end user's ears.

Referring now to FIG. 12, a side perspective view depicts a headset 280 to play audio to an end user's ears and external to an end user's ears. Headset 280 has a headband 282 that couples over an end user's head to hold earcups 288 over the end user's ears in a conventional manner so that speakers 286 inside earcups 288 may play audio to an end user in private. With the earcup 288 directed at an end user's ears, a set of external speakers 284 are directed away from the end user and configured to play audio external to the headset 280. In the depicted configuration, internal speakers 286 play audio privately for an end user while external speakers 284 remain off. In some embodiments, external speakers 284 may play audio simultaneously with internal speakers 286, such as if an end user wants to share audio with another person without removing the headset or changing the audio source to a different speaker. In some situations, the external speakers may play a different audio that enhances the end user experience, such as by playing background battle noise while the primary game audio is played into the earcup speakers.

Figure 13:
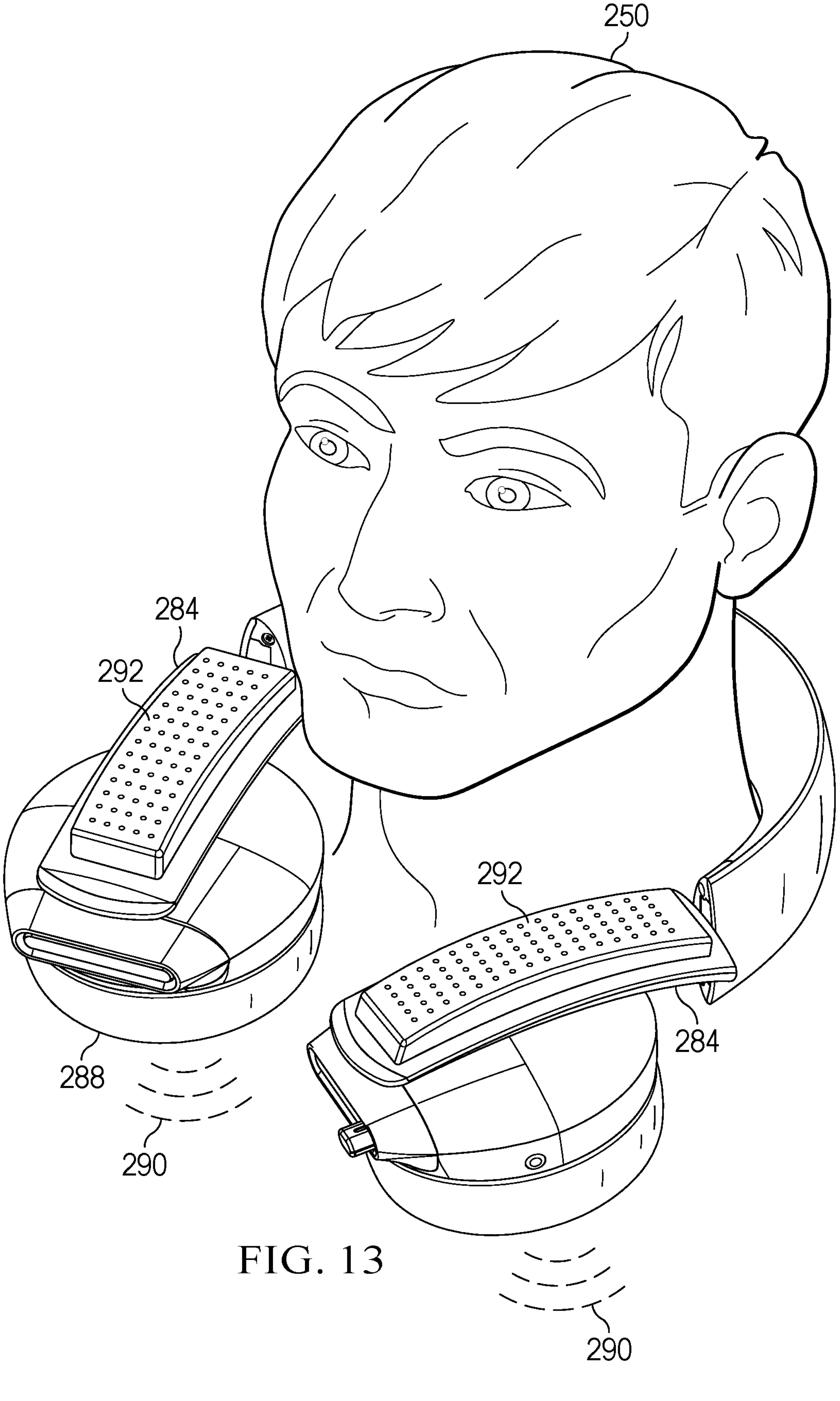
FIG. 13 depicts a side perspective view of the headphones configured to play audio external to the end user's ears.

Referring now to FIG. 13, a side perspective view depicts the headset 280 configured to play audio external to the end user's ears 250. In the external play configuration, headband 282 fits around the end user neck with earcups 288 rotated approximately 90 degrees to direct towards the end user collar bone so that external speakers 284 rotate upward to direct the speaker openings 292 towards the end user's ears. In the external play configuration, the end user has audio played up from the external speakers rather than from the speakers in the earcups, while the earcup speakers may provide some haptic effects, such as by playing bass that vibrates against the end user's upper body and torso. Alternatively, earcup speakers 286 may include haptic devices 290 that vibrate through the earcup to provide a haptic effect, such as to enhance interactions with a game. In one alternative embodiment, external speakers 284 may provide ultrasonic sound and head position reports as described above with respect to FIGS. 10-11.

Figure 14:
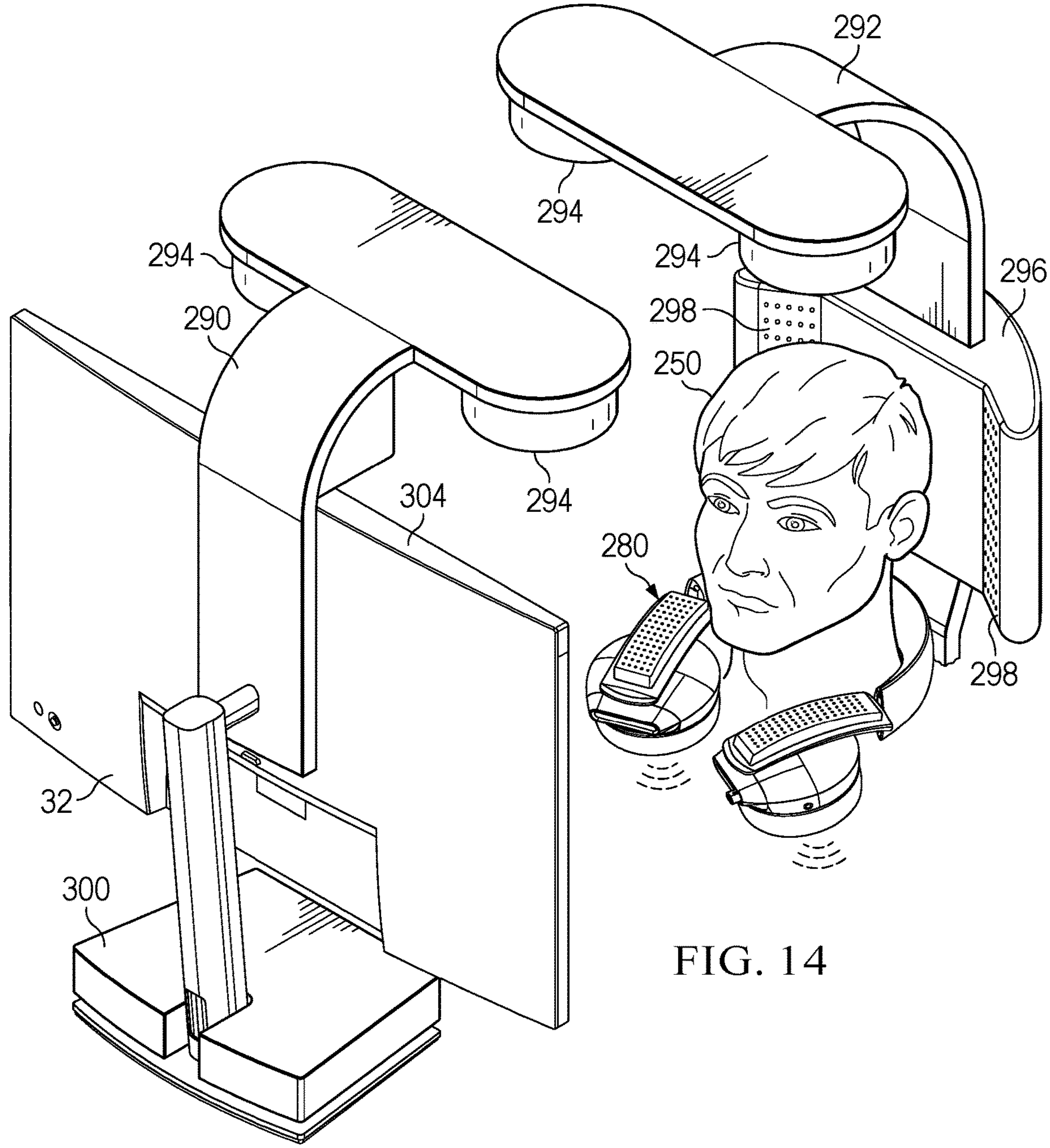
FIG. 14 depicts a perspective view of an information handling system immersive sound bubble for a gaming audio ecosystem.

Referring now to FIG. 14, a perspective view depicts an information handling system immersive sound bubble for a gaming audio ecosystem. In the example embodiment, plural speakers position around the game playing position of end user 250 so that the end user receives audio from the back with left and right headrest speakers 298 coupled to a headrest 296; from below the end user's ear with left and right neck speakers of headset 280; and from above the ear with left and right top speakers 294 coupled to a speaker arch 292 raised over top of end user 250. In addition, the three vertical levels of speaker sound output are reinforced with right and left top speakers 294 that couple to a speaker arch 292 extending up from a peripheral display 32; an upper speaker bar 304 coupled at the top level of display 32 and a subwoofer 300 disposed at a base of display 32.

Figure 15:
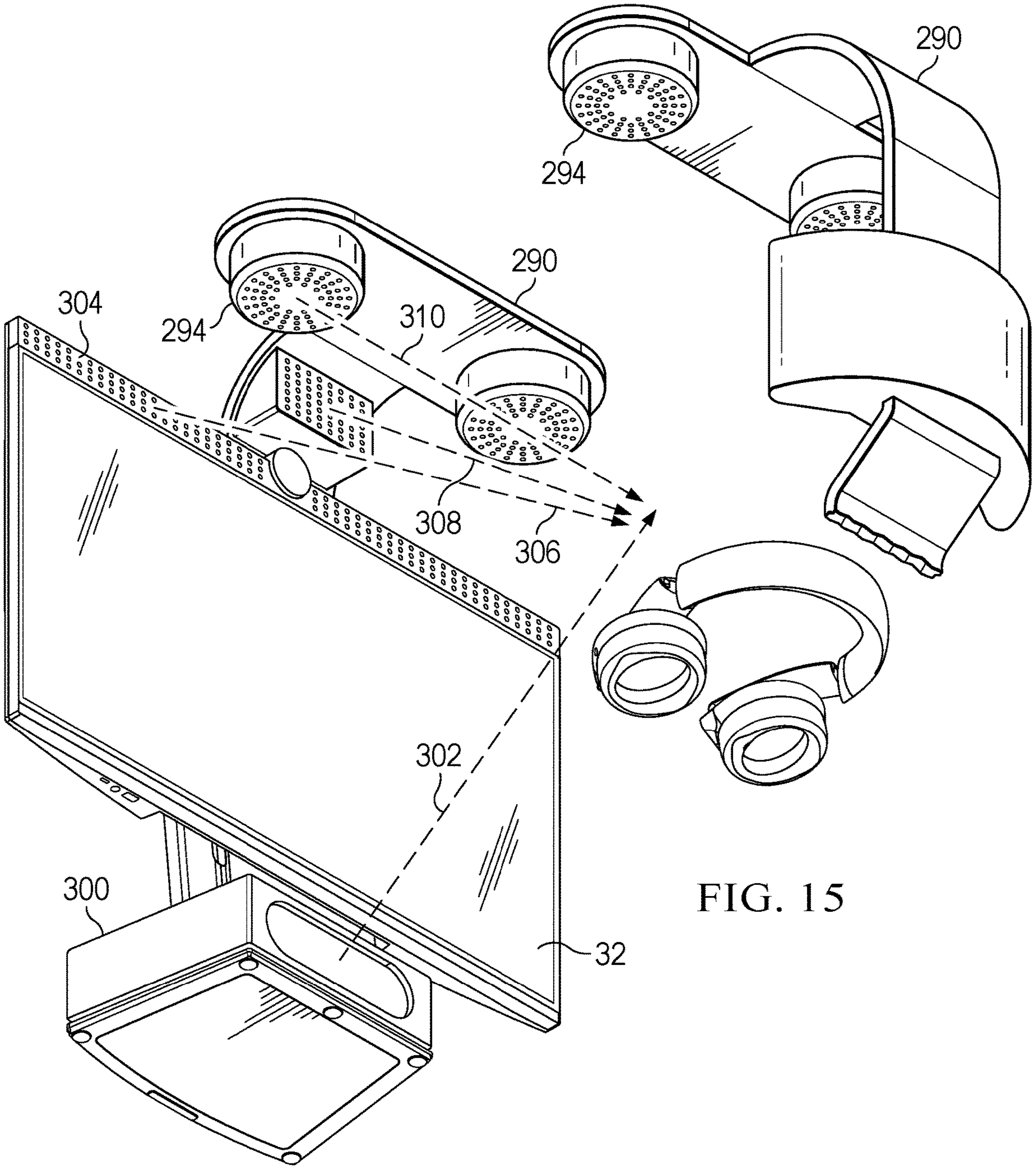
FIG. 15 depicts a lower perspective view of the immersive sound bubble gaming audio ecosystem.

Referring now to FIG. 15, a lower perspective view depicts the immersive sound bubble gaming audio ecosystem. A front middle speaker 308 directs audio at the end user between speaker bar 304 and top speakers 294 so that, as shown by arrows 302, 306 and 310 the end user is surrounded in an immersive sound bubble. An audio driver running on the information handling system leverages the speaker positions relative to the end user to provide binaural clues of sound origination positions with three-dimensional audio logic, resulting in an immersive audio experience.

Figure 16:
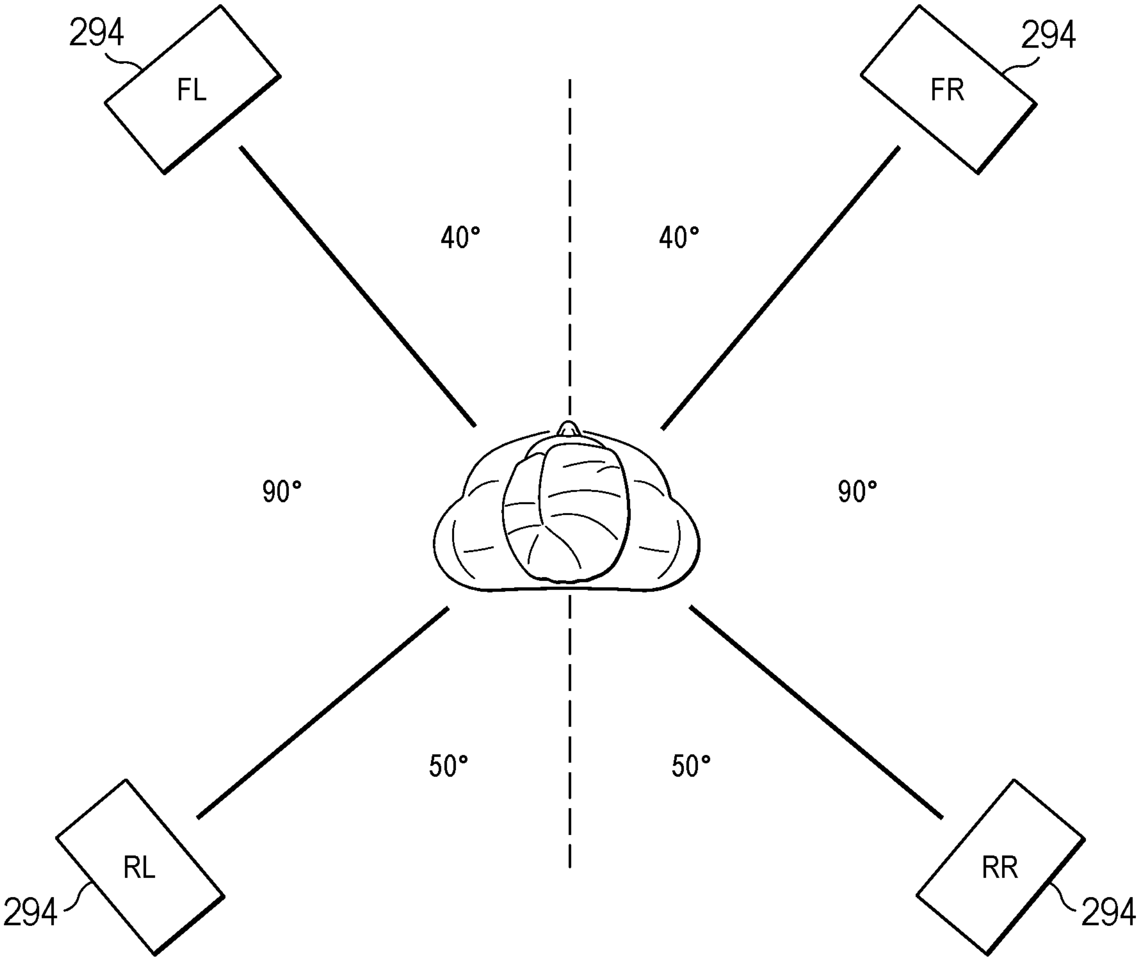
FIG. 16 depicts an example of a state space that helps to define audio playback from distributed speakers.

Referring now to FIG. 16, an example of a state space is illustrated that helps to define audio playback from distributed speakers. In the example embodiment, the state space is defined for four top speakers 294 to show relative position with respect to a central location where the end user's head is located. The state space includes angular relationships, a vertical relationship and a distance relationship. Applied to the example set up as illustrated in FIGS. 14 and 15, the relative positions may be defined based upon an end user location, such as the end user's head position relative to a display and arch on which speakers are mounted and the height at which speakers mount at a chair in which the end user sits. In one example embodiment, these locations may be determined from a camera and/or infrared time of flight sensor associated with the information handling system that captures an image of the end user.

Figure 17:
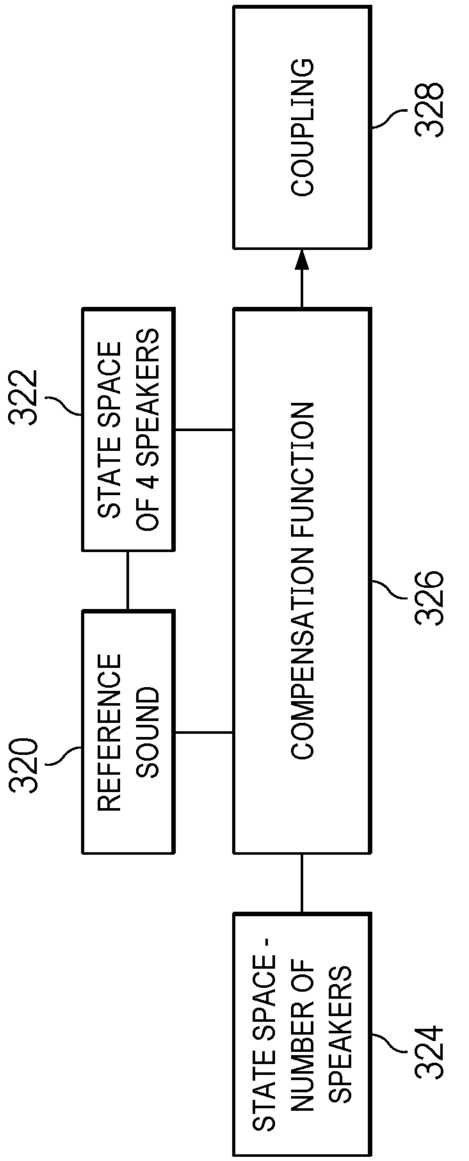
FIG. 17 depicts a logical block diagram of an audio playback driver that compensates audio playback to adjust for speaker positions.

FIG. 17 depicts a logical block diagram of an audio playback driver that compensates audio playback to adjust for speaker positions. The state space 324 for expected speaker deployments is applied to a compensation function 326 to determine a timing at which audio is played from each speaker to generate the desired immersed experience at the end user location. Compensation function 326 has a reference sound profile 320 that is applied for the detected state space 322, such as the four speakers of FIG. 16 so that a coupling 328 is assigned by the audio driver to define a relative time for each speaker to output audio. The immersive space is created with an estimate of sound for a base configuration that is adjusted by the detected state space.

Figure 18A:
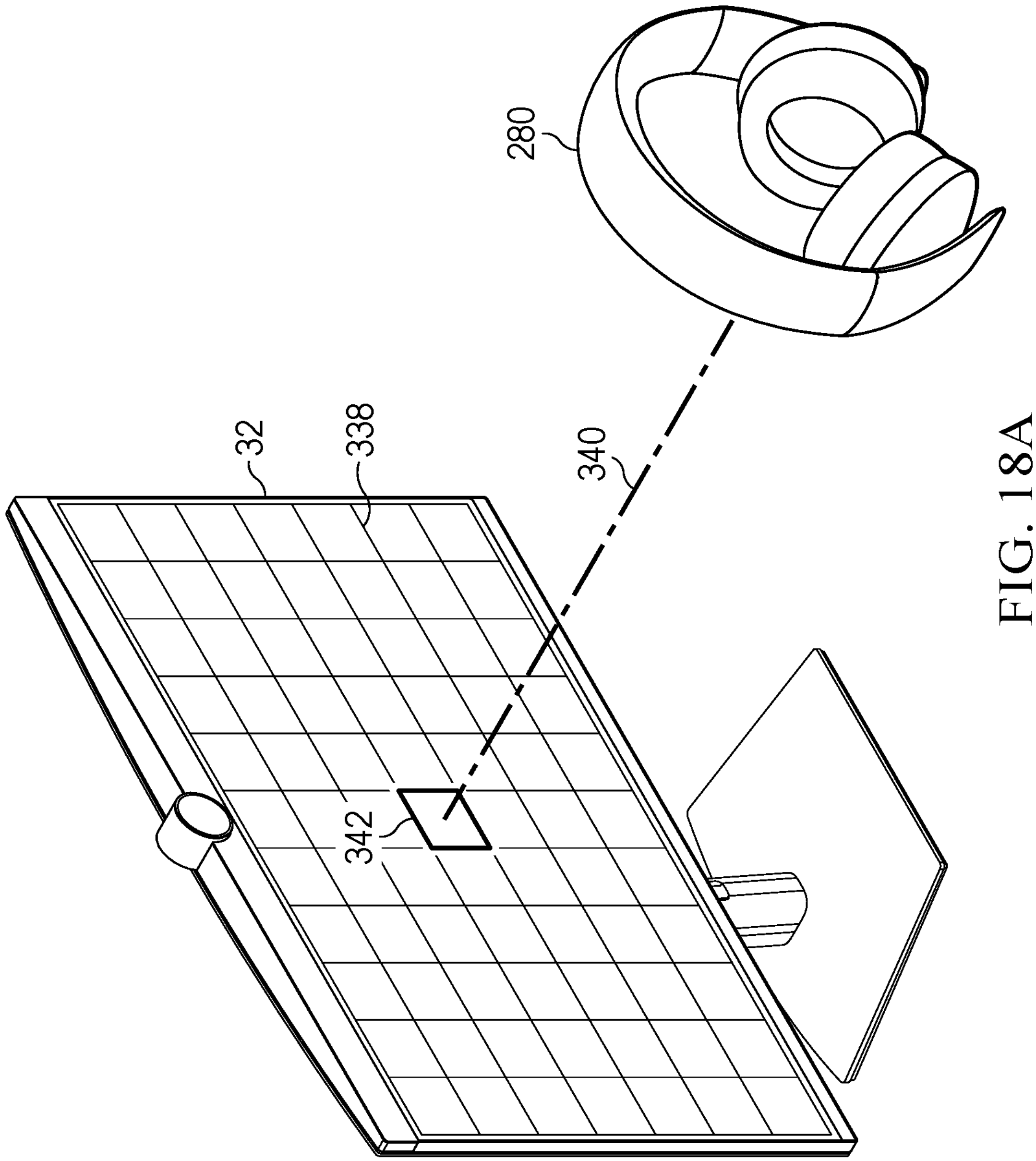
FIGS. 18A, 18B and 18C depict a dynamic visual boundary tracking system that aids end user orientation between a viewed location and a targeted location.
Figure 18B:
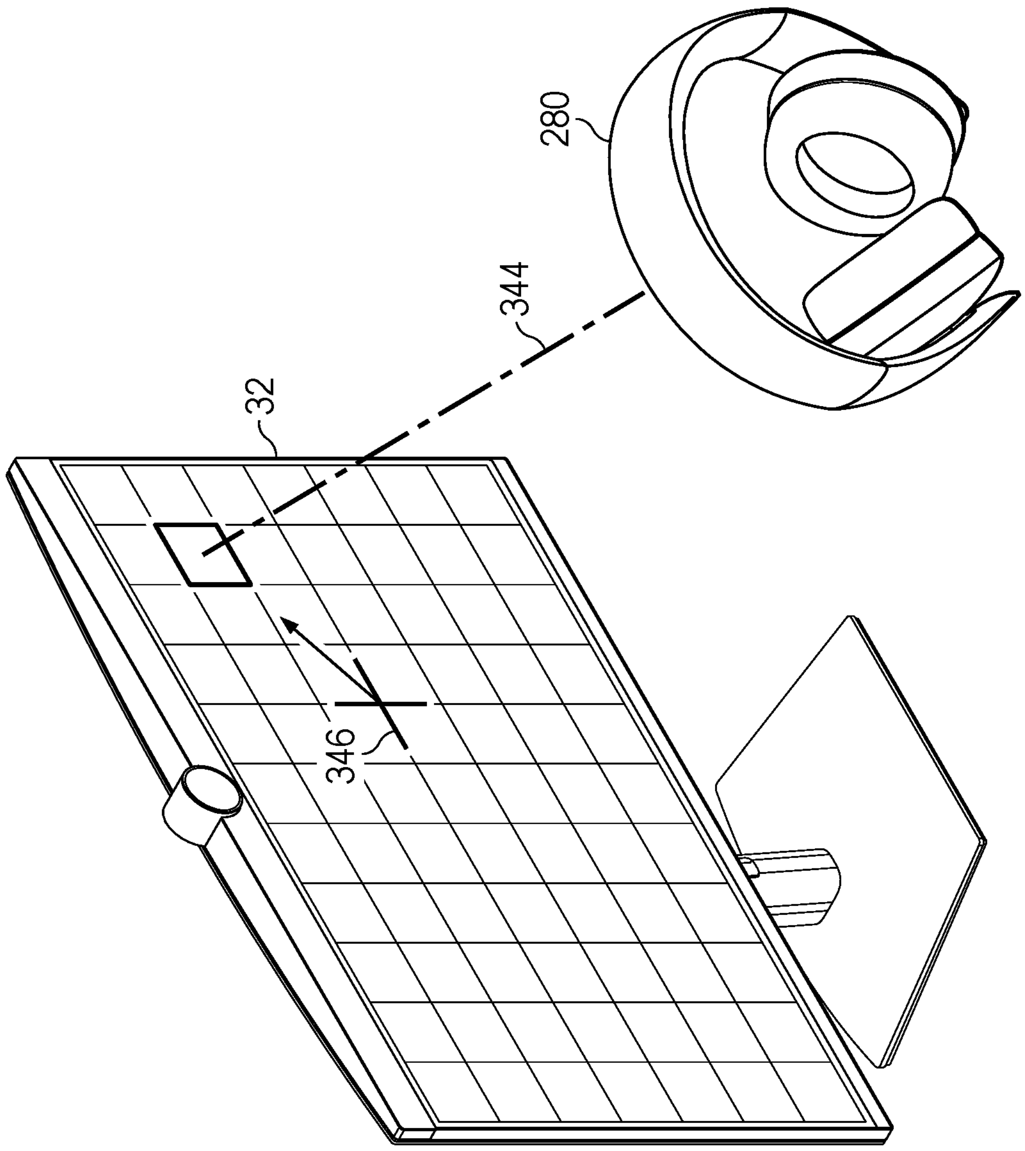
Figure 18C:
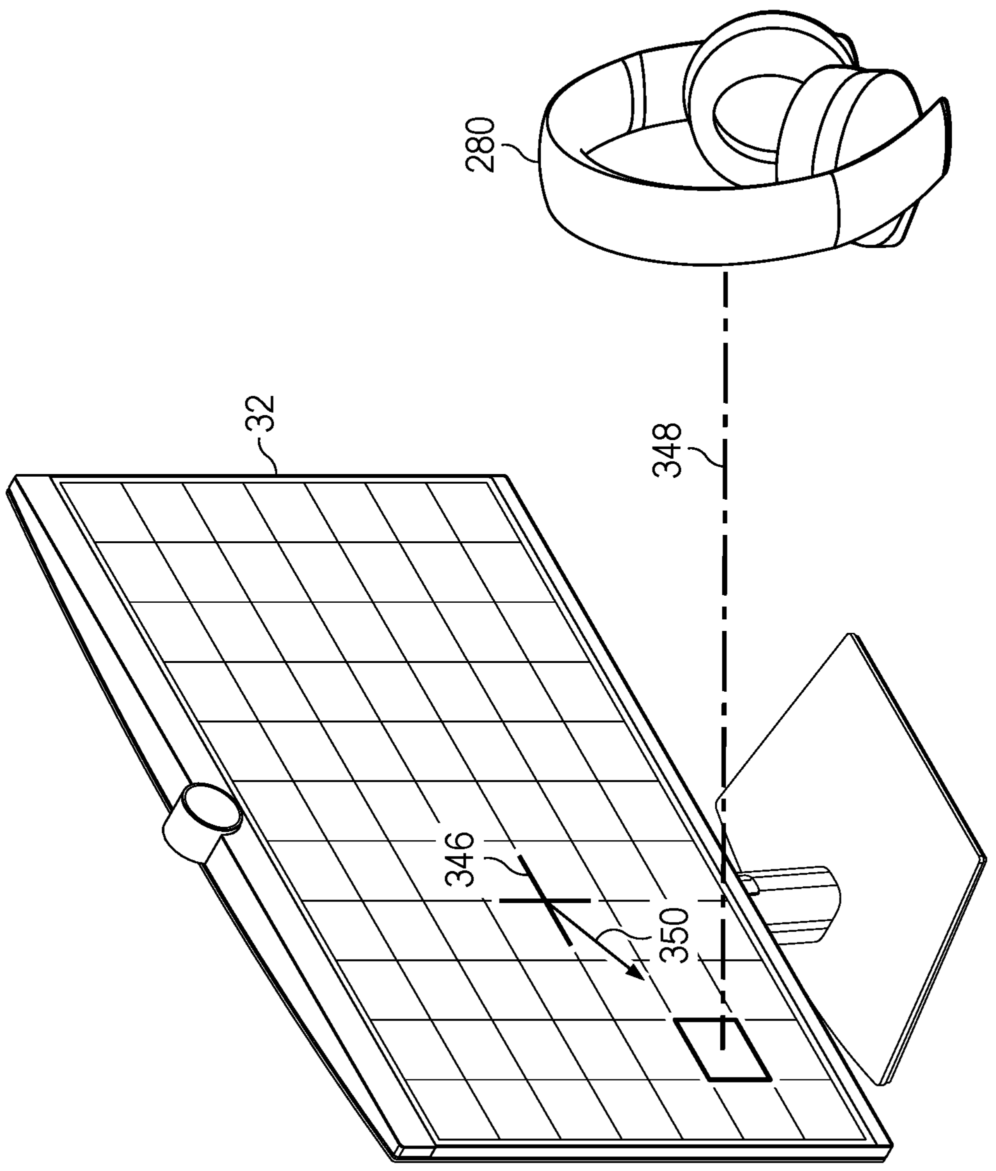

Referring now to FIGS. 18A, 18B and 18C, a dynamic visual boundary tracking system is depicted that aids end user orientation between a viewed location and a targeted location. During interaction with gaming applications, end users often have difficulty with aiming since the hand tends to respond more slowly to depicted game output than the eye. This can result in the end user undershooting or overshooting a target crosshairs when responding to a game output. To aid end user targeting, a multiple square grid 338 is depicted at a display 32 to highlight which gird an end user has eyes on versus the location of the crosshairs to assist the end user aim. FIG. 18A depicts a headset 280 that an end user can wear to provide an indication of a viewing axis 340 that highlights a boundary tracking grid 342 from the multiple square grid 338. The end user places the headset on his head and then looks at the center grid to calibrate the boundary tracking grid to the end user's viewing position. Once the boundary tracking grid 342 is calibrated, movement of the end user's head is translated to a position in the grid so that the position can be highlighted as a boundary tracking grid. FIG. 18B depicts an example where an end user's head tilts up and right to view along the axis 344 so that an end user can visualize a target vector indicated by an arrow from target crosshairs 346 to the viewing location at the highlighted boundary tracking square. In the example of FIG. 18B, the user can quickly calibrate aim from where the crosshairs are located to the viewing location. FIG. 18C depicts an example where the end user looks at an area of interest at the lower left corner of display 32 as indicated by viewing axis 348 and the aligned grid square that is highlighted. Vector arrow 350 indicates the direction and amount of movement the end user has to make for the crosshairs to end up on the highlighted grid. By highlighting the grid, a gamer can more readily estimate a relative distance and direction for movement of the cursor to the location on the display at which the gamer is viewing. In the example embodiment, the grid is presented as an overlay generated by the OSD menu over content provided by an information handling system with only a single grid highlighted. In an alternative embodiment, the gird may be suppressed except for the highlighted single grid so that the display presentation is less cluttered.

Figure 19A:
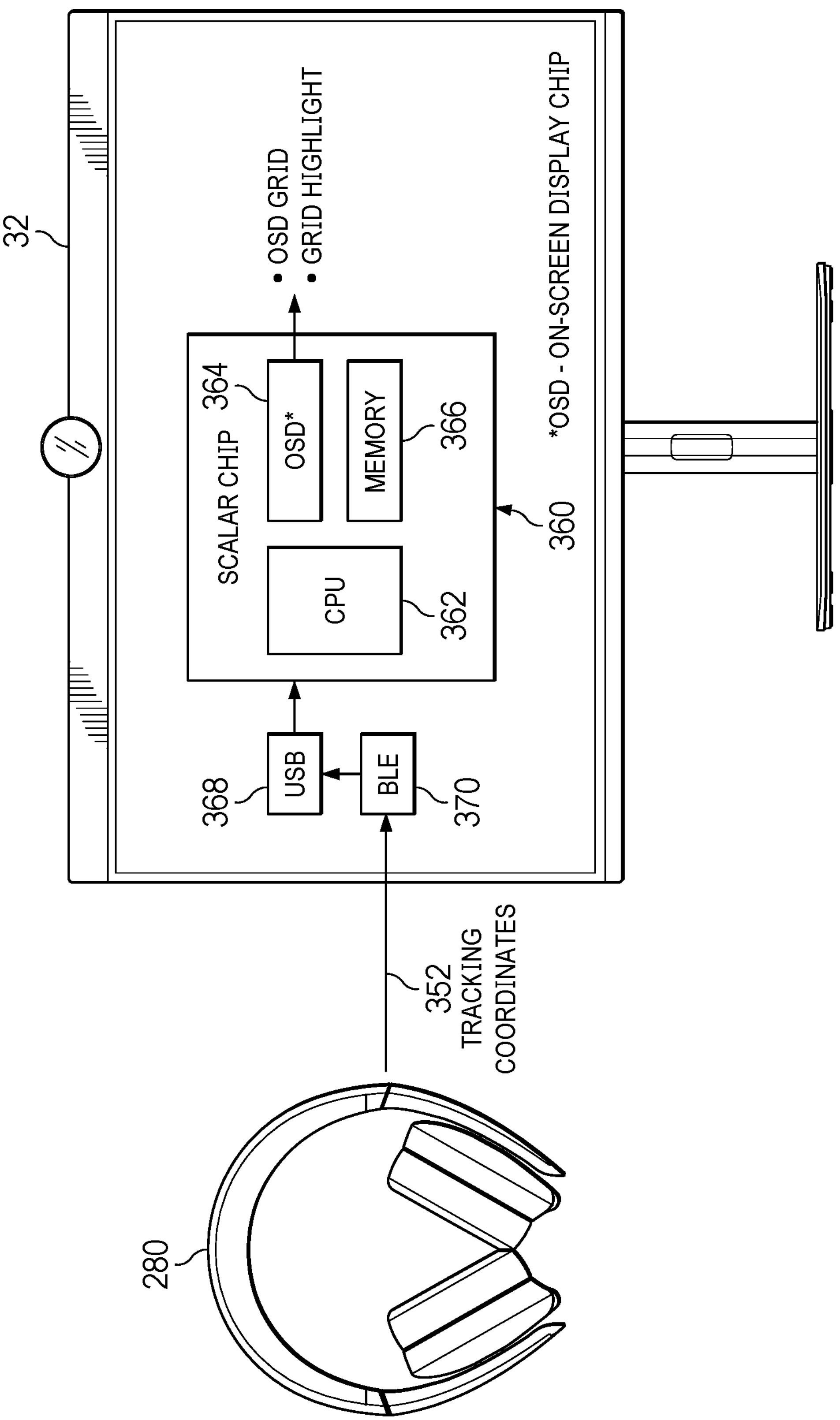
FIGS. 19A and 19B depict a system that coordinates visual boundary tracking directly between a headset and a display.
Figure 19B:
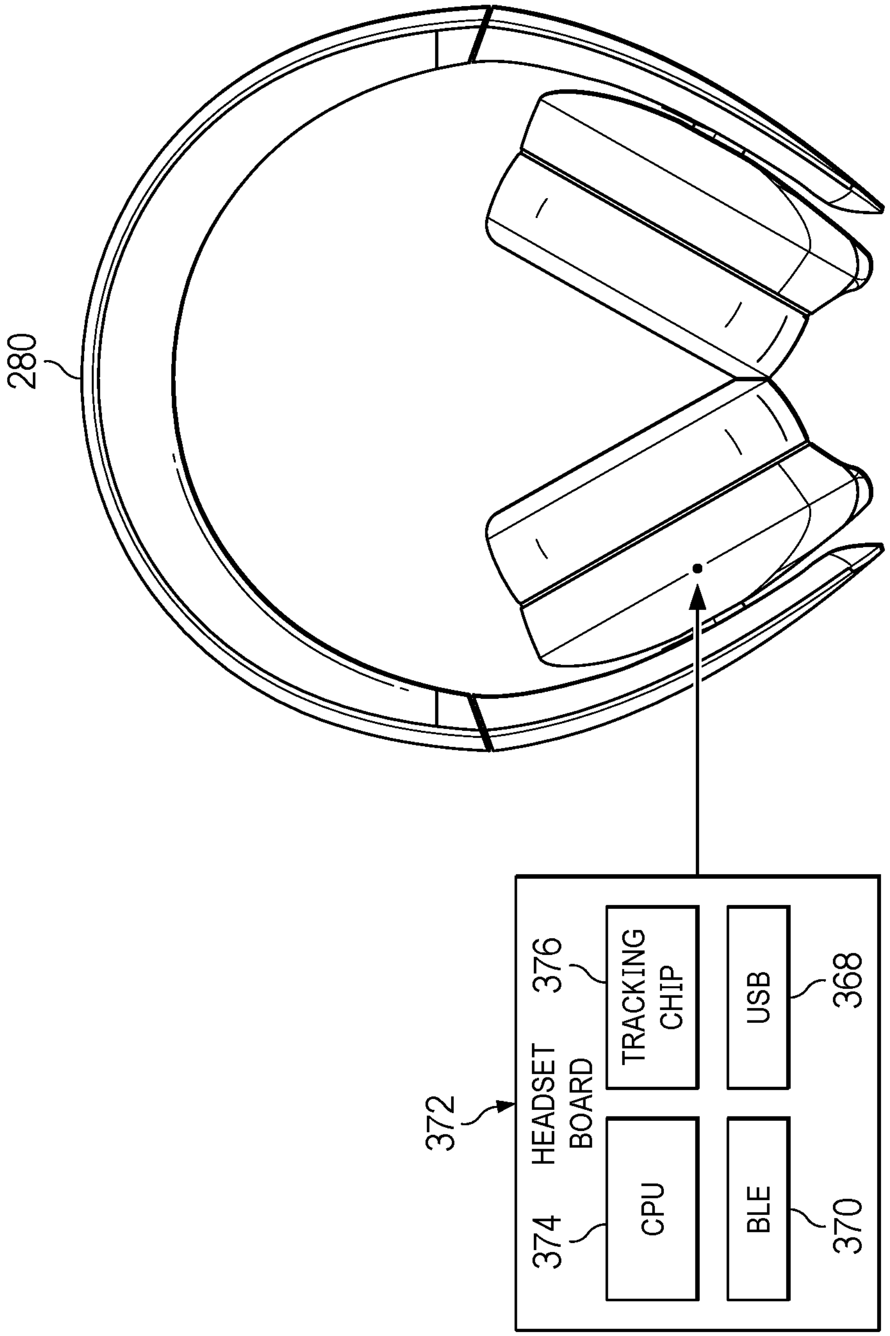

Referring now to FIGS. 19A and 19B, a system is depicted that coordinates visual boundary tracking directly between a headset 280 and a display 32. In the example embodiment, headset 280 communicates tracking coordinates 352 to display 32 through a wireless personal area network (WPAN) interface, such as BLE, so that logic on display 32 can present the grid with the highlighted boundary tracking grid. A BLE processing resource 370 communicates wirelessly with headset 280 and provides the headset tracking coordinates to a USB hub 368 that interfaces with a scalar 360 of display 32. Scalar 360 includes a central processing unit (CPU) 362 that executes instructions stored in non-transitory memory 366 to manage an onscreen display menu (OSD) 364. OSD 364 includes logic to present the grid on display 32 as a menu item in the background of application visual images communicated from an information handling system. As headset 280 communicates tracking coordinates that define a viewing location of the end user, OSD 364 highlights a grid square associated with the viewing location. FIG. 19B depicts logical components within headset 280 to determine an end user viewing axis and communicate the viewing axis to display 32. A headset circuit board 372 includes a CPU 374 that interfaces with a tracking chip 376 to determine the headset viewing axis. For example, tracking chip 376 includes a gyroscope, accelerometer and magnetometer that detect end user's head movements. In one example embodiment, head movements may also be tracked by ultrasonic indications as described above. In addition, headset 280 may receive periodic calibration indications based upon external tracking information, such as eye tracking or camera images. Headset 280 communicates the tracking information through a BLE processing resource 380 or a USB interface 378. When head movement tracking is indicated by accelerations, the resolution of a grid position to highlight is determined at display 32 and can include other indications, such as eye tracking positions. For instance, an eye tracking position may provide a starting point from which to derive a grid highlight after a detected movement followed by an update when the eye tracking resolves a position after a rapid head movement.

Figure 20:
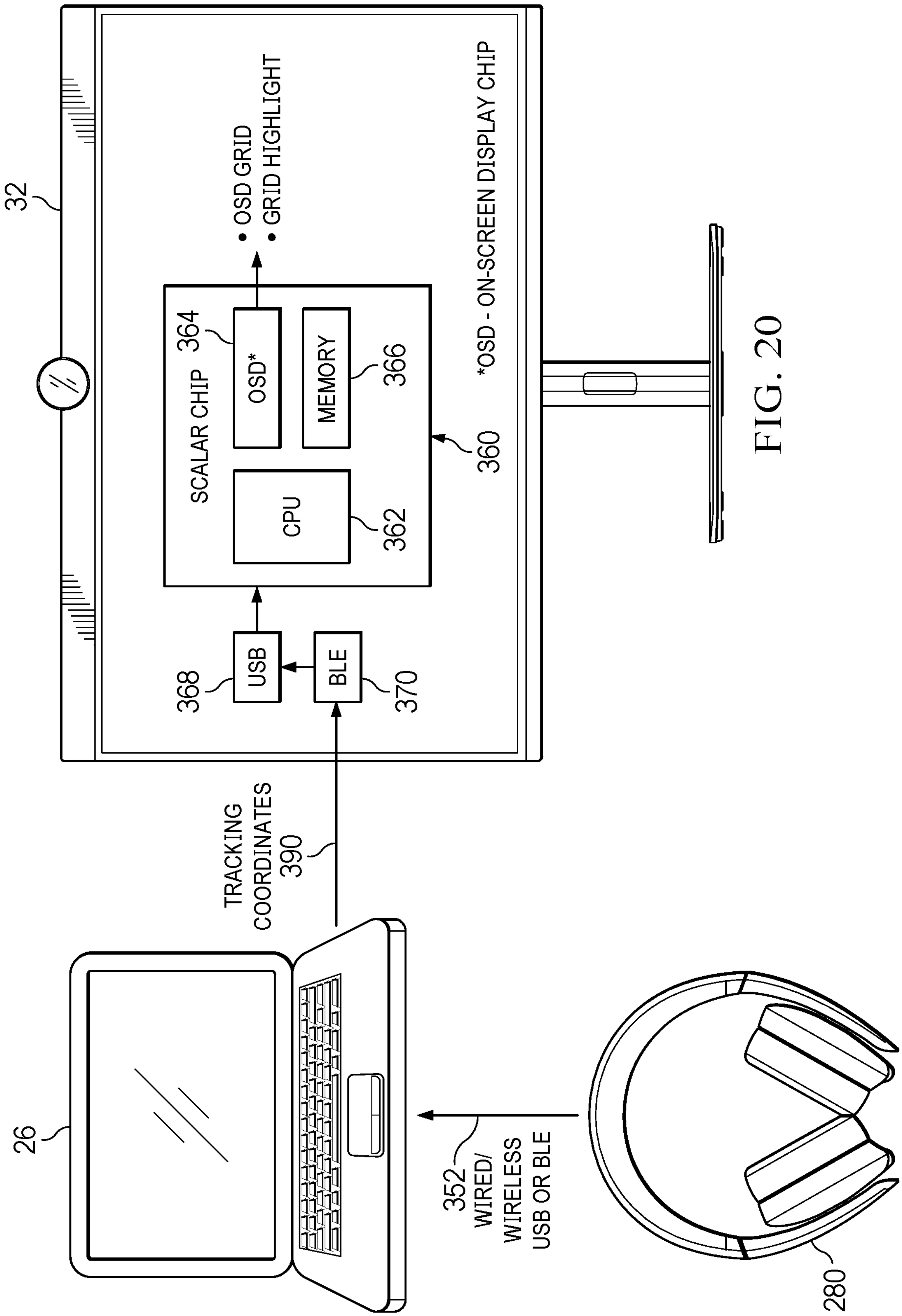
FIG. 20 depicts a system that coordinates visual boundary tracking by a headset through an information handling system and to a display.

Referring now to FIG. 20, a system is depicted that coordinates visual boundary tracking by a headset through a portable information handling system 26 and to a display 32. In the example embodiment, headset 280 interfaces through a WPAN or USB cable 352 with portable information handling system 26 to communicate tracking information based on headset movements or head movements detected by doppler. Portable information handling system 26 then communicates the tracking coordinates 390 to display 32 through a USB 368 interface. Scalar 360 then applies the tracking information with CPU 362 executing instructions in non-transitory memory 366 that defines the OSD for presentation to include the grid and a highlighted grid indicating end user eye position. The example embodiment illustrates that display 32 can interact directly with headset 280 through BLE processing resource 370 or indirectly through portable information handling system 26. In an alternative embodiment, positions provided by headset 280 are applied with other available tracking information, such as eye tracking, by the information handling system to report a grid position that display 32 highlights. In one alternative embodiment, a highlighted grid is defined by a graphics processor of the information handling system and presented as part of the primary visual image over the application generated visual image. In such an embodiment, the background grid may be presented by OSD 364. Alternatively, the graphics processor may send grid tracking positions to OSD 364 to have OSD 364 present the tracking grid, such as with coordination through a display auxiliary communication channel. In alternative embodiments having eye tracking to determine the grid to highlight, the camera used to eye track may be a peripheral camera coupled to the display or a camera integrated in the display, and the eye tracking position may be reported directly to the scalar or through the information handling system. The eye tracking camera operates in a conventional manner to determine eye gaze position based upon reflection of infrared light from a viewer's pupils.

Figure 21A:
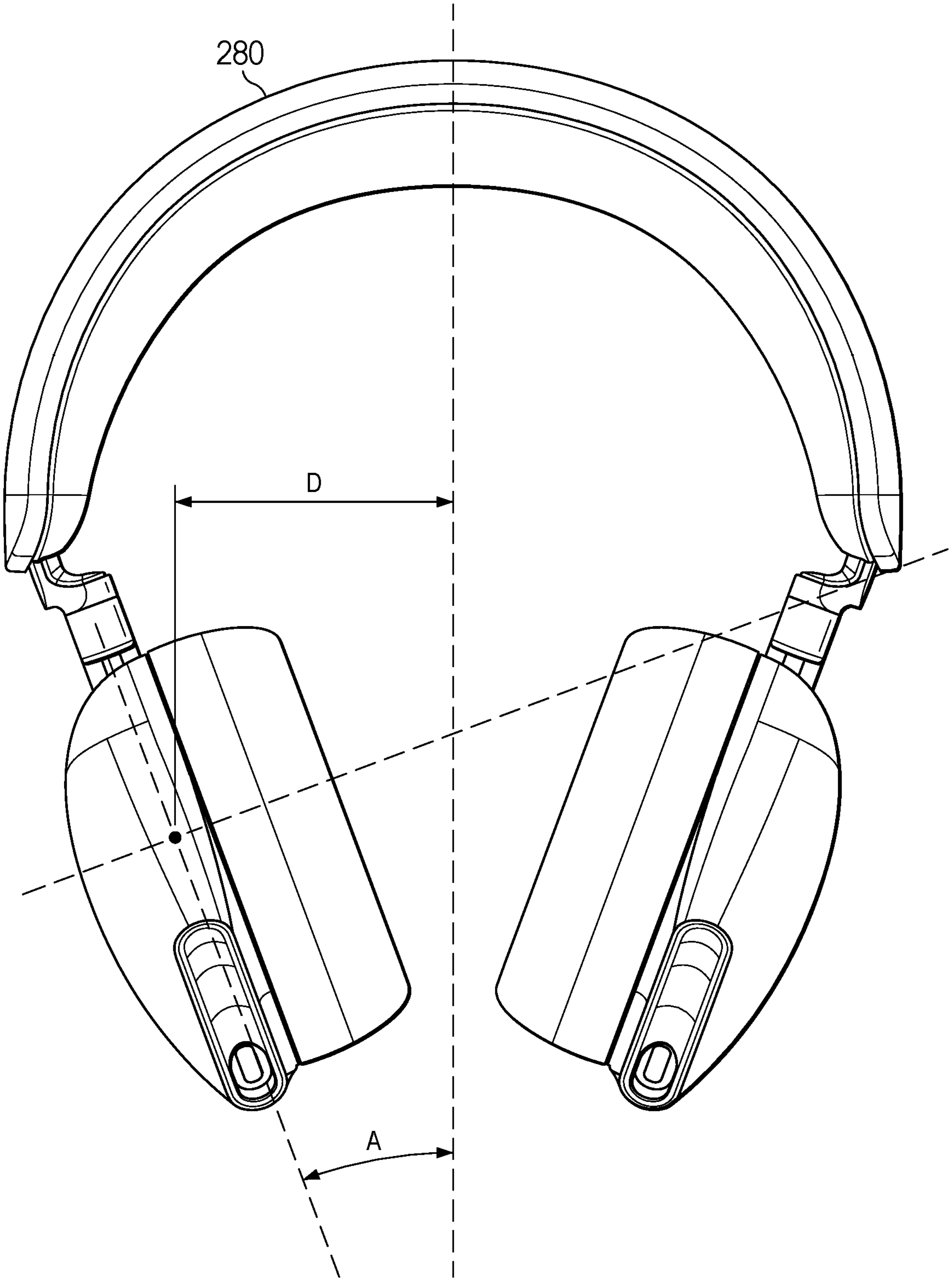
FIGS. 21A and 21B depict an example of a headset configuration based upon placement on an end user's head.
Figure 21B:
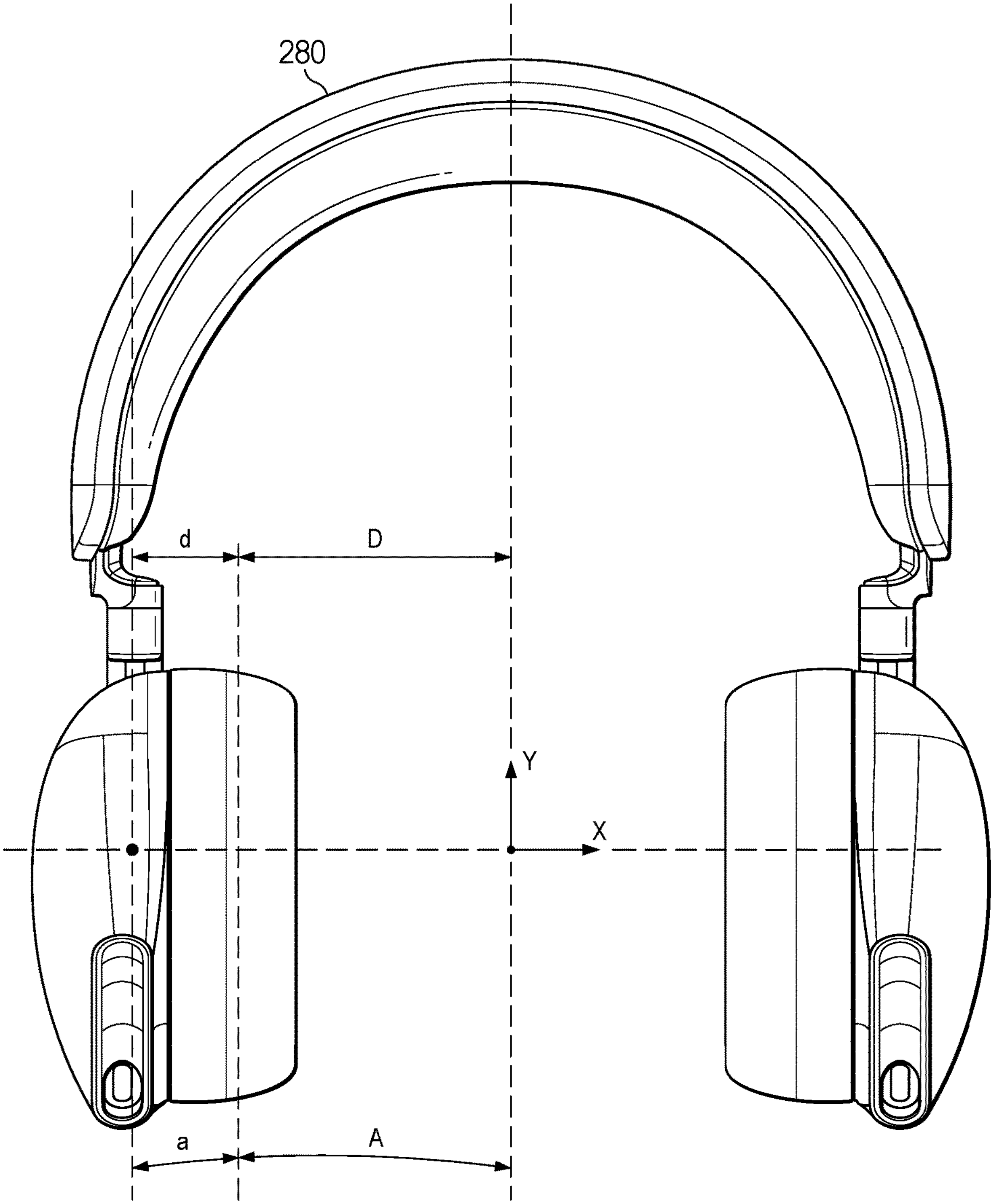

Referring now to FIGS. 21A and 21B, an example depicts a headset configuration based upon placement on an end user head. FIGS. 21A and 21B illustrate an angle A and distance D relationship when headset 280 is not worn and when it is worn on a head. A tracking chip having an accelerometer, gyroscope and magnetometer as described above in FIG. 20 detects the relative orientations of the earcups to identify a central tracking location of the headset relative to an end user's head so that an accurate relative tracking position is reported. Although an end user will normally wear headset 268 over both ears to provide a square relationship at a central location as shown in FIG. 21B, in some situations the headset may rest in a lower or offset position, such as on one ear and not both or with the headband on the neck or behind the head, such as resting on a hat bill of a hat worn backwards. As described above, the headset may rest on the end user collar bones with ultrasonic speakers directed upwards and movement determined from sound reflections. The tracking chip resolves the headset position to adjust movements for the headset position at the time that the movements are detected. In one embodiment, the headset corrects for the detected headset position and reports head movements as corrected values that account for headset position. In an alternative embodiment, movements are reported as vectors so that the display or information handling system corrects head position reporting to adjust for headset position.

Figure 22:
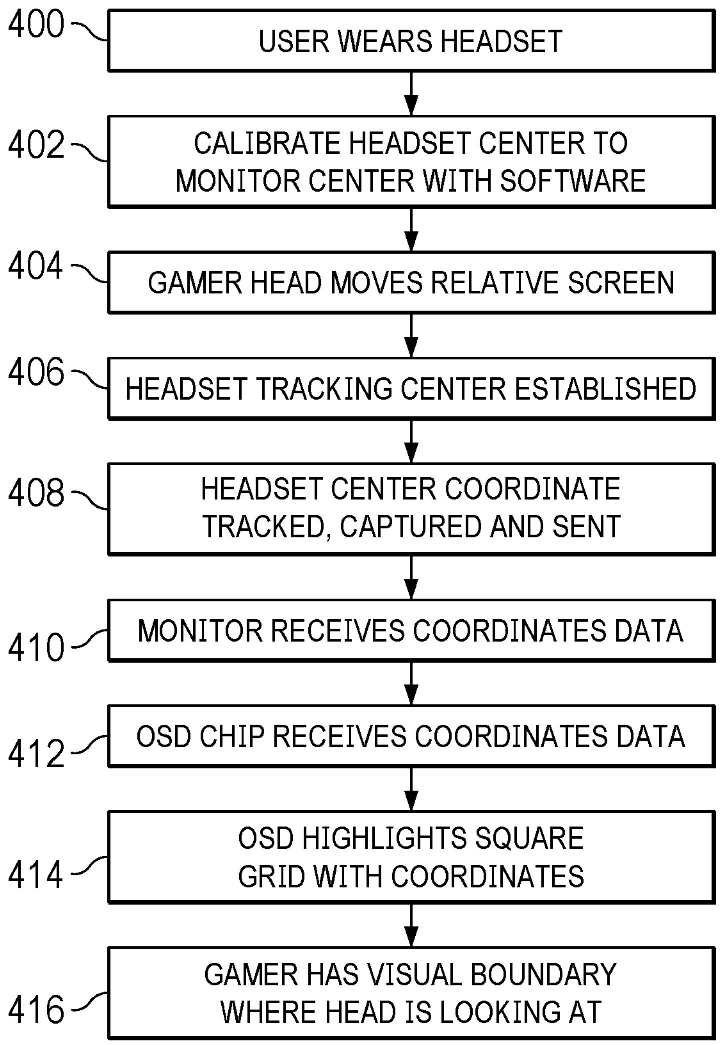
FIG. 22 depicts a flow diagram of an example of a process to provide boundary tracking by a headset position on a display grid.

Referring now to FIG. 22, a flow diagram depicts an example of a process to provide boundary tracking by a headset position on a display grid. The process starts at step 400 with the end user wearing the headset. At step 402, the headset calibrates a center location, such as with detection of the headset position on the end user, and calibrates to a central axis. Calibration may be performed manually by asking an end user to view a mark placed at a central location of the display by the OSD. Alternatively, calibration may be performed automatically by tracking eye position with a camera and/or eye tracking device. At step 404 the user moves relative to the display central position to verify calibration, such as by showing the highlighted grid move about the full grid as the head moves. At step 406 the headset central tracking position is established. At step 408 the headset center position and coordinate are tracked, captured and sent by the headset to the display. At step 410, the display receives the coordinate data, such as through a WPAN interface. At step 412 the display OSD receives the coordinate data and associates the coordinates with a position on the grid. At step 414, the OSD highlights the square grid defined by the coordinates to indicate the end user eye position. At step 416, the end user is provided with a visual boundary that defines where the head is looking, such as to use as a reference for interacting with visual images presented at the display.

Figure 23:
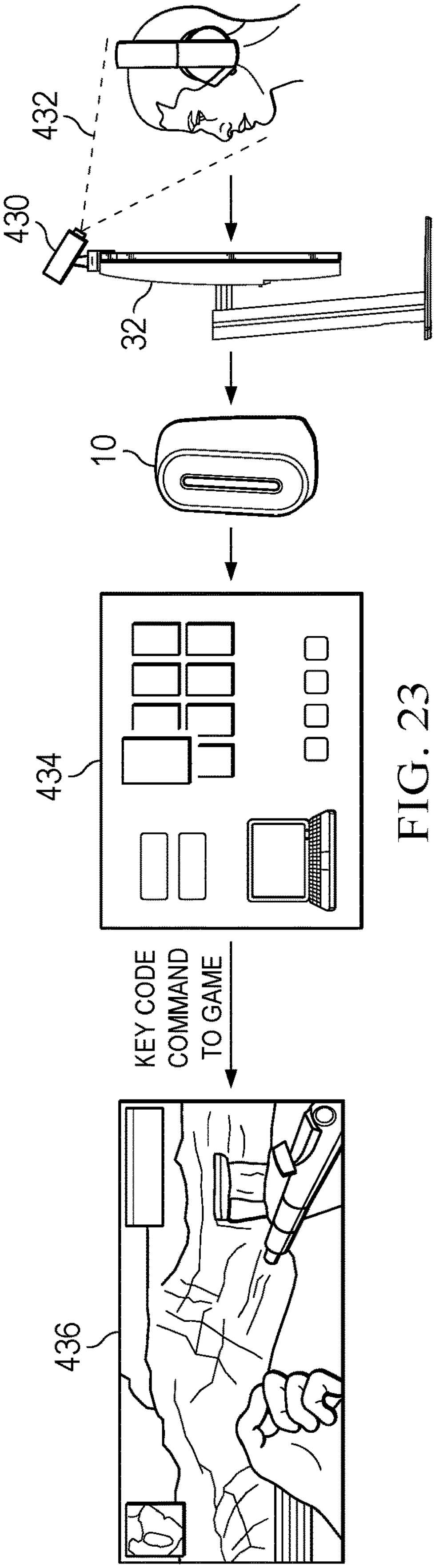
FIG. 23 depicts an example embodiment of head movements as an input to an application, such as to support gaming commands.

Referring now to FIG. 23, an example embodiment depicts head movements as an input to an application, such as to support gaming commands. During gaming applications, a variety of activities are managed by an end user with different types of keyboard and mouse inputs. For example, WASD keys typically manage movement and a mouse manages turning and firing a weapon. Other key values control other functions, such as H to inject health and C to change weapons. When an end user has to change between keys, disorientation can occur that results in incorrect inputs and a subpar performance. To help adjust inputs, head gestures are tracked with a camera or a headset so that hands can continue to execute the main actions on the keyboard and mouse. In the example embodiment, a camera 430 with a field of view 432 extending from display 32 tracks an end user's head to detect head movements, such as nods yes or no, shakes and jerks to one side or another. In addition to camera tracking, the head gestures may be detected by a tracking chip in the headset as describe above or ultrasonic audio reflections and phase detection as described above. In one embodiment, two or all three head movement tracking techniques are used to confirm head inputs. Once head gestures are detected, the head gestures are communicated to information handling system 10 to match head movement gestures with input commands. For example, a head nod yes may be equated to an H input for adding health. The head gestures may be compared with context to affirm that the detected input is desired by an end user. In one embodiment, a user interface 434 allows an end user to define head gestures, context to accept the head gestures and values for the head gestures with a goal of avoiding unintended inputs. Once the head gesture input is decoded, the display user interface 436 can provide an end user with an indication of the selected input including that a head gesture was acted upon. Some examples of head gestures include a single head nod, a double head nod, a left glance and back to center, and a right glance and back to center. The commands available for association with a head gesture include a health injection, a weapon change and a peek.

Figure 24:
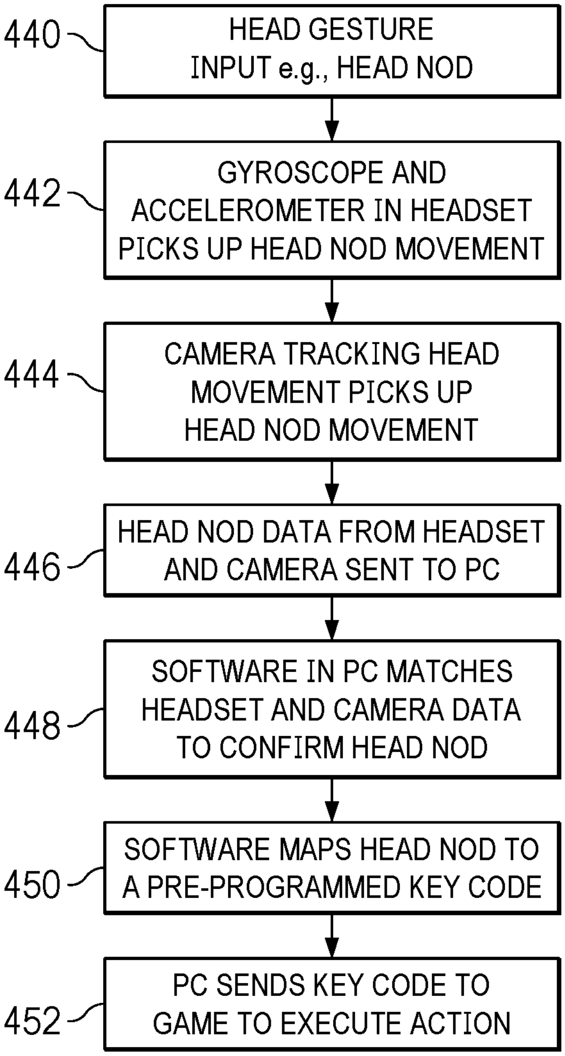
FIG. 24 depicts a flow diagram of a process for accepting head movements as an input to support gaming commands.

Referring now to FIG. 24, a flow diagram depicts a process for accepting head movements as an input to support gaming commands. The process starts at step 440 with a head gesture input, such as a nod. At step 442 a gyroscope and accelerometer in the headset picks up the motion. Alternatively, doppler detection at the headset can pick up the motion. At step 444, a camera tracking the end user detects the head movement. At step 446, the head movement information, such as the amount of a head nod performed is sent from the headset and camera to the information handling system. At step 448, an application in the information handling system matches the headset and camera motion information to confirm that the head motion is a gesture, such as a head nod. Once the gesture is confirmed and identified, the process continues to step 450 to map the gesture to a programmed key input, such as a head nod mapped to a health injection. At step 452, the information handling system sends the key value to the application for execution.

Figure 25:
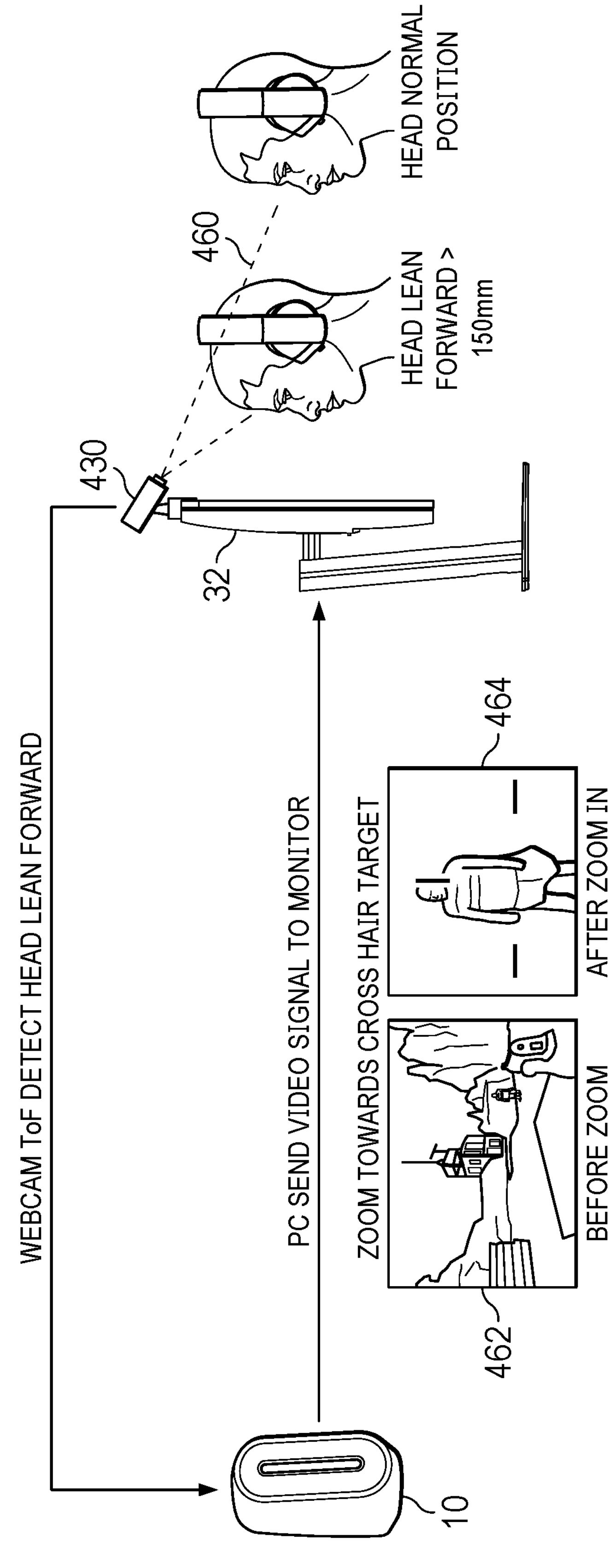
FIG. 25 depicts an alternative example of head movements as an input to an application confirmed with distance measurements by an infrared time of flight sensor.

Referring now to FIG. 25, an alternative example depicts head movements as an input to an application confirmed with distance measurements by an infrared time of flight sensor. Camer 430 includes an infrared sensor and infrared source that detects distances to objects in a time of flight sensor field of view 460. For example, a head nod may bring a head forward by greater than 150 mm to indicate an input. The input can include a time frame, such as maintaining the head forward position for a defined time or until an acknowledgment of the input is provided through display 32. When, over the course of scanning for distance to an end user, the time of flight sensor detects a change in distance that indicates a gesture, the gesture movement is sent to information handling system 10 to execution by an application, such as to command a magnifier zoom. In the example embodiment, the lean forward commands a zoom at the location of a crosshairs, such as a sniper rifle zoom at a target. The user interface 462 depicts the visual images of the display before the zoom and user interface 464 depicts the visual images after the zoom with a center on the cross hairs. In one embodiment, the amount of zoom may be controlled by the amount of lean made by an end user with a lean closer to camera 430 having a reduced time of flight distance and a greater amount of zoom.

Figure 26:
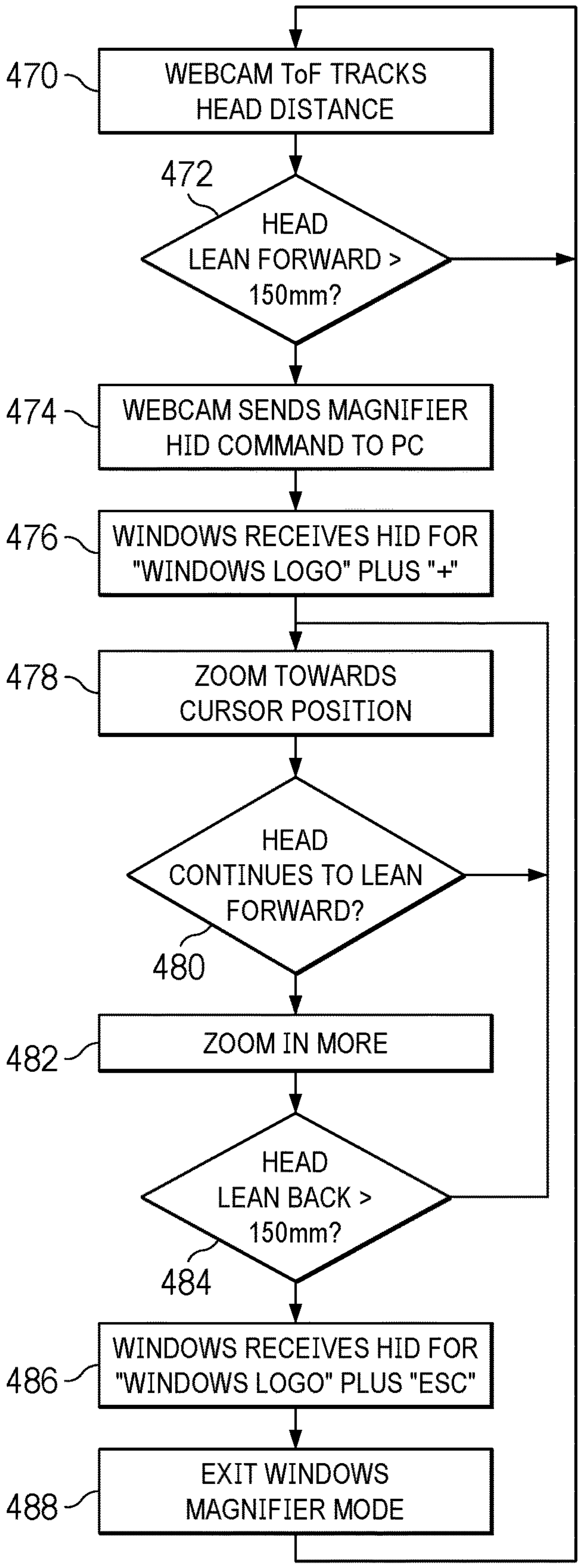
FIG. 26 depicts a flow diagram of a process for accepting head movements as inputs with confirmation by distance.

Referring now to FIG. 26, a flow diagram depicts a process for accepting head movements as inputs with confirmation by distance. The process starts at step 470 with distance tracking to the end user's head by a time of flight sensor. At step 472, a check is made of the amount of distance in a timed loop until a distance of greater than 150 mm is detected. Once a distance of greater than 150 mm is detected, the process continues to step 474 at which the camera sends a magnifier human interface command to the information handling system. In the example embodiment with a WINDOWS operating system, the camera sends the magnifier HID 476 of a Windows logo key and "+" to indicate a magnifier command. At step 478 a zoom is commanded at the location in the display of the cursor position. At step 480 a determination is made of whether the head continues to lean forward or backward and if not the process returns to step 478 to maintain the zoom. If at step 480 the head distance decreases indicating more lean forward, the process continues to step 482 to command more zoom. If at step 484 the head maintains the position, the process returns to step 478 to continue with the zoom. If at step 484 the head leans back to increase the distance to the head, the process continues to step 486 to send the HID command of Windows logo plus escape and, at step 488 the magnifier mode is exited.

Figure 27:
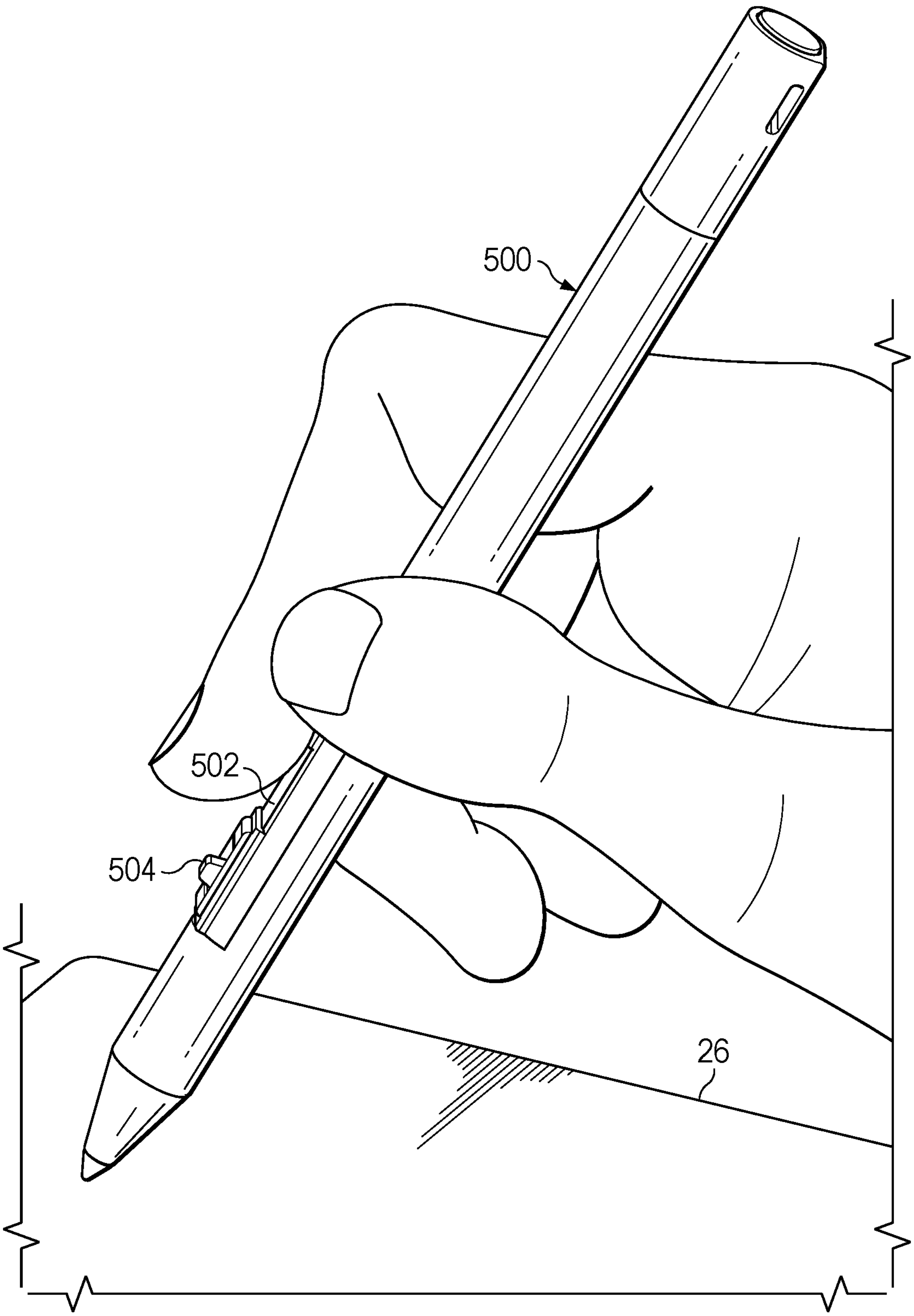
FIGS. 27 and 27A-27E depict an example of a stylus having a replaceable module to adapt to plural functions.
Figure 27A:
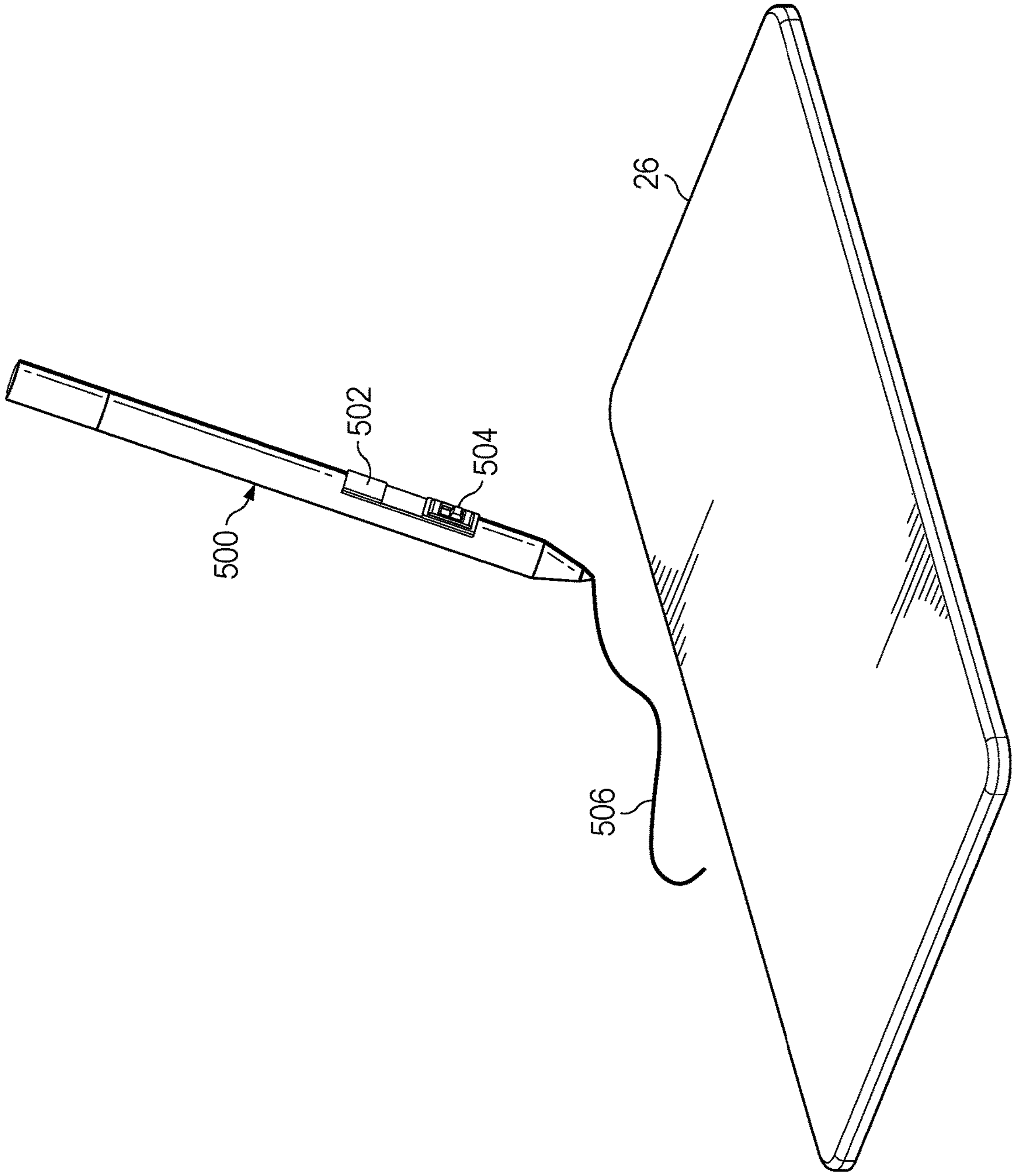
Figure 27B:
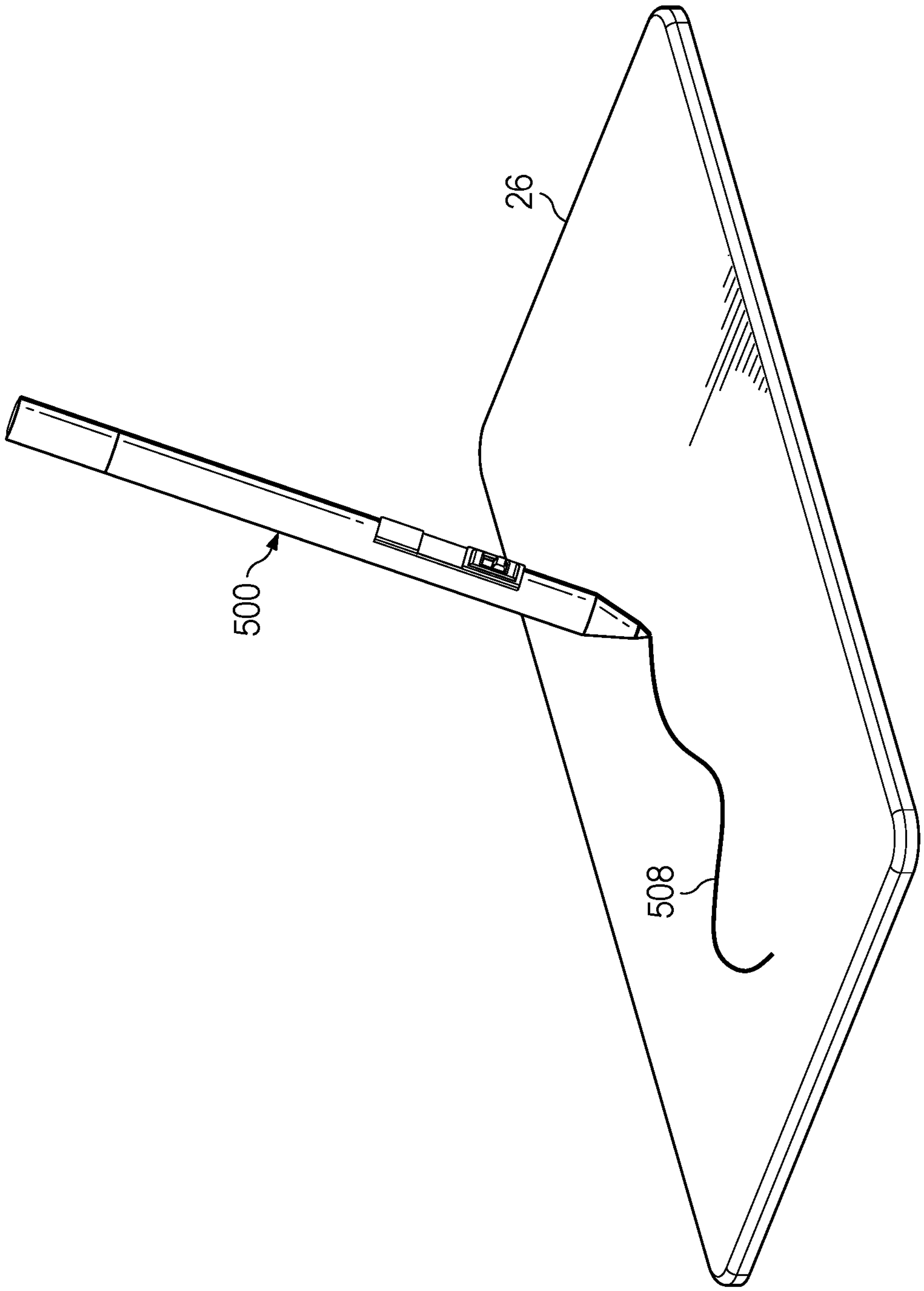
Figure 27C:
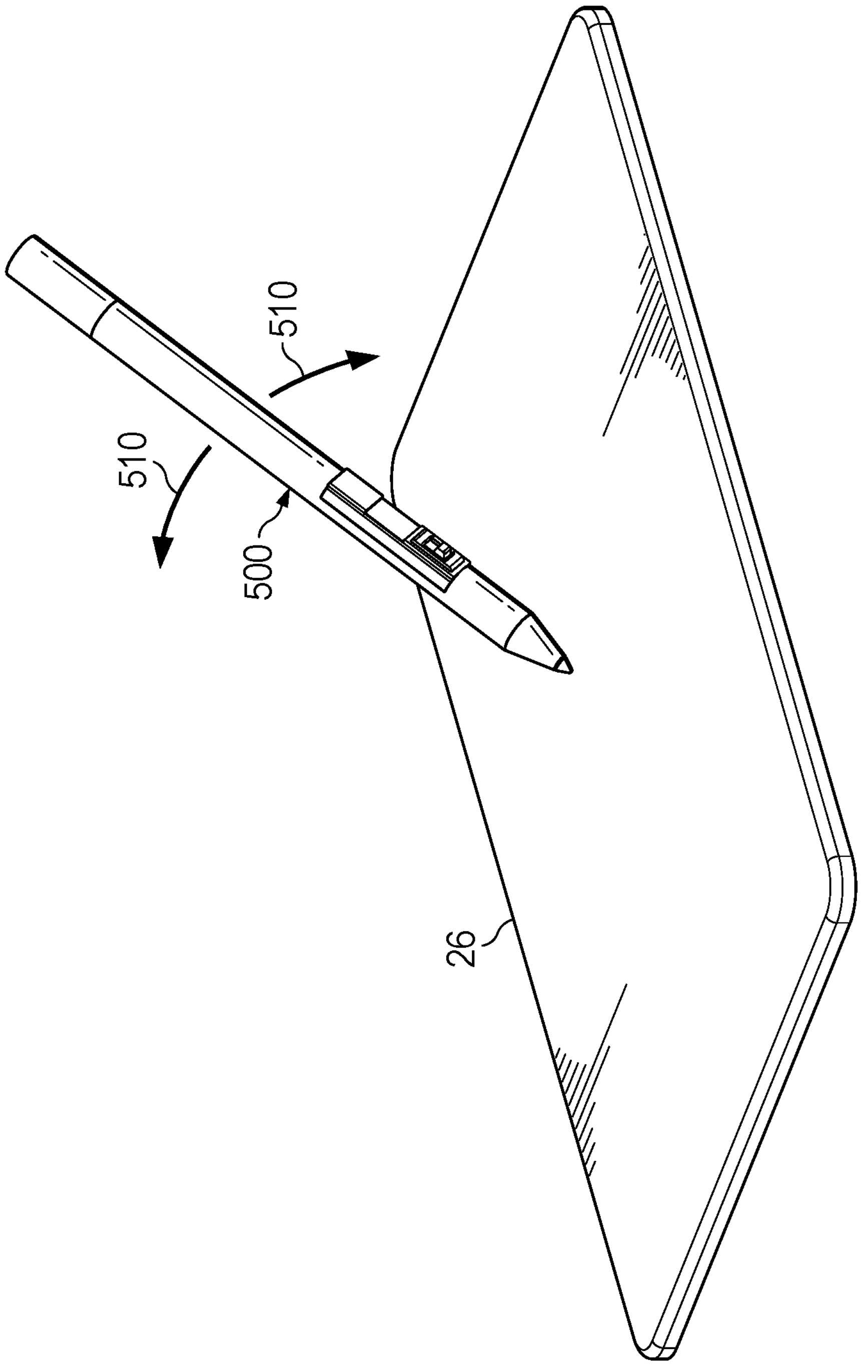
Figure 27D:
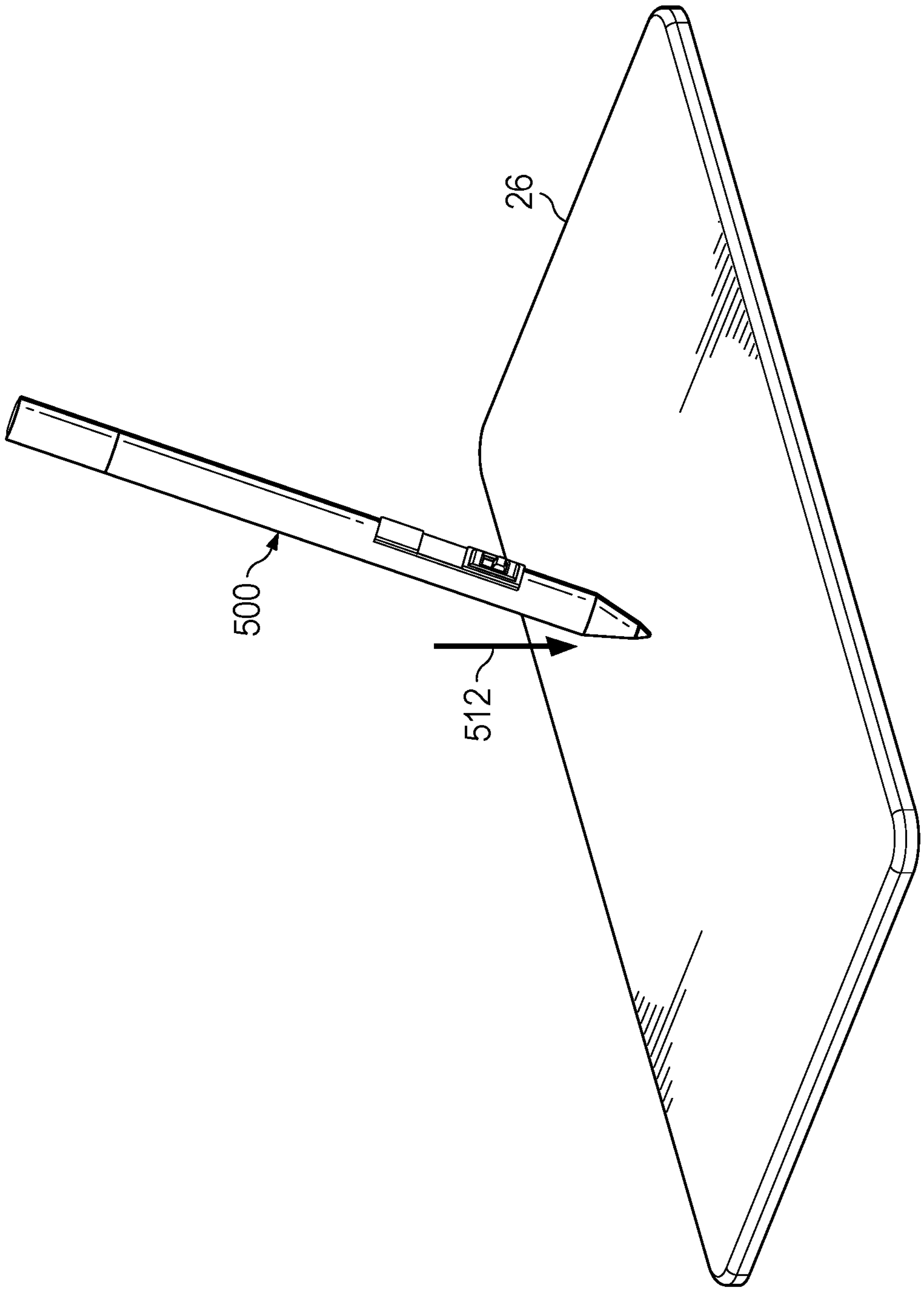
Figure 27E:
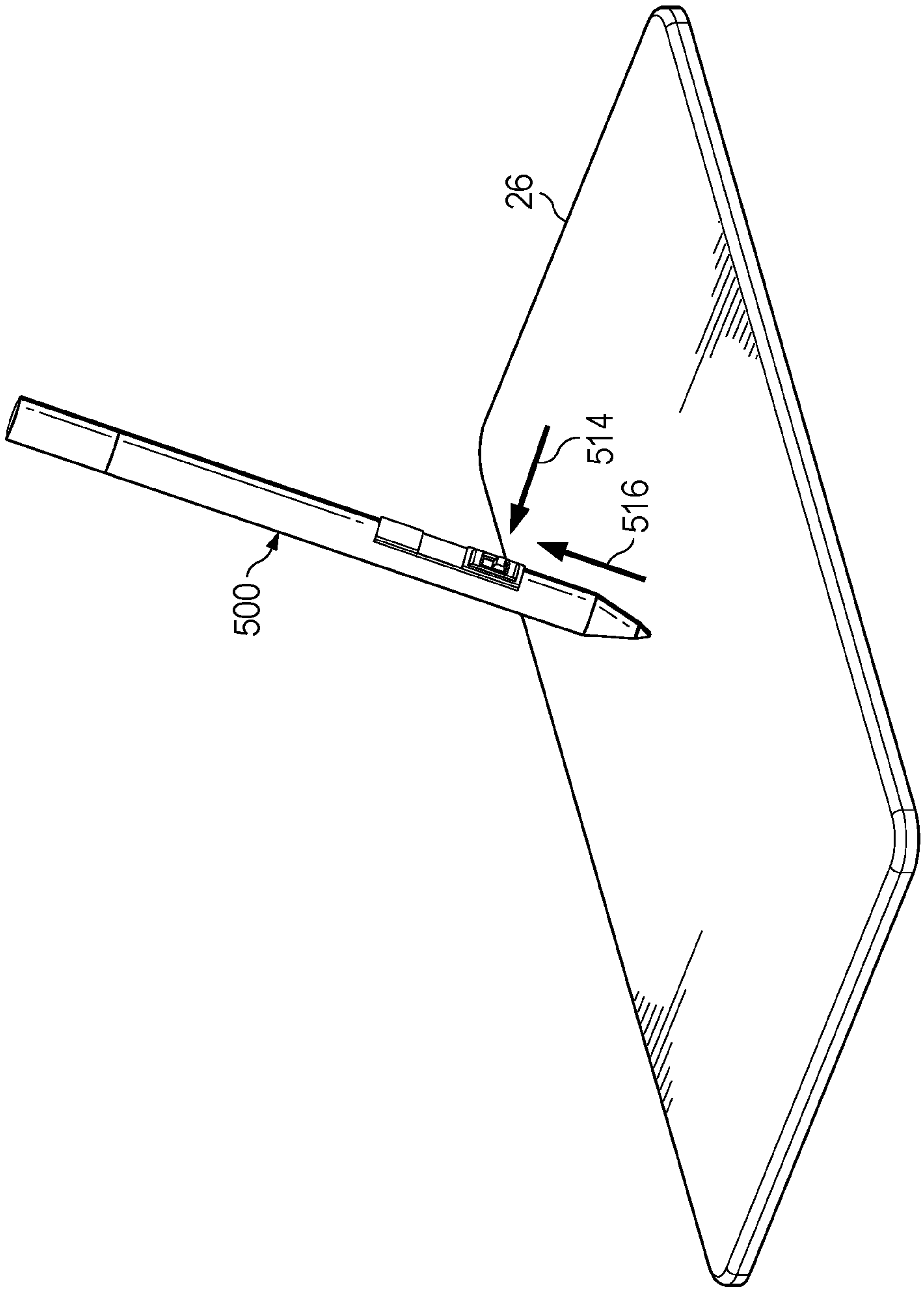

Referring now to FIGS. 27 and 27A through 27E, an example of a stylus 500 having a replaceable module to adapt to plural functions is depicted. In the example embodiment, stylus 500 performs touch inputs at a portable information handling system 26 by touching at the display with a writing tip. Stylus 500 has an opening in a housing that accepts a replaceable module that can perform different types of functions. A trigger button 504 and a capacitive touch surface 502 are exposed in the example replaceable module and configured to support gaming by accepting trigger pulls and touch inputs. In addition, a haptic feedback device, such as a haptic film, is included in the replaceable module to provide a haptic response in cooperation with portable information handling system 26. For instance, in a gaming application a swipe on touch surface 502 might change weapons, a tap might command a single weapon discharge and activation of trigger 504 might simulate a mouse left click. FIGS. 27A through 27E illustrate the use of the replacement module in a variety of situations. In FIG. 27A stylus 500 hovers over the touchscreen of portable information handling system 26 with an active tip that traces a movement illustrated by line 506 and having trigger 504 and touch surface 502 at the fingertips of the end user to command a fire. FIG. 27B depicts the same type of inputs but with stylus 500 placed on the touchscreen display to draw line 508. As an example, hover may command a quiet walk of a game participant while the touch and trace movement may command a run. FIG. 27C depicts a tilt 510 of the stylus detected by an accelerometer in the replaceable module that commands a lean of the game participant and accepts trigger and touch inputs to shoot. FIG. 27D depicts another alternative input embodiment having stylus 500 tap on portable information handling system 26 and apply variable pressure 512 detected by the stylus tip that provides 1024 levels of firing increments. FIG. 27E depicts a combination of a stylus 500 tap 516 and trigger pull 514 to command different types of weapons discharges. Other inputs might include taps and touches on the capacitive touch surface and haptic feedback that responds in a different manner based upon the type of weapon used. In one embodiment, portable information handling system 26 serves as an input device that interprets stylus 500 inputs and reports the inputs to a game running on a desktop information handling system. As is described in greater detail below, an end user adjusts the type of interactions provided by the stylus by swapping out the replaceable module with another module having different functions.

Figure 28A:
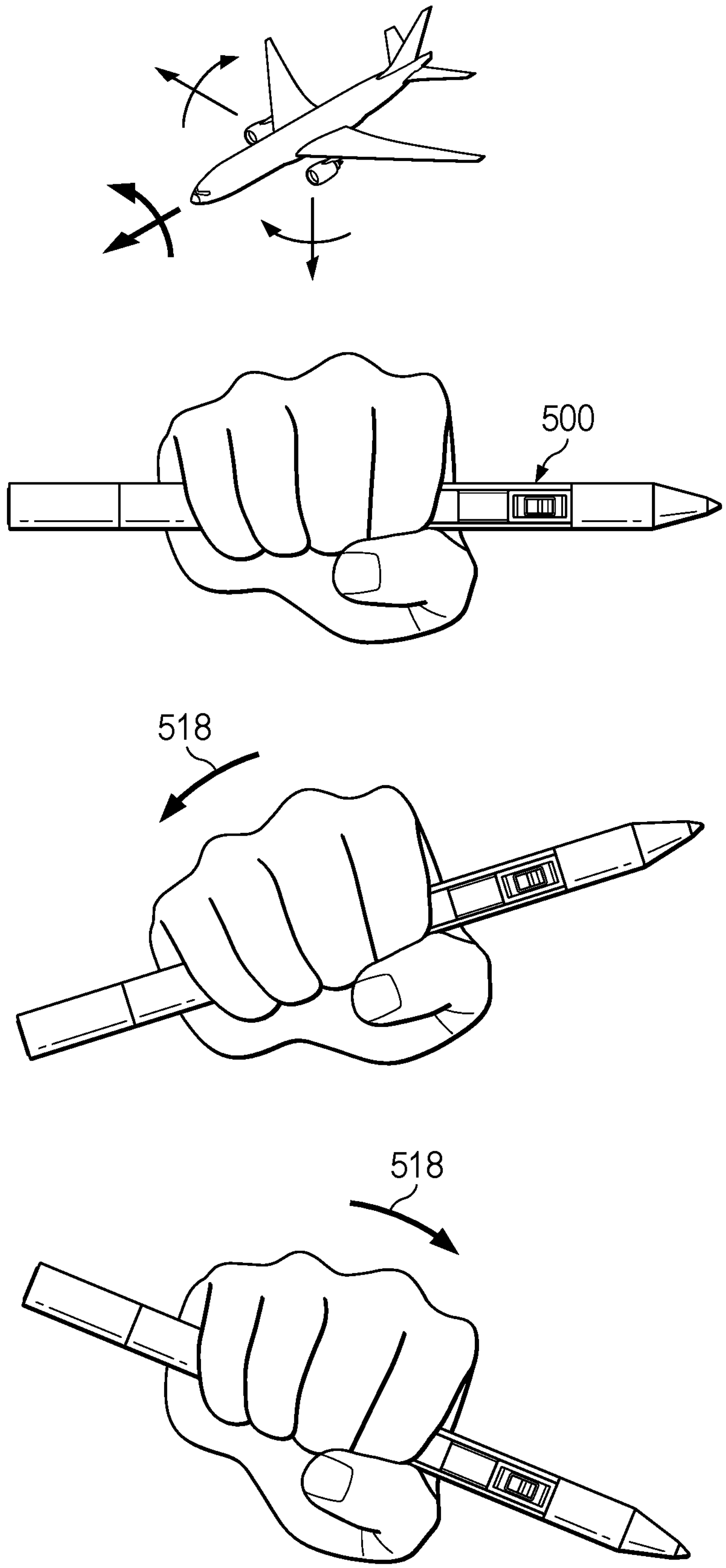
FIGS. 28A, 28B and 28C depict another example embodiment of a replaceable module use to support a gaming application.
Figure 28B:
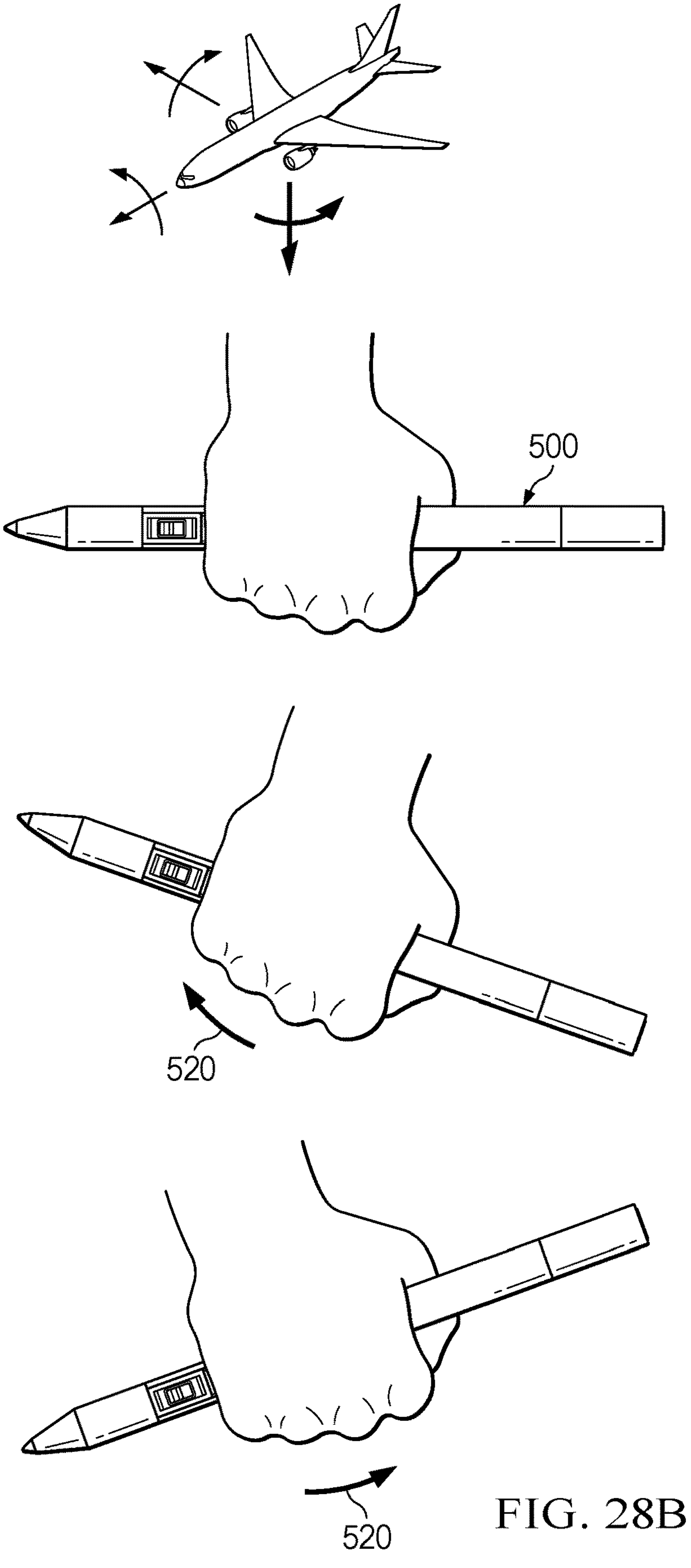
Figure 28C:
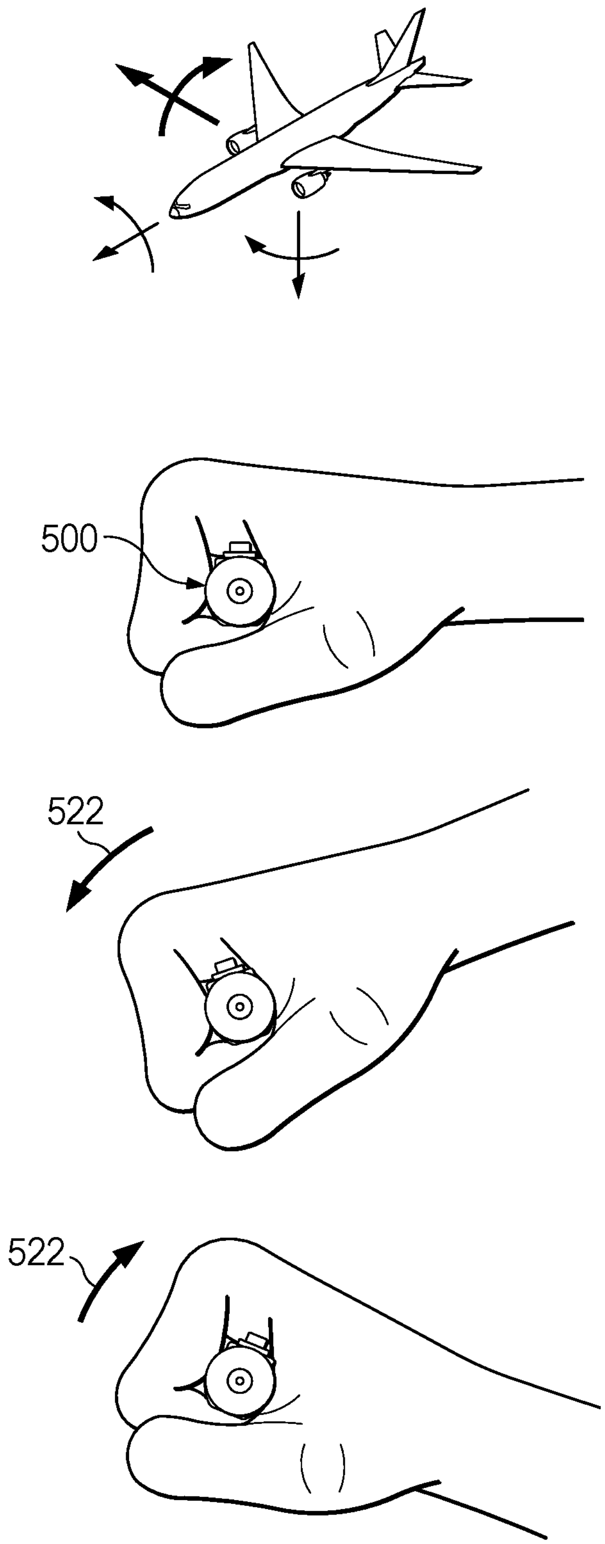

Referring now to FIGS. 28A, 28B and 28C, another example embodiment depicts a replaceable module used to support a gaming application. FIG. 28A depicts an end user grasp on a stylus 500 with a wrist rolling motion 518 that provides a roll axis input to an airplane gaming application. FIG. 28B depicts an end user grasp on stylus 500 with a wrist side-to-side motion 520 that provides a yaw input to an airplane application. FIG. 28C depicts an end user grasp on stylus 500 with a wrist curling motion 522 that provides a pitch axis input to an airplane application. In the example embodiment, the replaceable module includes an accelerometer to detect the motion and a capacitive touch detection surface to detect the end user grasp. Other types of inputs may include a trigger or button that controls airplane speed or weapons discharge.

Figure 29:
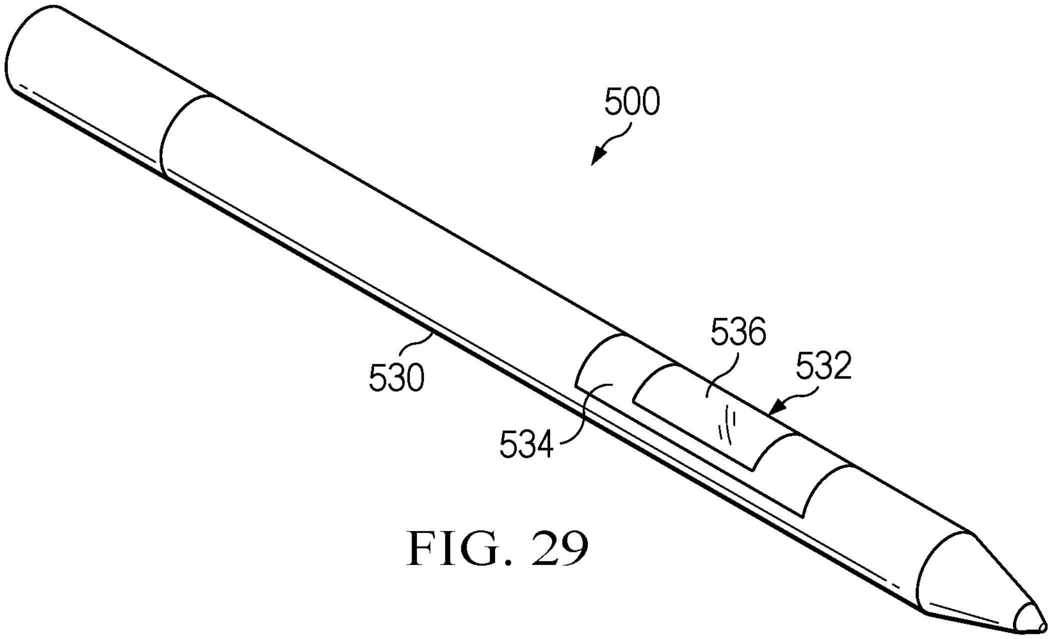
FIGS. 29 and 29A-29D depict an example of a stylus having a replaceable module.
Figure 29A:
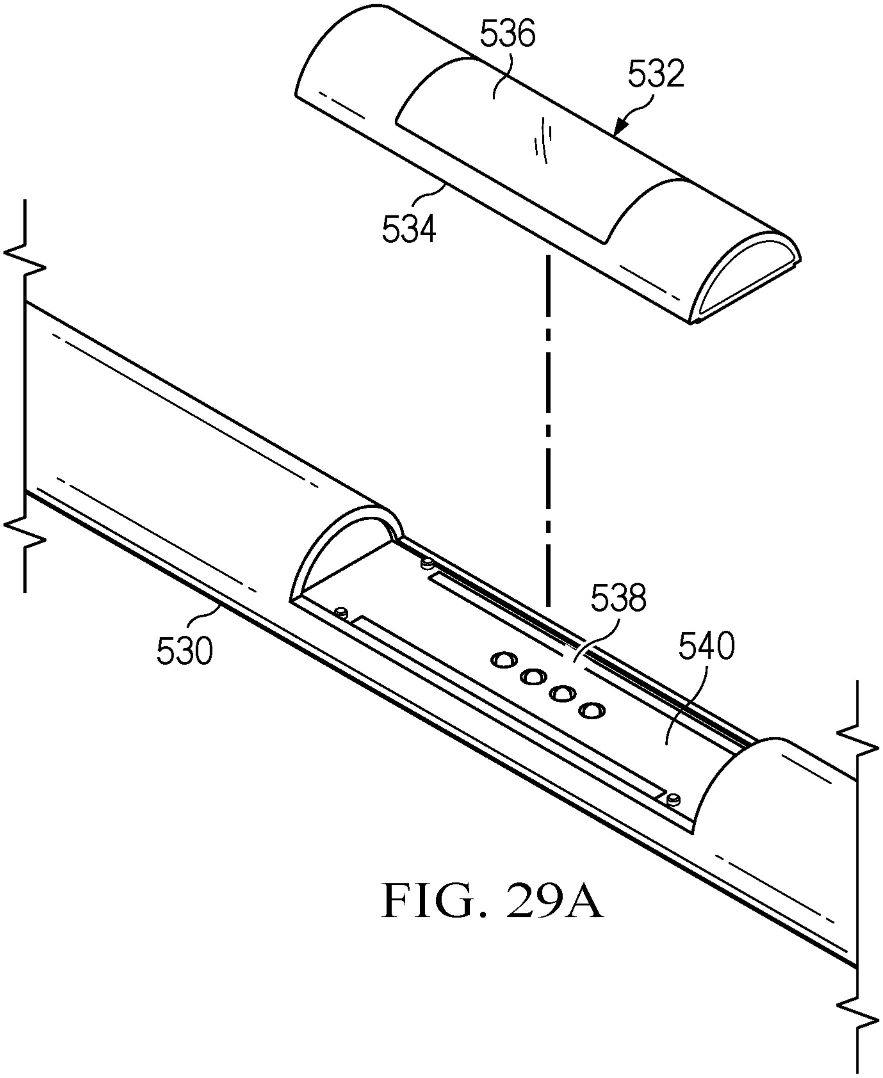
Figure 29B:
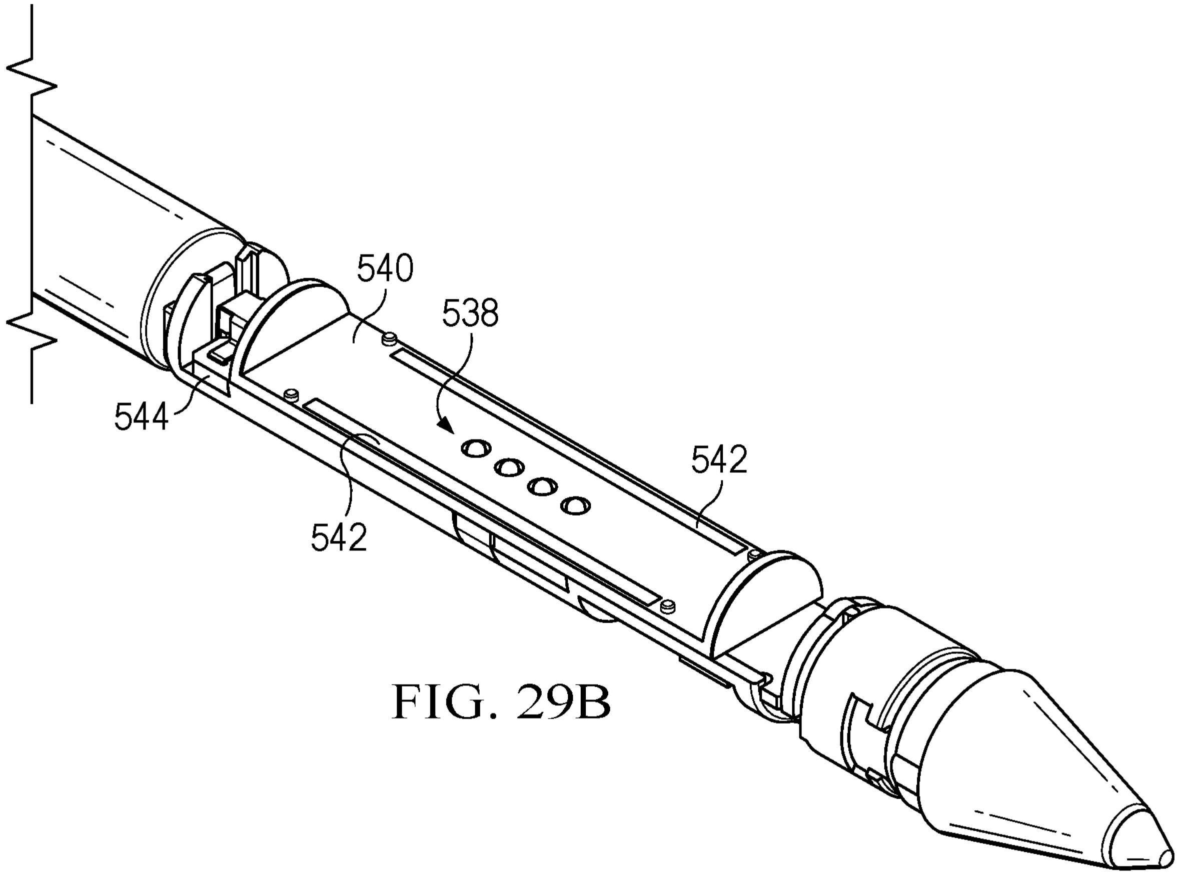
Figure 29C:
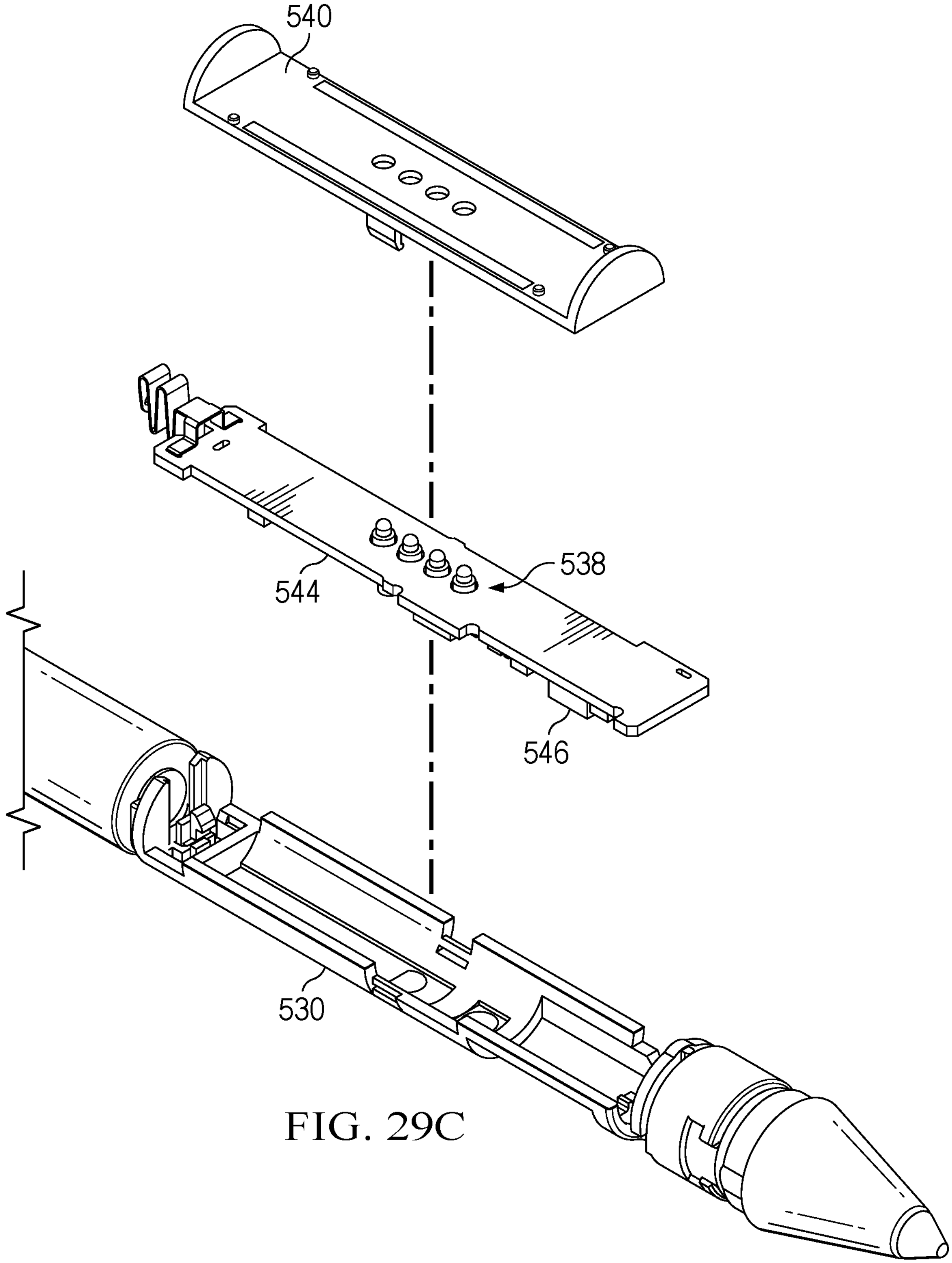
Figure 29D:
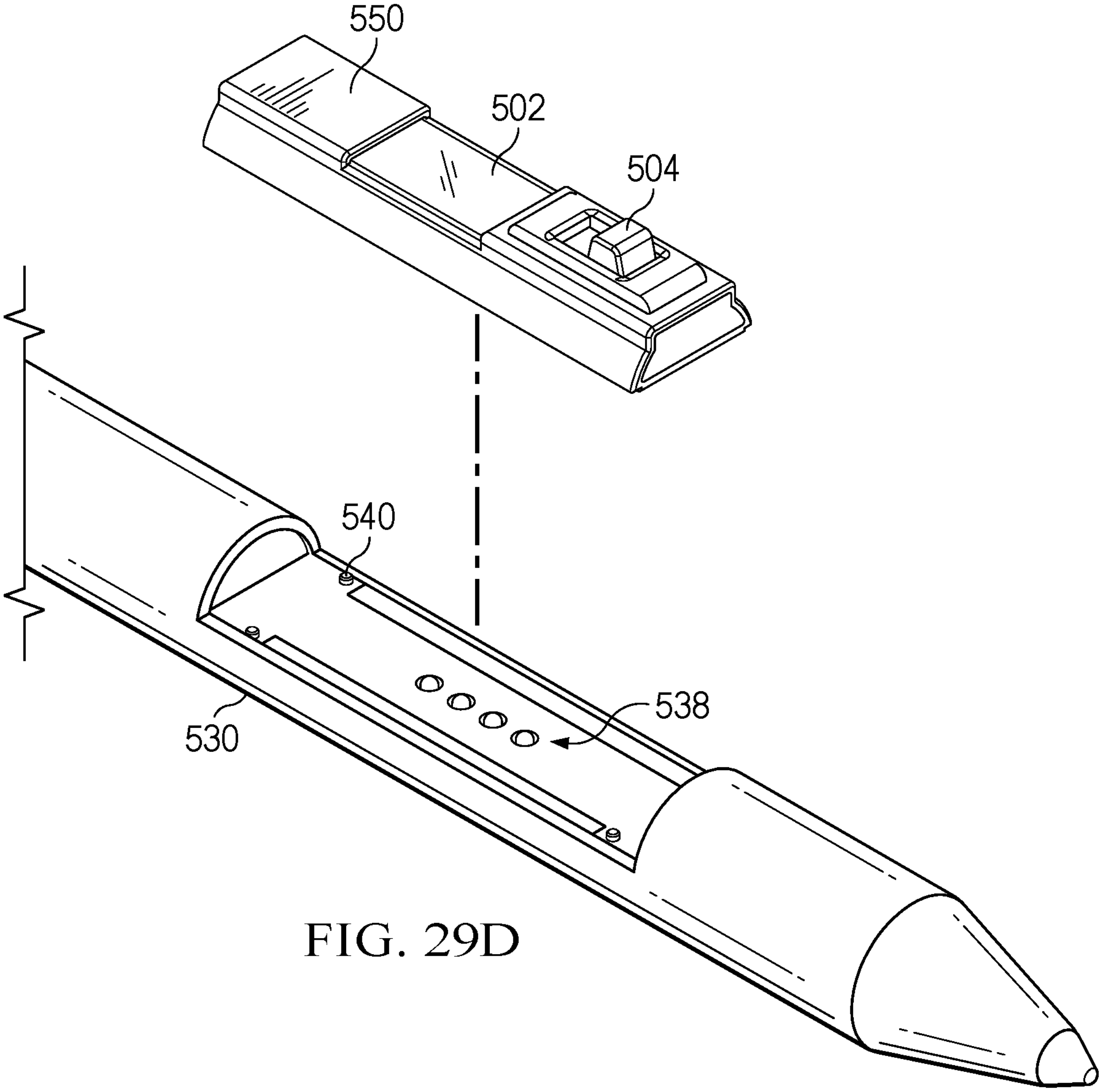

Referring now to FIGS. 29 and 29A through 29D, an example of a stylus 500 having a replaceable module 532 is depicted. Stylus 500 has an aluminum extruded housing 530 that forms a pen shape terminating at one end with a writing tip. Replaceable module 532 is sized to fit into an opening formed in housing 530 so that modules with different types of functions can fit into the opening. In the example of FIG. 29, replaceable module 532 has a capacitive touch window 536 and an integrated haptic response provided by a haptic film like that commercially available from KEMET. FIG. 29A depicts stylus 500 with replaceable module 532 removed to expose the interior of stylus 500 having a support 540 with pogo pins 538 or similar connectors to provide power and information communication with components in the interior or stylus 500. FIG. 29B depicts removal of support 540 from the interior of housing 530 to expose a main stylus circuit board 544 located underneath support 540. Magnets 542 disposed at the upper surface of support 540 hold the replacement module in place. FIG. 29C depicts an exploded view of stylus 500 to illustrate main circuit board 544 placed under support 540 with pogo pins 538 extending through openings of support 540 to provide power and information communication with the replacement module. Snaps formed in the side of support 540 couple to a mainboard holder to secure the support 540 in place over main board 544. Processing components 546 coupled to the bottom surface of main circuit board 544 provides the main stylus functions, such as WPAN communication, power and active signaling to enhance touch detection of the stylus tip. FIG. 29D depicts a replacement module 550 that couples to stylus 500 with different functions. In the example, a replacement module housing 550 exposes a capacitive touch input area 502 and a trigger 504. Replacement housing 550 fits into the replacement module opening of stylus housing 530 to engage pins 538 that lock the replacement module into position. Pogo pins 538 protrude upwards and into the replacement module to provide power and communication.

The replacement module takes advantage of an optimized stylus internal structure design that allocates the main circuit board in a manner to provide internal space for a second printed circuit board that supports additional functionality. By placing the main stylus board in one half the housing and the replacement function board in the other half of the stylus body divides functions between upper and lower housing halves. The upper half structure is then extracted and designed as a separate module from the main housing to selectively enable different stylus features. When the upper half is removed, a void is provided in the stylus housing to provide room for an expansion bay that fits a standardized footprint that adapts to replacement modules with selectable functionality. The expansion bay is a flat plastic cover with two parallel magnetic mounting strips. The cover then rests on the stylus main board to have structural strength that supports the replacement module. The pogo pins or other contact connectors extend up at a defined location that supports power and communication between the main board and the replacement module board. The main board is supported underneath by a plastic holder that has features for coupling with snaps of the plastic cover support and that sandwiches the stylus main board in place.

Figure 30:
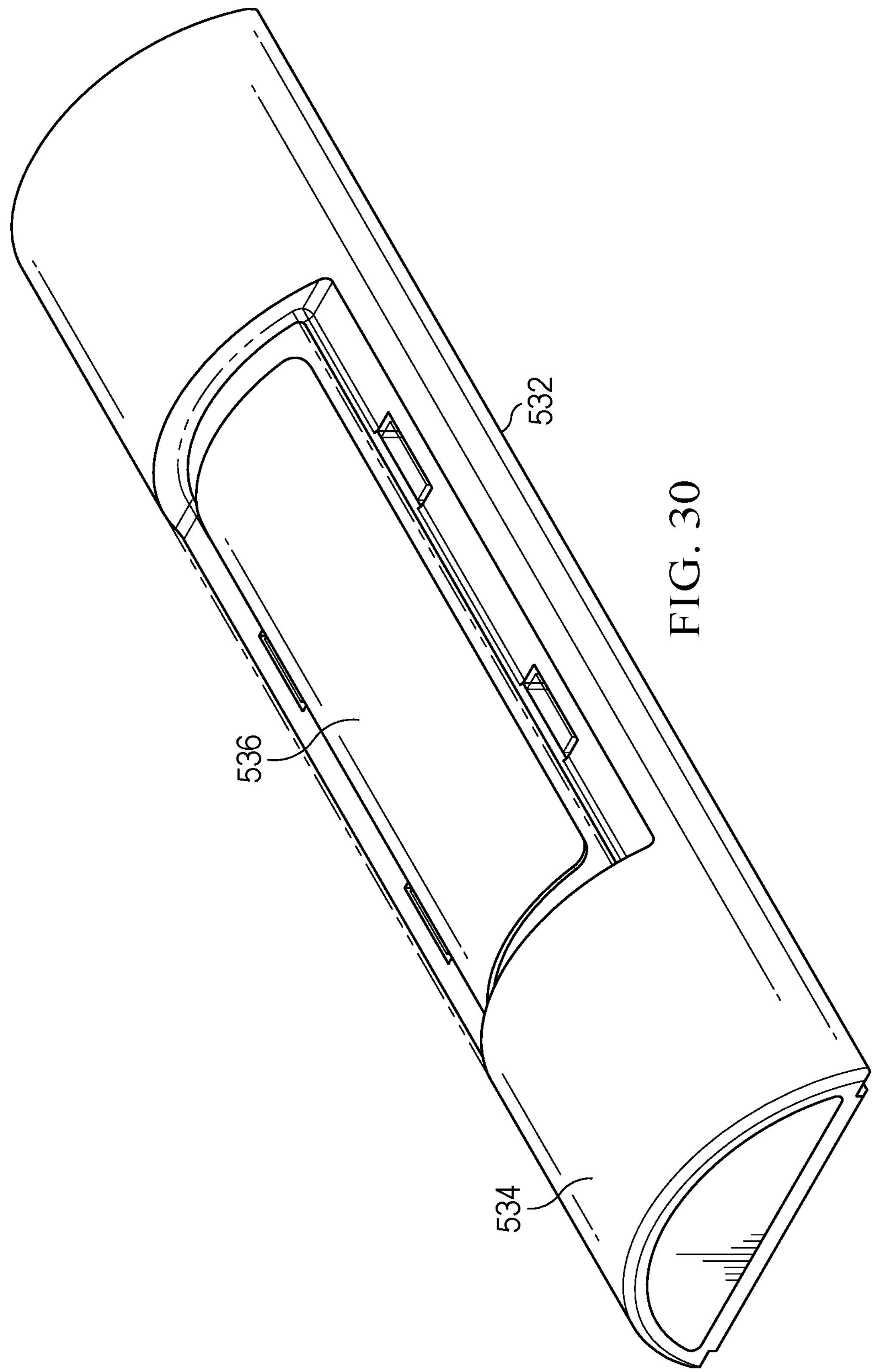
FIGS. 30, 30A, and 30B depict an example of a stylus replaceable module that supports capacitive touch and haptic response.
Figure 30A:
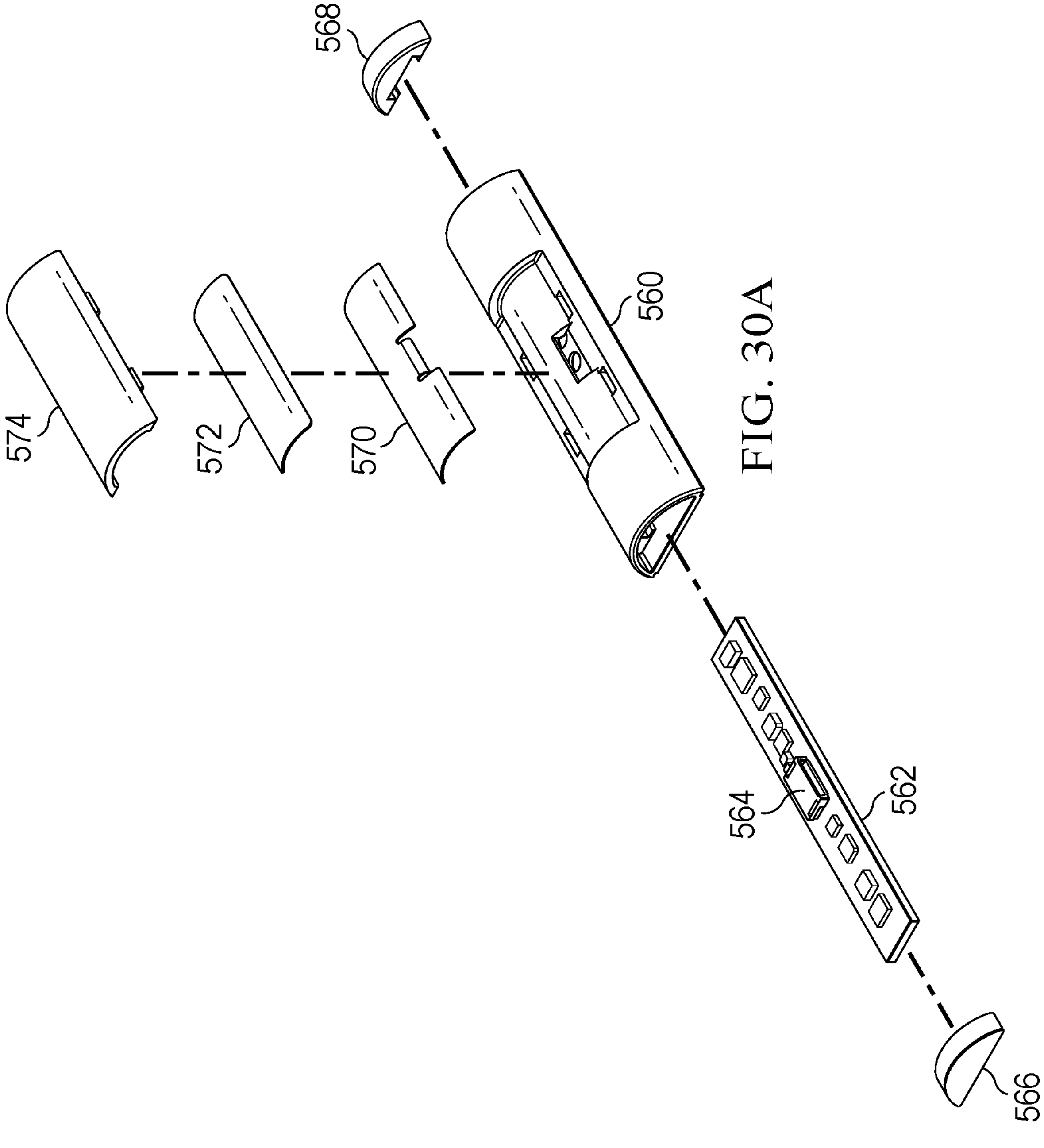
Figure 30B:
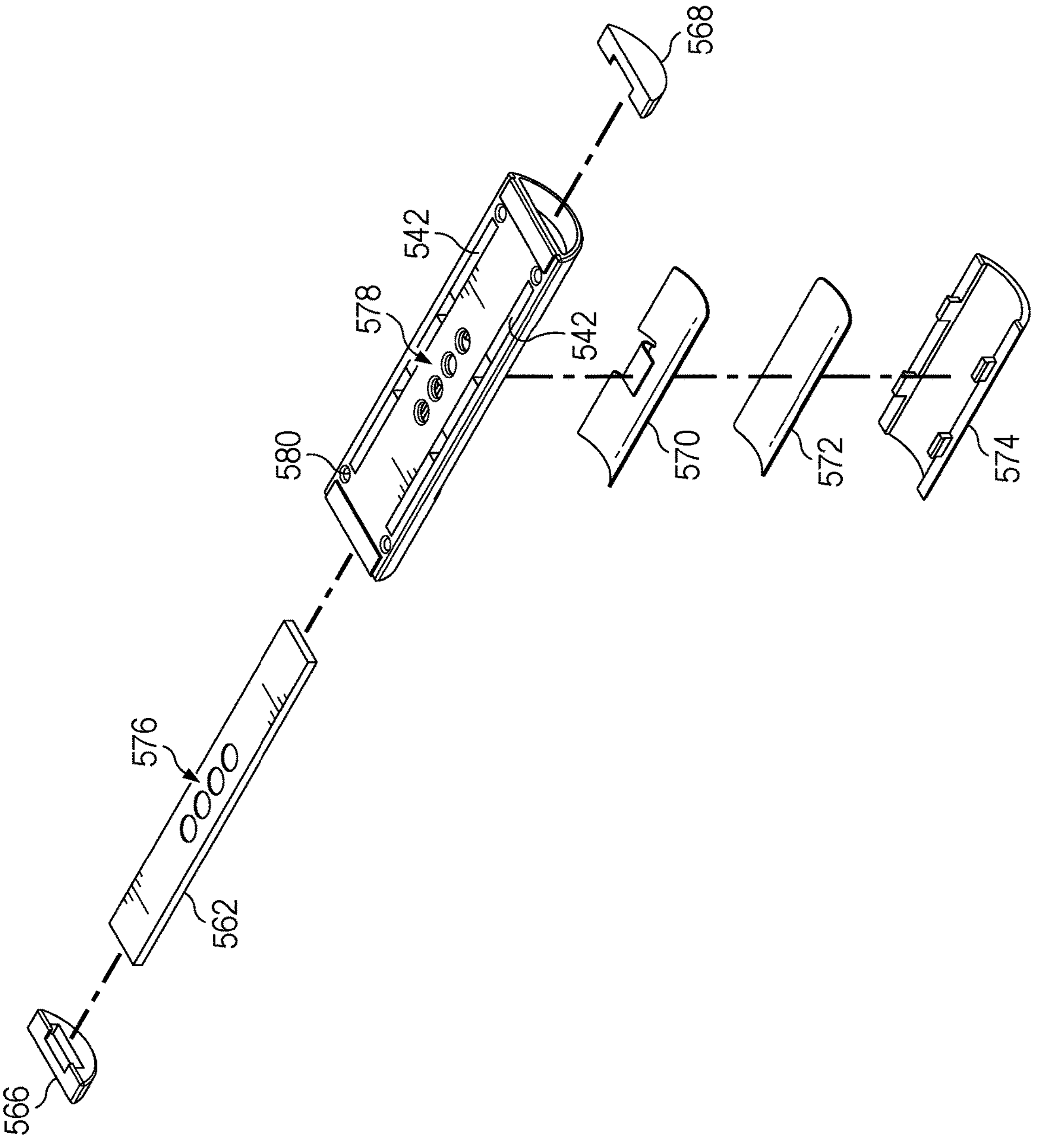

Referring now to FIGS. 30 and 30A through 30B, an example of a stylus replaceable module is depicted that supports capacitive touch and haptic response. When this replacement module couples to the stylus it provides pen capacitive touch and haptic feedback. Capacitive touch can be customized for gestures like tapping and sliding to trigger functions, either defined within firmware of the stylus or by communicating the touch information to an information handling system through a WPAN. A haptic device in the replacement module provides a haptic response to confirm the touch input, such as gestures. The main exterior housing of the replacement module is extruded aluminum with mechanic features machined. The replacement module housing has a flexible printed circuit connector that slides into the main stylus housing to couple with the main stylus board. The haptic film generates a haptic response to the capacitive touch surface by coupling to the surface with a double sided adhesive. The bottom of the housing has magnetic strips to hold the module in place at the main board. FIG. 30 depicts the assembled capacitive touch haptic module with a capacitive touch detection window 536 that includes a haptic feedback and is held in an outer housing 534. FIG. 30A depicts an exploded view of the capacitive touch and haptic module 532. A plastic outer cover 574 fits over a haptic film 572 and a flexible printed circuit 570 that includes capacitive touch detection. The plastic cover, haptic film and capacitive touch circuit couple with adhesive to an extruded aluminum housing 560 having openings to provide electrical interfaces with the replacement module board 562, such as at a centrally located connector 564. End caps 566 and 568 couple to the ends of housing 560 to hold replacement circuit board 562 securely in place. FIG. 30B depicts a bottom view of the replacement module having pogo pin contacts 576 on the bottom surface of replacement circuit board 562 that align with openings 578 in the replacement module housing bottom surface that pass through main board pogo pins. Magnets 542 align to couple to stylus housing magnets and pin locating holes 580 help to secure the replacement module housing in place to the stylus housing.

Figure 31:
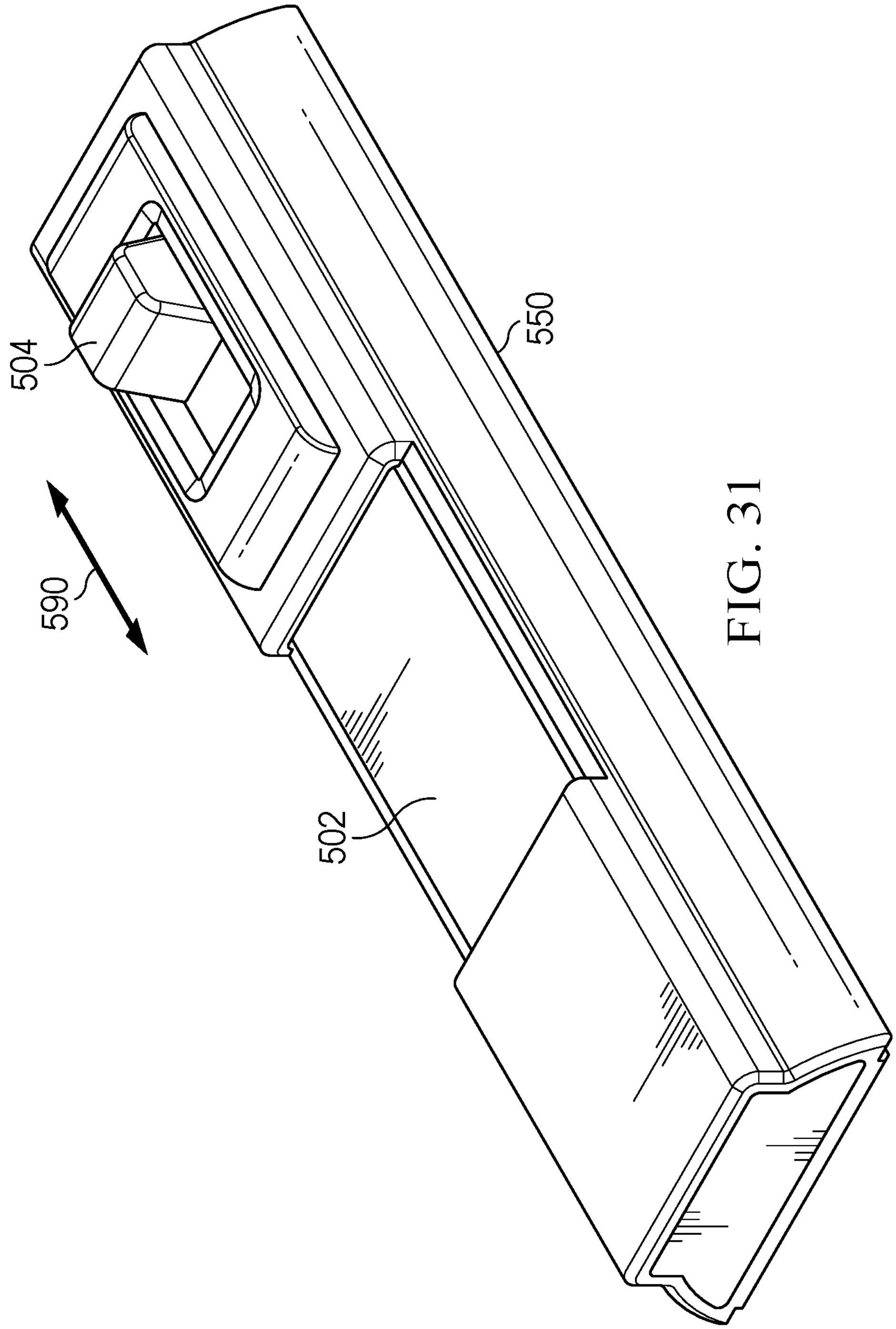
FIGS. 31, 31A, and 31B depict an example of a stylus replaceable module that supports capacitive touch and trigger inputs.
Figure 31A:
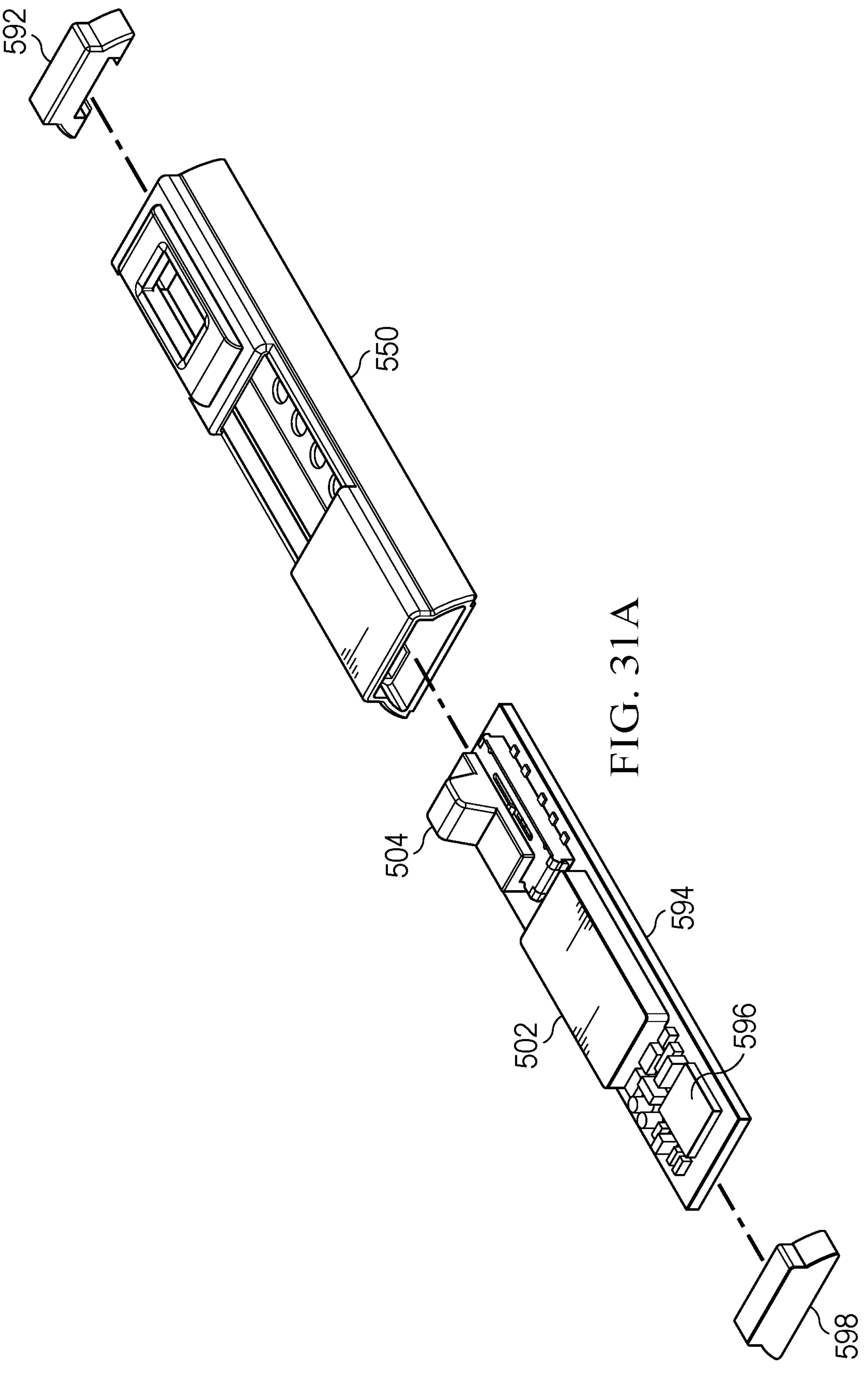
Figure 31B:
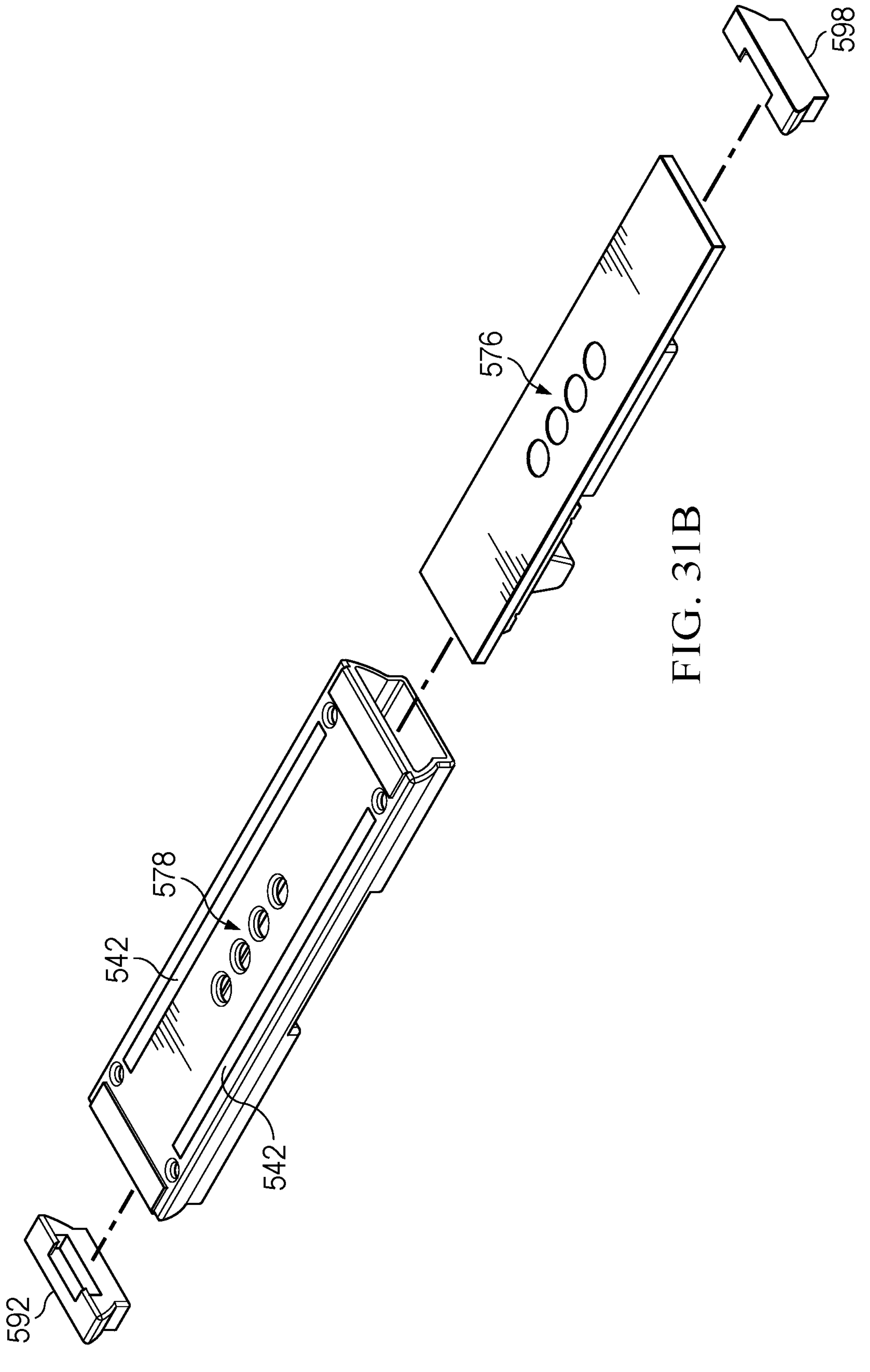

Referring now to FIGS. 31 and 31A through 31B, an example of a stylus replaceable module 550 is depicted that supports capacitive touch and trigger inputs. In the example embodiment, a trigger 504 accepts press inputs and a capacitive touch surface 502 accepts finger touch inputs. When the replacement module couples in the stylus expansion bay, it provides a touch input surface, such as to accept taps and a trigger input with a spring back of the trigger after release. The main housing of the module is made of extruded and then machined aluminum. The touch module is soldered on the mainboard that slides into the main housing from a side opening that is sealed by end caps at both ends after manufacture is complete. The bottom of the housing has two magnetic strips to hold the module down when attached with guiding pins and edges that prevent the module from slipping lose when installed in a stylus. FIG. 31A depicts that the module circuit board 594 has the capacitive touch surface 502 and trigger 504 coupled at an upper surface and configured to slide into the housing and captured between end caps 592 and 598. A processing resource 596, such as an MCU, couples to the circuit board 594 and includes non-transitory memory that stores instructions to manage trigger and touch inputs and report the inputs to the stylus main board for communication to an information handling system. FIG. 31B depicts a bottom exploded view of the replaceable module show openings 578 that pass through pogo pins of the main board to contact pads 576 of the module board, magnets 542 that attract to magnets disposed in the stylus and pin locating holes to aid in holding the replacement module to the stylus when installed.

Figure 32:
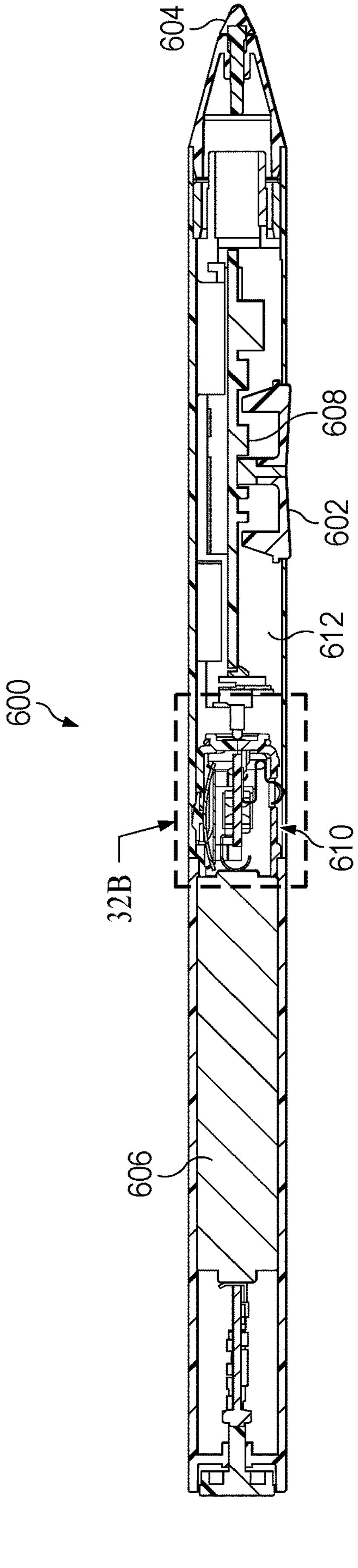
FIGS. 32, 32A, and 32B depict an example of a stylus replaceable module that supports a battery quick swap.
Figure 32A:
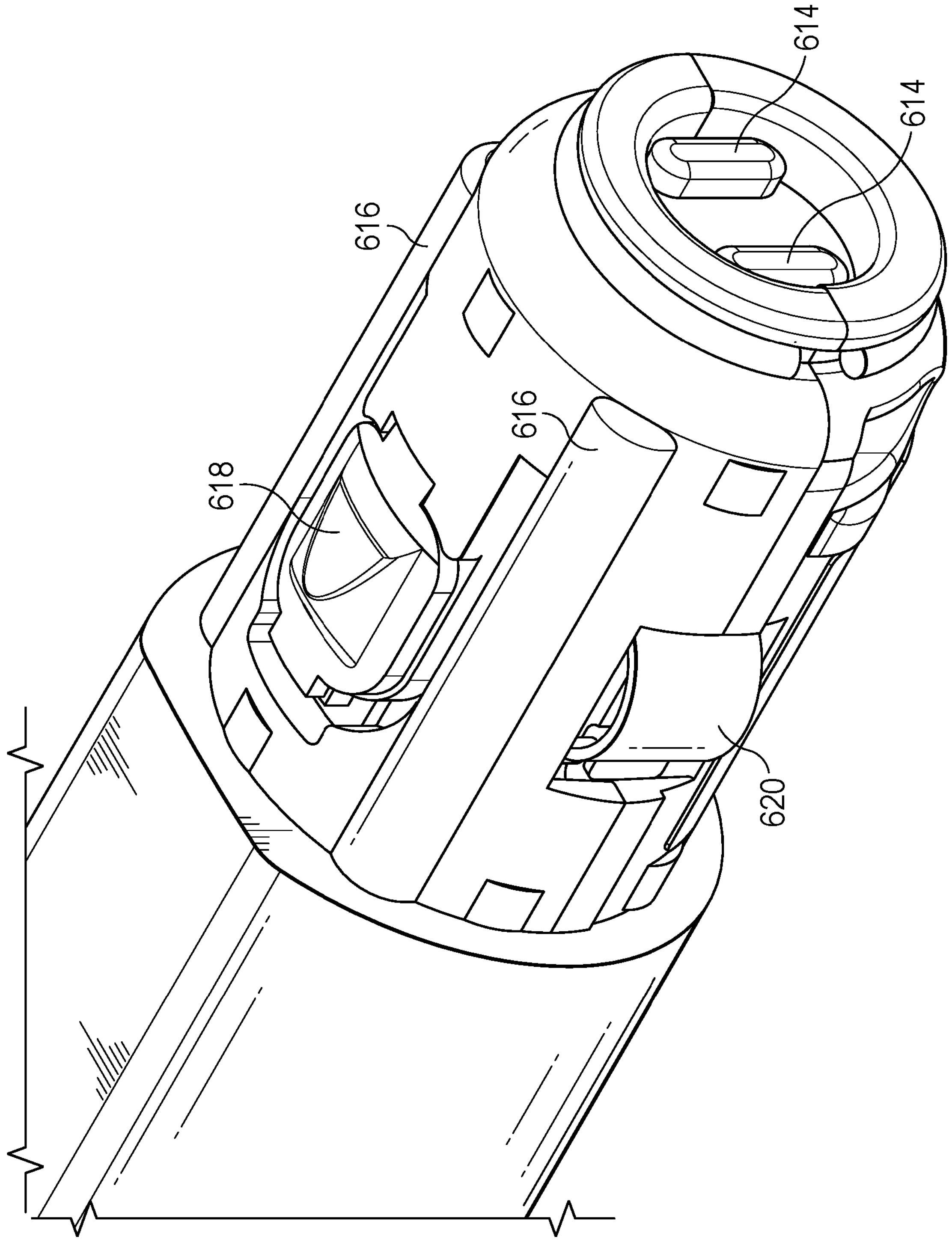
Figure 32B:
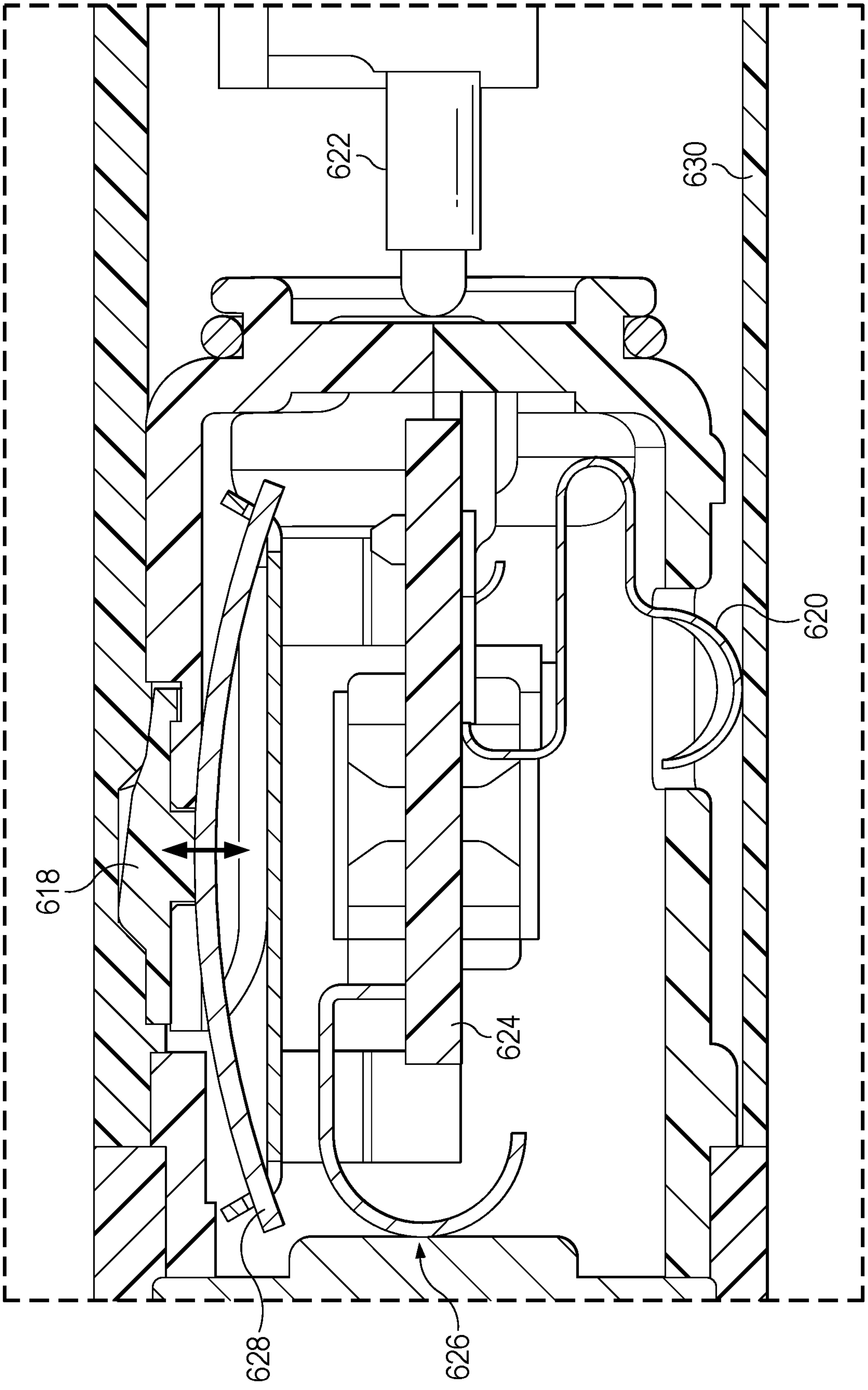

Referring now to FIGS. 32 and 32A through 32B, an example of a stylus replaceable module is depicted that supports a battery quick swap. The expansion bay that accepts the replacement module can support a number of additional features including an extended life battery that quick swaps, a Bluetooth memory stick that acts similar to a key FOB and a storage area to keep extra writing tips. The battery replaceable module can act as a secondary or backup battery to offer extended capacity and to provide a quick swap with a charged battery when the stylus battery runs low. FIG. 32 depicts an example of a stylus 500 having a replaceable module 600 with a rechargeable battery 606. An internal coupling contact 610 interfaces the battery section with a main stylus section 602. A processing resource 608 runs on the battery power routed through a connection 612 to provide an active capacitance signal to a writing tip 604. FIG. 32A shows the insertion end of the battery module having ribs 616 that guide the battery module to couple at the correction orientation with the stylus portion so that battery contacts 614 communicate power to the main stylus portion. A ground contact and engagement spring 620 couples to the stylus housing portion and shares a common ground with the battery. A release button 618 biases out of the battery end to engage with the stylus portion and presses to release the battery portion from the stylus portion. FIG. 32B shows a sectional view of the battery coupling portion having release 618 biased out by a spring 628 to engage with the stylus housing. An internal battery contact 626 routes power through a circuit board 624 for communication to a pogo pin 622 that extends from the stylus portion and against the battery contacts. Ground contact 620 presses against the extruded aluminum stylus body 630 to both share ground and also hold the battery and stylus portions together.

Figure 33:
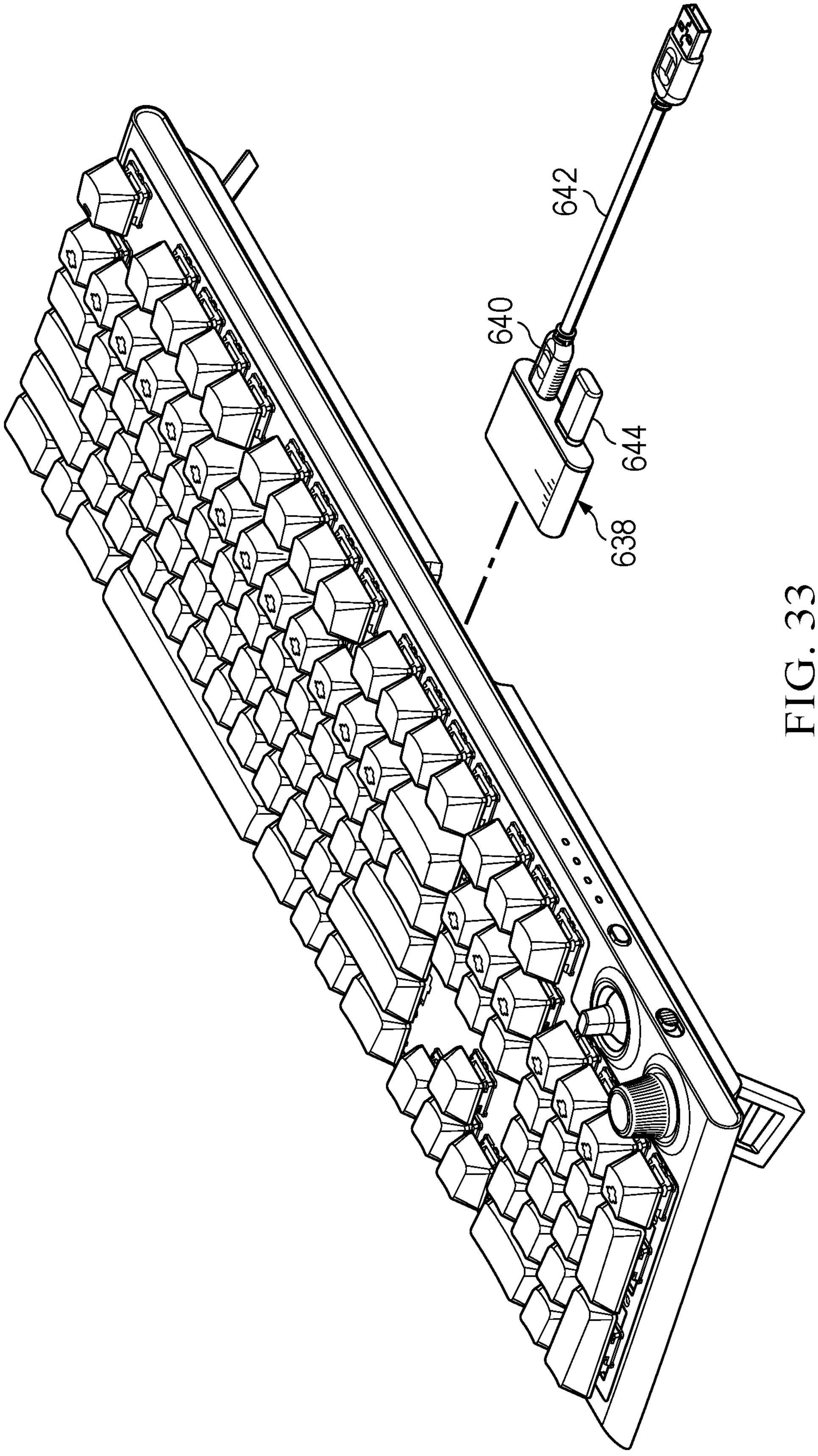
FIG. 33 depicts keyboard with asymmetrical magnetic charging.
Figure 34:
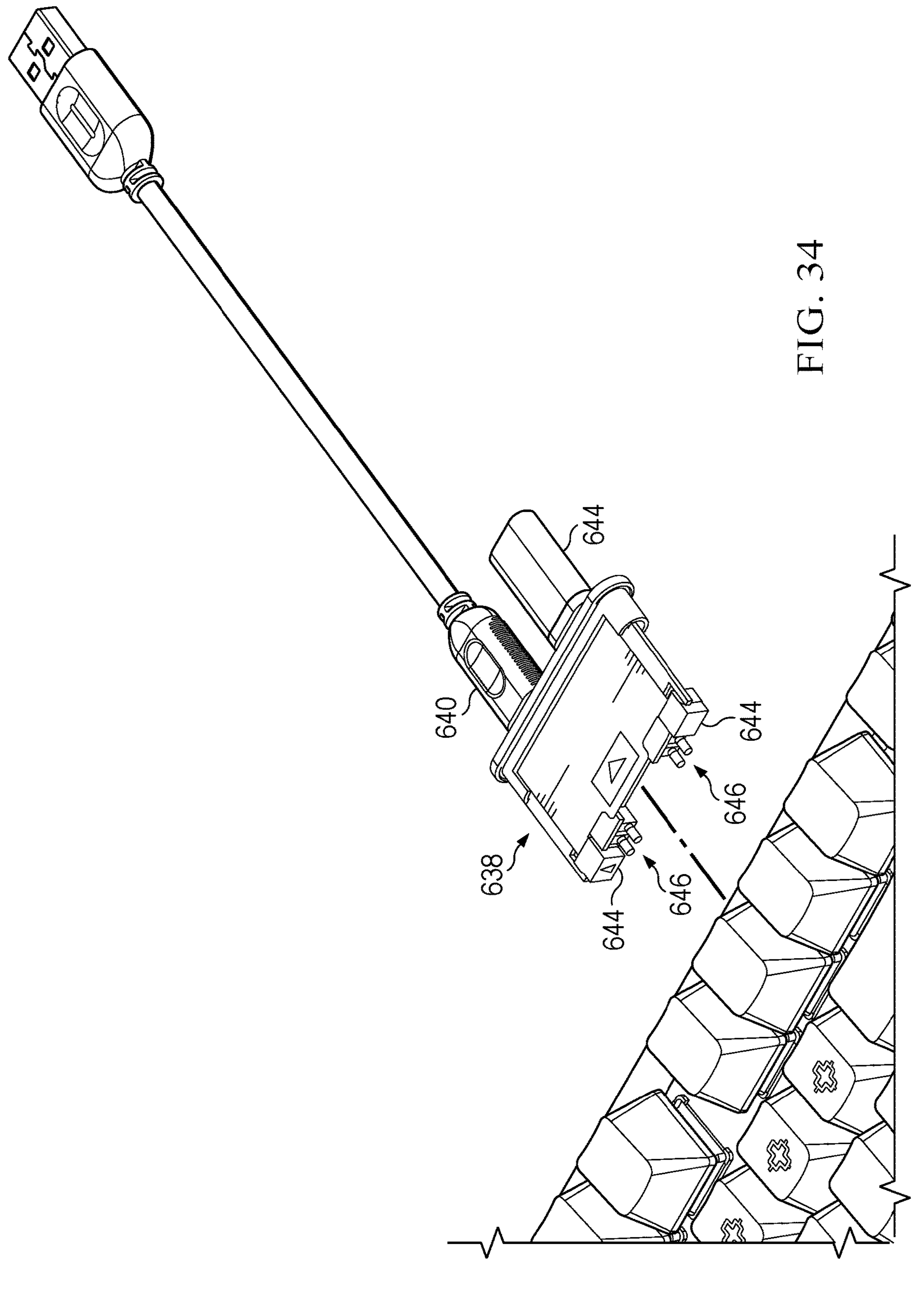
FIG. 34 depicts the asymmetrical magnetic charger aligned to couple to and charge the keyboard.
Figure 35:
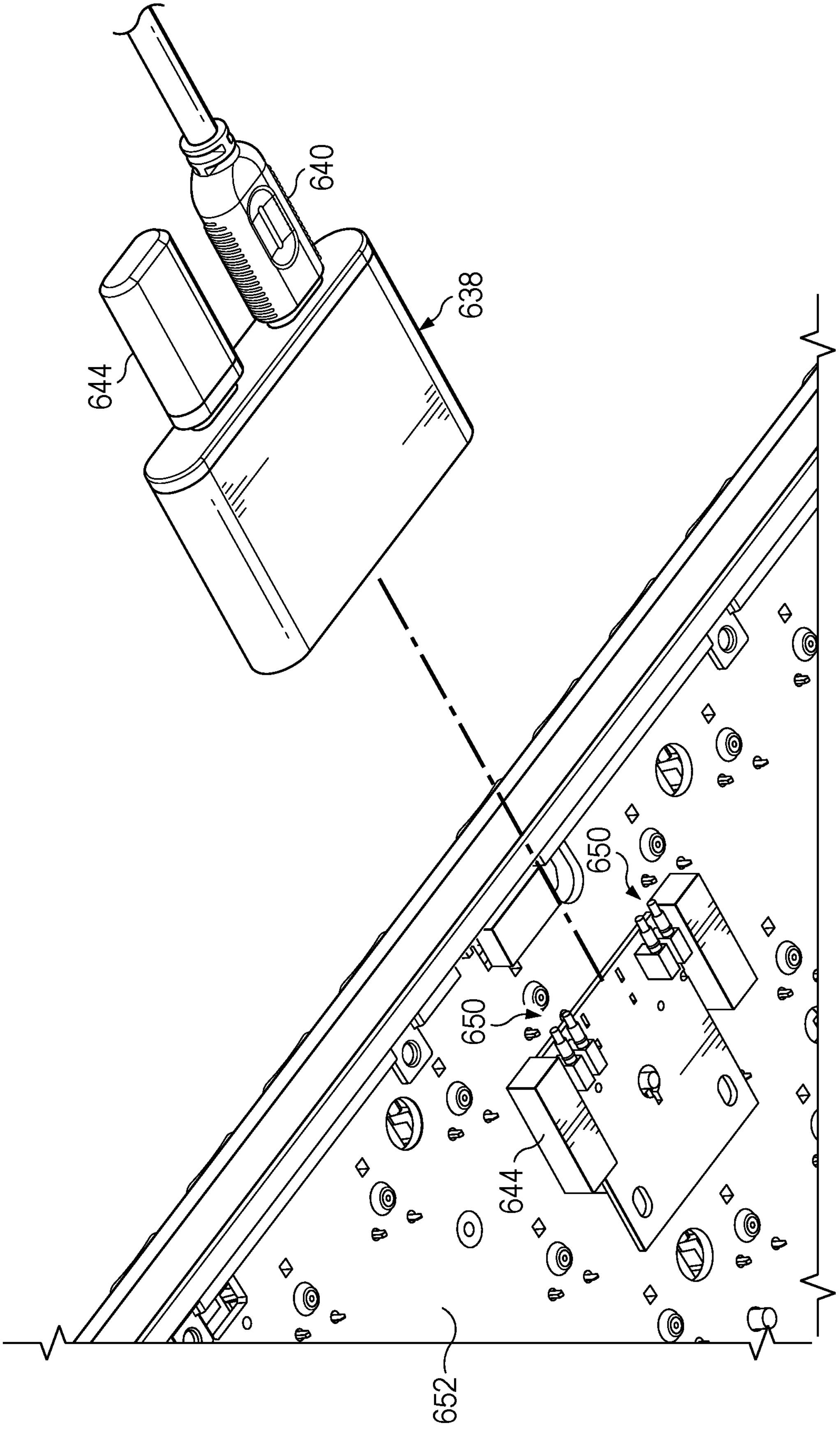
FIG. 35 depicts the asymmetrical magnetic charger aligned to engage with the keyboard.

Referring now to FIG. 33 a keyboard 36 is depicted with asymmetrical magnetic charging. A keyboard power connector 638 couples to a charging cable 642 with a port 640, such as a USB connector. A wireless dongle 644 also couples to the power connector 638 to support wireless communication between the keyboard and an information handling system coupled through cable 642. Referring now to FIG. 34, the asymmetrical magnetic charger is depicted aligned to couple to and charge the keyboard. A pair of magnets 662 having opposing polarity are arranged at opposite ends of power connector 638 to attract with magnets disposed in the keyboard. Referring now to FIG. 35, the asymmetrical magnetic charger is depicted aligned to engage with the keyboard. Due to the opposing polarity of magnets of opposite sides of power connector 638 and the keyboard charging port, power connector 638 will insert into keyboard 36 with only one orientation. If power connector 638 inserts into keyboard 36 with an incorrect orientation, like polarity of the magnets in the keyboard and the charging connector will repel the charging connector away from the keyboard. When inserted with the correct orientation, positive pins 646 of power connector 638 will contact positive pins 650 within the keyboard and negative pins 646 of power connector 638 will contact negative pins 650 of keyboard 36 circuit board 652.

Figure 36A:
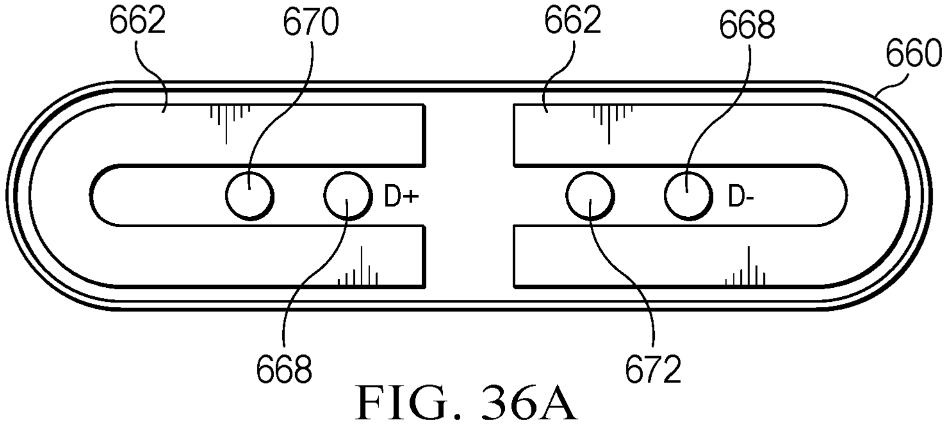
FIGS. 36A and 36B depict an alternative arrangement for asymmetrical magnetic charging.
Figure 36B:
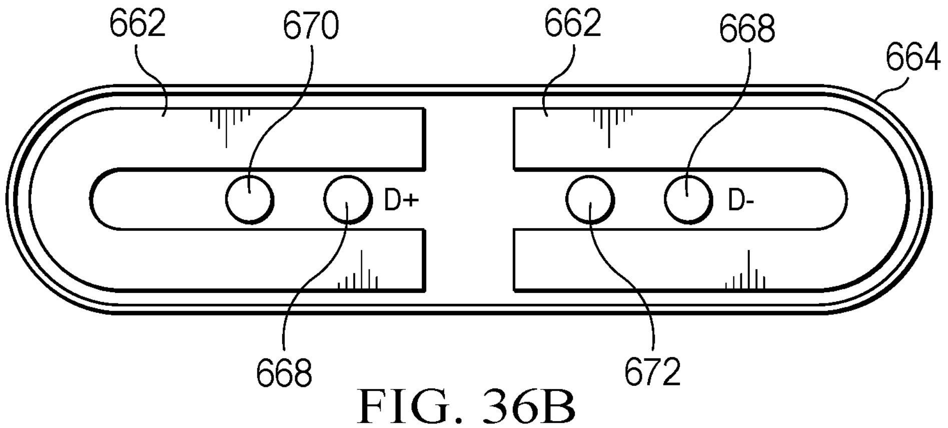

Referring now to FIGS. 36A and 36B, an alternative arrangement is depicted for asymmetrical magnetic charging. FIG. 36A depicts a plug side connector 660 having a north polarity magnet 662 on the side of positive charging pin 670 and a south polarity magnet 662 on the side of negative charging pin 672. The outside of the positive charging pins communicates positive charge and the other inside communication pin 668 supports a charging handshake. The outside of the negative charging pins provides the charging handshake and the inside of the charging pin provides ground. FIG. 36B depicts a receptacle side of the connector 664 having a south polarity magnet 662 on the positive charge pin 670 and a north polarity magnet 662 on the negative charge pin 672. Receptacle side of connector 664 also places the positive charge pin 670 to the outside and the communication pin 668 to the inside so that receptacle connector 664 will correctly interface with plug connector 660. Similarly, ground charging pin 672 of receptacle connector 664 is at the inside and communication pin 668 is at the outside to correctly interface with plug connector 660. Plug connector 660 and receptacle connector 664 attract when correctly oriented relative to each other and repel when misoriented. Placement of charging pins 670 and communication pins 668 in alternate positions prevents a charging pin from connecting with an incorrect opposing charging pin if the connector and receptacle couple misoriented. That is, when an inverted connection is attempted, the like magnet poles will repel and the connector physical housing alignment will prevent a cross of positive and ground connectors.

Figure 37:
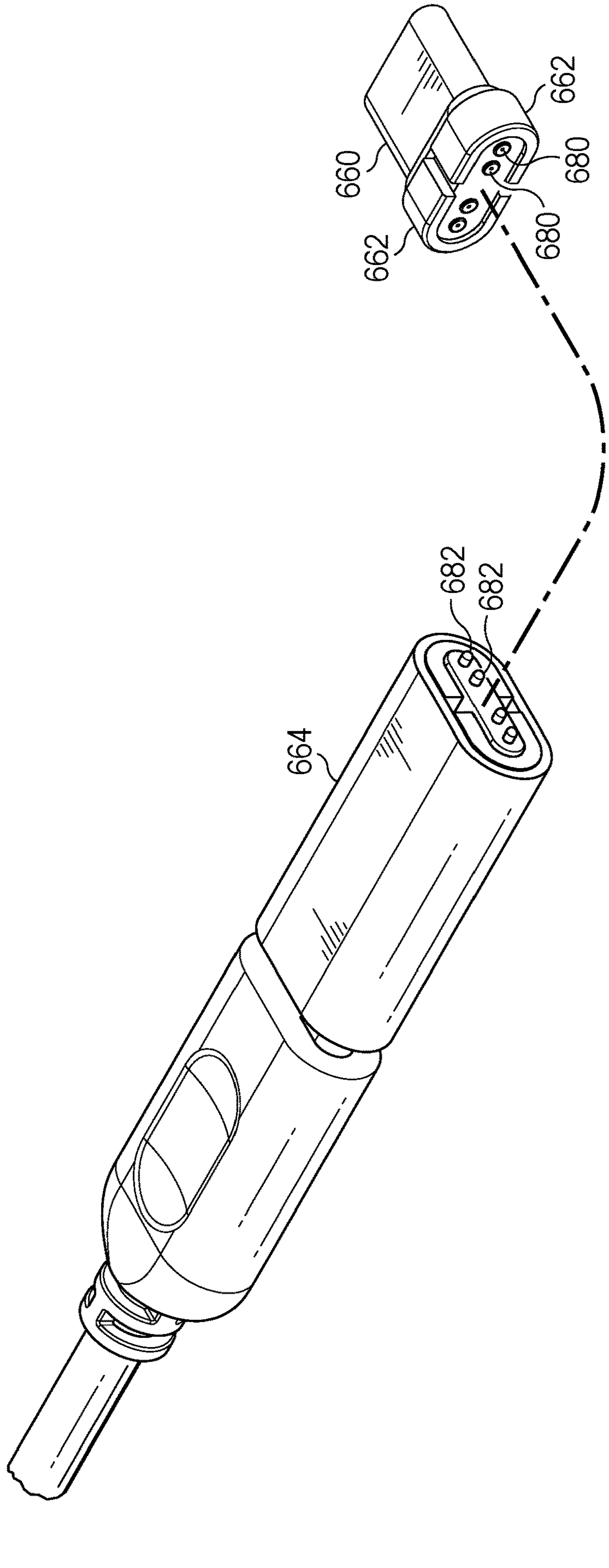
FIG. 37 depicts a magnetic connector and charger that couple to a cable.

Referring now to FIG. 37, a magnetic connector and charger are depicted that couple to a cable. Magnetic charging receptacle 664 has a USB Type-C form factor for coupling to an information handling system or peripheral and magnets 662 proximate pins 680 to magnetically couple with receptacle 664. For instance, the magnet polarity and charging pin orientations of FIGS. 36A and 36B are used to ensure proper orientation when plug connector 660 and receptacle 664 couple with each other. The example embodiment depicts a convenient coupling of a charging cable by magnetic attraction to a peripheral device using a pluggable adapter and charger configuration. An end user in a gaming application who has a battery powered peripheral can rapidly couple to a charger if the battery runs low by leaving receptacle connector 660 plugged into the peripheral and plug connector 664 coupled to a charging cable. Magnetic attraction draws the cable quickly into a correct orientation without the end user having to struggle to insert a plug into a port. The asymmetric magnet orientation prevents incorrection charging coupling as does the offset charging and communication pins.

Figure 38:
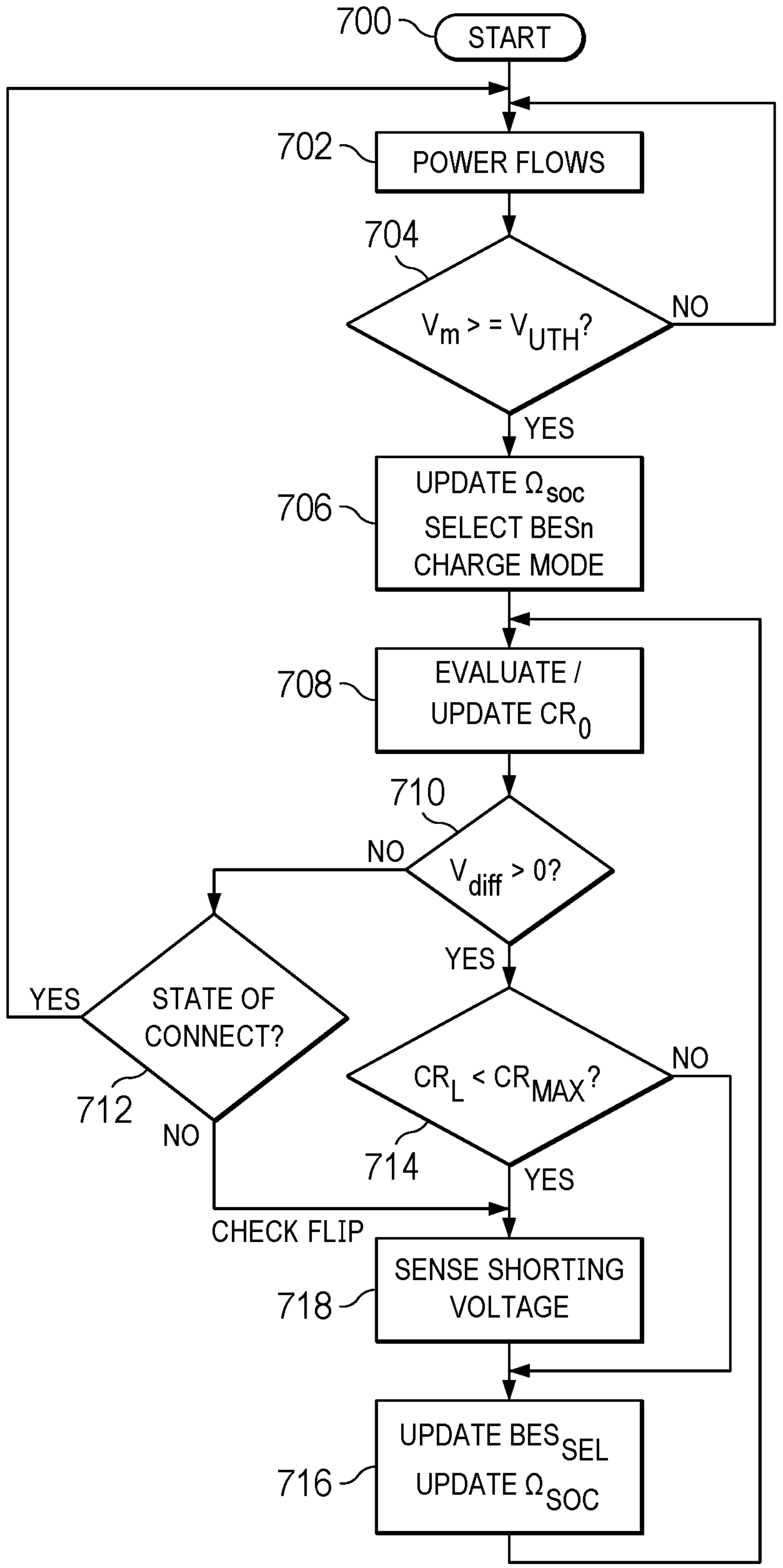
FIG. 38 depicts a flow diagram of a process for confirming connector configuration at coupling to an information handling system.

Referring now to FIG. 38, a flow diagram depicts a process for confirming connector configuration at coupling to an information handling system. The process starts at step 700 with a connection of a plug and receptacle. At step 702 power is provided at the charging plugs so that a step 704 a determination is made of whether the voltage exceeds a threshold. If not, the process returns to step 700. If the voltage threshold is exceeded, the process continues to step 706 to update the charge mode to determine if the higher voltage may be output. At step 708 a communication of charging capabilities is provided through the communication pins and at step 710 a determination is made of whether a greater voltage can be supported. If not the process continues to step 712 to maintain power transfer at the existing state. From step 712, if the state of connect changes, the process continues to step 718 to ensure that a voltage short is not sensed. If additional power is available, the process continues to step 714 to determine if the commanded power is a maximum available. If the power is not at a maximum setting the process continues to step 716 to increment up a level of power transfer and then to step 708 to see if the power draw exceeds the maximum setting or is sufficient. If at step 714 the maximum power setting is made, the process continues to step 718 to sense against a shorting voltage to ensure that a connection from power to ground is not set. The process then returns to step 716 with the maximum power set. If at step 718 an interface with ground is detected, power is not communicated to the charging line.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor disposed in the housing and operable to execute instructions that process information;

a memory disposed in the housing and interfaced with the processor, the memory operable to store the instructions and information;

a speaker device configured to rest on an end user shoulders below the end user ears, the speaker device having plural ultrasonic speakers operable to direct ultrasonic sound at the end user that demodulates to audible sound at impact with the end user;

plural microphones included with the speaker to receive the audible sounds reflected from the end user; and a processing resource included with the speaker device and interfaced with the microphones, the speaker device operable to analyze the audible sounds reflected from the end user to determine motion associated with a head of the end user;

wherein:

one or more of the plural ultrasonic speakers present a periodic predetermined ultrasonic sound that demodulates to a predetermined frequency; and the processing resource analyzes phase shift of the sounds of the predetermined frequency to determine the motion associated with the head.

2. The information handling system of claim 1 wherein the processing resource executes a Low Latency Acoustic Phase logic to detect the motion associated with the head.

3. The information handling system of claim 2 wherein the ultrasonic sound comprises a frequency of substantially 40 KHz.

4. The information handling system of claim 1 further comprising first and second earcups coupled to the speaker, each of the first and second earcups having an earcup speaker, the earcup speakers playing audio to the end user when the first and second earcups couple over first and second ears of the end user.

5. The information handling system of claim 4 wherein the ultrasonic speakers comprise ultrasonic parametric speakers.

6. The information handling system of claim 4 wherein the first and second earcup speakers direct sound at the end user shoulders when the ultrasonic speakers are directed towards the end user.

7. The information handling system of claim 6 wherein the first and second earcup speakers play low frequency for haptic effects when the earcup speakers are directed at the end user shoulders.

8. A method for presenting audio from an information handling system with an audio device, the method comprising:

producing ultrasonic sound with plural ultrasonic speakers located at an end user neck and directed toward the end user ears;

demodulating the ultrasonic sound to generate audible sounds at the end user ears;

reflecting the audible sounds to plural microphones collocated with the plural ultrasonic speakers; and analyzing audible sounds detected by the microphones to determine motion associated with a head of the end user;

wherein the analyzing comprises a Low Latency Acoustic Phase logic to detect the motion associated with the head.

9. The method of claim 8 further comprising:

including with the ultrasonic sound a periodic predetermined ultrasonic sound that demodulates to a predetermined frequency; and analyzing phase shift of the sounds of the predetermined frequency to determine the motion associated with the head.

10. The method of claim 9 wherein the ultrasonic sound comprises a frequency of substantially 40 KHz.

11. The method of claim 8 further comprising:

lifting the audio device from the end user neck to place earcups of the audio device over ears of the end user; and playing the audio as audible sounds from the earcups.

12. The method of claim 11 further comprising:

placing the audio device on the end user shoulders;

rotating the earcups to direct sound at the end user shoulder; and playing sound from the earcups to provide a haptic effect at the end user shoulders.

13. An audio device comprising:

a frame configured to fit around an end user neck at the end user shoulders;

plural ultrasonic speakers coupled to the frame and configured to direct ultrasonic sound towards the end user head when the frame rests on the end user shoulders;

wherein the ultrasonic sound demodulates to audible sound at impact with the end user head;

plural microphones coupled to the frame and directed to detect audible sound that reflects from the end user head;

a processing resource interfaced with the plural microphones and configured to analyze the reflected sound to determine motion of the end user head;

wherein:

one or more of the plural ultrasonic speakers present a periodic predetermined ultrasonic sound that demodulates to a predetermined frequency in combination with content audible sounds; and the processing resource analyzes phase shift of the sounds of the predetermined frequency to determine the motion associated with the head.

14. The audio device of claim 13 wherein the ultrasonic sound comprises a frequency of substantially 40 KHz.

* * * * *